(12) United States Patent
Dawkins et al.

(10) Patent No.: US 12,634,541 B2
(45) Date of Patent: May 19, 2026

(54) STREAMING SCENE PRIORITIZER FOR IMMERSIVE MEDIA

(71) Applicant: Tencent America LLC, Palo Alto, CA (US)

(72) Inventors: Paul Spencer Dawkins, Garland, TX (US); Arianne Hinds, Palo Alto, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/137,849

(22) Filed: Apr. 21, 2023

(65) Prior Publication Data

US 2023/0370666 A1     Nov. 16, 2023

Related U.S. Application Data

(60) Provisional application No. 63/428,698, filed on Nov. 29, 2022, provisional application No. 63/422,175, (Continued)

(51) Int. Cl.
| | |
|---|---|
| *H04N 21/262* | (2011.01) |
| *H04N 21/414* | (2011.01) |
| *H04N 21/81* | (2011.01) |

(52) U.S. Cl.
CPC ................. *H04N 21/26258* (2013.01); *H04N 21/26216* (2013.01); *H04N 21/414* (2013.01); *H04N 21/816* (2013.01)

(58) Field of Classification Search
None
See application file for complete search history.

(56) References Cited

U.S. PATENT DOCUMENTS

| | | | |
|---|---|---|---|
| 2017/0374411 A1* | 12/2017 | Lederer | H04N 13/189 |
| 2018/0160160 A1* | 6/2018 | Swaminathan | H04N 21/816 |

(Continued)

OTHER PUBLICATIONS

International Search Report with Written Opinion issued in Application No. PCT/US2023/066479, mailed Sep. 21, 2023, 17 pages.

(Continued)

*Primary Examiner* — Omar S Parra
(74) *Attorney, Agent, or Firm* — ARENTFOX SCHIFF LLP

(57) ABSTRACT

Aspects of the disclosure provide methods and apparatuses for immersive media processing. In some examples, a method of media processing includes receiving a scene based immersive media for playing at a light field based display. The scene based immersive media includes a plurality of scenes. The method includes assigning priority values respectively to the plurality of scenes in the scene based immersive media, and determining an order for streaming the plurality of scenes to an end device according to the priority values. In some examples, a method of media processing includes receiving a scene based immersive media for playing at a light field based display. A scene in the scene based immersive media includes a plurality of assets in a first order. The method includes determining a second order for streaming the plurality of assets to an end device, the second order is different from the first order.

20 Claims, 50 Drawing Sheets

Related U.S. Application Data filed on Nov. 3, 2022, provisional application No. 63/416,390, filed on Oct. 14, 2022, provisional application No. 63/416,395, filed on Oct. 14, 2022, provisional application No. 63/355,768, filed on Jun. 27, 2022, provisional application No. 63/354,071, filed on Jun. 21, 2022, provisional application No. 63/344,907, filed on May 23, 2022, provisional application No. 63/342,532, filed on May 16, 2022, provisional application No. 63/342,526, filed on May 16, 2022, provisional application No. 63/341,191, filed on May 12, 2022.

(56) References Cited

U.S. PATENT DOCUMENTS

| | | | | |
|---|---|---|---|---|
| 2020/0413094 | A1* | 12/2020 | Lee ...................... | H04N 19/167 |
| 2021/0133929 | A1* | 5/2021 | Ackerson ............... | G06T 9/001 |
| 2022/0095001 | A1 | 3/2022 | Harviainen | |
| 2023/0098809 | A1* | 3/2023 | Shiotsu ................... | G06F 3/167 |
| | | | | 345/426 |
| 2023/0136064 | A1* | 5/2023 | Daly ........................ | G06T 1/20 |
| | | | | 345/520 |

OTHER PUBLICATIONS

Extended European Search Report received for European Application No. 23792851.0, mailed on Dec. 5, 2025, 9 pages.

* cited by examiner

| Metadata Attribute | Attribute Value |
|---|---|
| Size in bytes | 500,000 |
| Number of Polygons | 3,000-5,000 |
| Distance from Default Camera | 30 feet |
| Visible from Default Camera | Yes |
| <other attributes> | <other attribute values> |
| <other attributes> | <other attribute values> |

4200

START — S4201

RECEIVE, BY A NETWORK DEVICE, A SCENE BASED IMMERSIVE MEDIA FOR PLAYING AT A LIGHT FIELD BASED DISPLAY, A SCENE IN THE SCENE BASED IMMERSIVE MEDIA INCLUDES A PLURALITY OF ASSETS IN A FIRST ORDER — S4210

DETERMINE A SECOND ORDER FOR STREAMING THE PLURALITY OF ASSETS TO AN END DEVICE, THE SECOND ORDER IS DIFFERENT FROM THE FIRST ORDER — S4220

STOP — S4299

4300

START ⟶ S4301

SEND A REQUEST FOR A SCENE BASED IMMERSIVE MEDIA FOR PLAYING AT A LIGHT FIELD BASED DISPLAY, A SCENE IN THE SCENE BASED IMMERSIVE MEDIA INCLUDES A PLURALITY OF ASSETS IN A FIRST ORDER ⟶ S4310

PROVIDE INFORMATION OF THE ELECTRONIC DEVICE FOR ADJUSTING AN ORDER FOR STREAMING THE PLURALITY OF ASSETS TO THE ELECTRONIC DEVICE ⟶ S4320

STOP ⟶ S4399

STREAMING SCENE PRIORITIZER FOR IMMERSIVE MEDIA

INCORPORATION BY REFERENCE

This present disclosure claims the benefit of priority to U.S. Provisional Application No. 63/341,191, "STREAMING SCENE PRIORITIZER FOR LIGHTFIELD HOLOGRAPHIC MEDIA" filed on May 12, 2022, U.S. Provisional Application No. 63/342,532, "STREAMING SCENE PRIORITIZER FOR LIGHTFIELD, HOLOGRAPHIC AND/OR IMMERSIVE MEDIA" filed on May 16, 2022, U.S. Provisional Application No. 63/342,526, "STREAMING ASSET PRIORITIZER FOR LIGHTFIELD, HOLOGRAPHIC AND/OR IMMERSIVE MEDIA BASED ON ASSET SIZE" filed on May 16, 2022, U.S. Provisional Application No. 63/344,907, "STREAMING ASSET PRIORITIZER FOR LIGHTFIELD, HOLOGRAPHIC, OR IMMERSIVE MEDIA BASED ON ASSET VISIBILITY" filed on May 23, 2022, U.S. Provisional Application No. 63/354,071, "PRIORITIZING STREAMING ASSETS FOR LIGHTFIELD, HOLOGRAPHIC AND/OR IMMERSIVE MEDIA BASED ON MULTIPLE POLICIES" filed on Jun. 21, 2022, U.S. Provisional Application No. 63/355,768, "SCENE ANALYZER FOR PRIORITIZATION OF ASSET RENDERING BASED ON ASSET VISIBILITY IN SCENE DEFAULT VIEWPORT" filed on Jun. 27, 2022, U.S. Provisional Application No. 63/416,390, "STREAMING ASSET PRIORITIZER FOR LIGHTFIELD, HOLOGRAPHIC OR IMMERSIVE MEDIA BASED ON DISTANCE WITHIN FIELD OF VIEW" filed on Oct. 14, 2022, U.S. Provisional Application No. 63/416,395, "STREAMING ASSET PRIORITIZER FOR LIGHTFIELD, HOLOGRAPHIC OR IMMERSIVE MEDIA BASED ON ASSET COMPLEXITY" filed on Oct. 14, 2022, U.S. Provisional Application No. 63/422,175, "STREAMING ASSET PRIORITIZER FOR LIGHTFIELD, HOLOGRAPHIC, OR IMMERSIVE MEDIA BASED ON MULTIPLE METADATA ATTRIBUTES" filed on Nov. 3, 2022, and U.S. Provisional Application No. 63/428,698, "PRIORITIZATION OF MEDIA ADAPTATION BY ATTACHED CLIENT TYPES" filed on Nov. 29, 2022. The entire disclosures of the prior applications are hereby incorporated by reference in their entirety.

TECHNICAL FIELD

The present disclosure describes embodiments generally related to media processing and distribution, including adaptive streaming of immersive media, such as for lightfield or holographic immersive displays.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Immersive media generally refers to media that stimulates any or all human sensory systems (visual, auditory, somatosensory, olfactory, and possibly gustatory) to create or enhance the perception of the user being physically present in the experience of the media, such as beyond what is distributed over existing commercial networks for timed two-dimensional (2D) video and corresponding audio which is known as "legacy media". Both immersive media and legacy media can be characterized as either timed or untimed.

Timed media refers to media that is structured and presented according to time. Examples include movie features, news reports, episodic content, and the like that are organized according to periods of time. Legacy video and audio are generally considered to be timed media.

Untimed media is media that is not structured by time; but rather structured by logical, spatial, and/or temporal relationships. An example includes a video game where the user has control over the experience created by the gaming device. Another example of untimed media is a still image photograph taken by a camera. Untimed media may incorporate timed media, for example, in a continuously looped audio or video segment of a scene for a video game. Conversely, timed media may incorporate untimed media, for example a video with a fixed still image as background.

Immersive media-capable devices may refer to devices equipped with abilities to access, interpret, and present immersive media. Such media and devices are heterogeneous in terms of the quantity and formats of the media, and numbers and types of network resources required to distribute such media at scale, i.e., to achieve distribution equivalent to that of legacy video and audio media over networks. In contrast, legacy devices such as laptop displays, televisions, and mobile handset displays are homogenous in their capabilities since all of these devices are comprised of rectangular display screens, and consume 2D rectangular video or still images as their primary media formats.

SUMMARY

Aspects of the disclosure provide methods and apparatuses for media processing. According to some aspects of the disclosure, a method of media processing includes receiving, by a network device, a scene based immersive media for playing at a light field based display. The scene based immersive media includes a plurality of scenes. The method includes assigning priority values respectively to the plurality of scenes in the scene based immersive media, and determining an order for streaming the plurality of scenes to an end device according to the priority values.

In some examples, the method includes reordering the plurality of scenes according to the priority values and transmitting the reordered plurality of scenes to the end device.

In some examples, the method includes selecting, by a priority-aware network device, from a subset of un-transmitted scenes in the plurality of scenes, a highest priority scene with a highest priority value, and transmitting the highest priority scene to the end device.

In some examples, the method includes determining a priority value to a scene based on a likelihood of a need to render the scene.

In some examples, the method includes determining that an available network bandwidth is limited, selecting, from a subset of un-transmitted scenes in the plurality of scenes, a highest priority scene with a highest priority value, and transmitting the highest priority scene in response to the available network bandwidth being limited.

In some examples, the method includes determining that an available network bandwidth is limited, identifying a subset of the plurality of scenes are unlikely to be needed for rendering next based on the priority values, and refraining the subset of the plurality of scenes from streaming in response to the available network bandwidth is limited.

In some examples, the method includes assigning, a first priority value to a first scene based on a second priority value of a second scene in response to a relationship between the first scene and the second scene.

In some examples, the method includes receiving, a feedback signal from the end device, and adjusting at least a priority value of a scene in the plurality of scenes based on the feedback signal. In an example, the method includes assigning, a highest priority to a first scene in response to the feedback signal indicative of a current scene being a second scene that is in connection with the first scene. In another example, the feedback signal indicates a priority adjustment that is determined by the end device.

According to some aspects of the disclosure, a method of media processing includes receiving, by an end device with a light field based display, a media presentation description (MPD) for a scene based immersive media for playing by the light field based display. The scene based immersive media includes a plurality of scenes, and the MPD is indicative of streaming the plurality of scenes to the end device in an order. The method further includes detecting a bandwidth availability, determining an order change of at least one scene based on the bandwidth availability, and sending a feedback signal indicative of the order change of the at least one scene.

In some examples, the feedback signal indicates a next scene to render. In some examples, the feedback signal indicates an adjustment of a priority value of the at least one scene. In some examples, the feedback signal indicates a current scene.

According to some aspects of the disclosure, a method of media processing includes receiving, by a network device, a scene based immersive media for playing at a light field based display. A scene in the scene based immersive media includes a plurality of assets in a first order. The method includes determining a second order for streaming the plurality of assets to an end device, the second order is different from the first order.

In some examples, the method includes assigning priority values respectively to the plurality of assets in the scene according to one or more attributes of the plurality of assets, and determining the second order for streaming the plurality of assets according to the priority values.

In some examples, the method includes assigning a priority value to an asset in the scene according to a size of the asset.

In some examples, the method includes assigning a priority value to an asset in the scene according to a visibility of the asset associated with a default entry location of the scene.

In some examples, the method includes assigning a first set of priority values to the plurality of assets based on a first attribute of the plurality of assets. The first set of priority values is used for ordering the plurality of assets in a first prioritization scheme. The method further includes assigning a second set of priority values to the plurality of assets based on a second attribute of the plurality of assets. The second set of priority values is used for ordering the plurality of assets in a second prioritization scheme. The method further includes selecting, a prioritization scheme for the end device from the first prioritization scheme and the second prioritization scheme according to information of the end device, and ordering the plurality of assets for streaming according to the selected prioritization scheme.

In some examples, the method includes assigning a first priority value to a first asset and a second priority value to a second asset in response to the first asset having a higher complexity of computation than the second asset, the first priority value is higher than the second priority value.

According to some aspects of the disclosure, a method of media processing includes determining a location and a size of a viewport associated with a camera for viewing a scene in a scene based immersive media. The scene includes a plurality of assets. The method further includes determining, for each asset whether the asset at least partially intersects with the viewport based on the location and the size of the viewport and a geometry of the asset, storing an identifier of the asset in a list of viewable assets in response to the asset at least partially intersecting with the viewport, and including the list of viewable assets into metadata associated with the scene.

According to some aspects of the disclosure, a method of media processing includes receiving profile information (types and numbers of each type) of client devices attached to a network for adapting a media to one or more media requirements of the client devices for distributing the media to the client devices, and prioritizing a first adaptation that adapts the media to a first media requirement for distributing to a first subset of the client devices according to the profile information of the client devices.

Aspects of the disclosure also provide a non-transitory computer-readable medium storing instructions which when executed by a computer cause the computer to perform the method for media processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
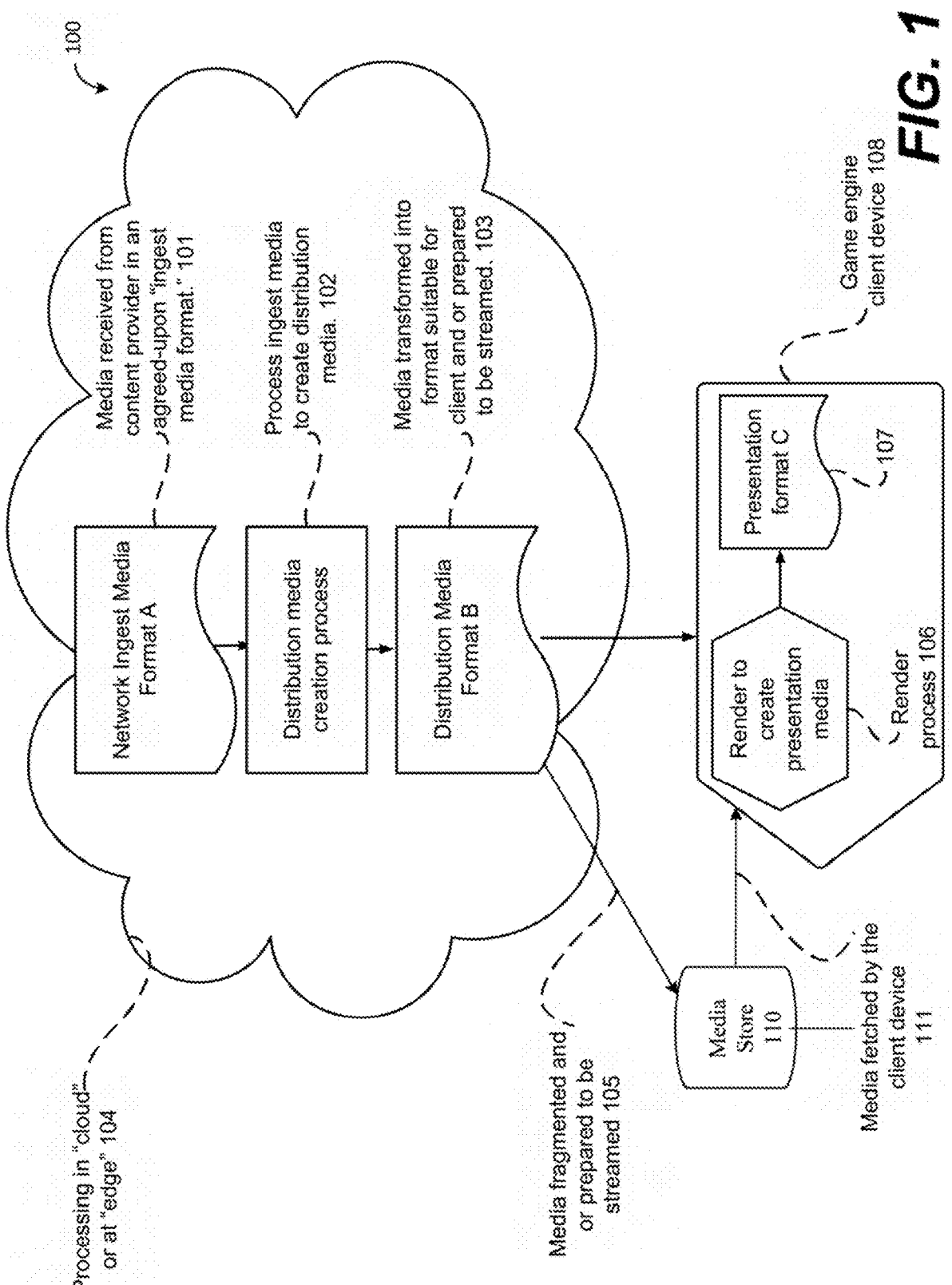
FIG. 1 shows a media flow process in some examples.

Aspects of the disclosure provide architectures, structures, components, techniques, systems and/or networks to distribute media, including video, audio, geometric (3D) objects, haptics, associated metadata, or other content for a client device. In some examples, architectures, structures, components, techniques, systems and/or networks are configured for distribution of media content to heterogenous immersive and interactive client devices, e.g., game engines. In some examples, the client devices can include lightfield or holographic immersive displays. It is noted that while immersive media for lightfield or holographic immersive displays are used as examples in some embodiments of the present disclosure, the disclosed techniques can be used on any suitable immersive media.

Immersive media is defined by immersive technologies that attempt to create, or imitate the physical world through digital simulation, thereby simulating any or all human sensory systems to create the perception of the user being physically present inside the scene.

There are several different types of immersive media technologies currently in development and use: virtual reality (VR), augmented reality (AR), mixed reality (MR), lightfield, holographic, etc. VR refers to a digital environment replacing a user's physical environment by using a headset to place the user in a computer-generated world. AR, on the other hand, takes digital media and layers them on the real world around a user by using either a clear vision or a smartphone. MR refers to the blending of the real world with the digital world, thereby creating an environment in which technology and the physical world can co-exist.

Holographic and lightfield technologies can create a virtual environment with an accurate sense of depth and three-dimensionality without the need to use any headset and therefore avoid side effects like motion sickness. Lightfield and holographic technologies can use light rays in 3D space with rays coming from each point and direction in some examples. The lightfield and holographic technologies are based on the concept that everything seen is illuminated by light coming from any source, traveling through space, and hitting the object's surface where the light is partly absorbed and partly reflected to another surface before reaching eyes of human beings. In some examples, the lightfield and holographic technologies can reproduce a light field that provides a user with 3D effects such as binocularity and continuous motion parallax. For example, a lightfield display can include a massive array of projection modules projecting light rays onto a holographic screen to reproduce the approximation of a light field by showing different but consistent information in slightly different directions. In another example, a lightfield display may emit light rays according to the plenoptic function, and the light rays converge in front of the lightfield display to create a real, 3D, arial image. In the present disclosure, light field based display refers to display that use light rays in 3D space, such as lightfield display, holographic display and the like.

In some examples, light rays may be defined by five-dimensional plenoptic functions, where each ray may be defined by three coordinates in 3D space (3 dimensions) and two angles to specific the direction in 3D space.

Generally, to capture the content for 360-degree video, a 360-degree camera is required. However, to capture content for lightfield or holographic based displays, in some examples, an expensive setup that includes multiple-depth cameras, or an array of cameras can be required depending on the field of view (FoV) of the scene to be rendered.

In an example, a traditional camera can capture a 2D representation of the light rays that reach the camera lens at a given position. The image sensor records the sum of the brightness and color of all light rays reaching each pixel.

In some examples, to capture content for light field based displays, a light field camera (also known as plenoptic camera) is used, the light field camera can capture not only the brightness and color but also the direction of all light rays reaching the camera sensors. Using the information captured by the light field camera, a digital scene may be reconstructed with an accurate representation of the origin of each light ray, making it possible to reconstruct the exact captured scene digitally in 3D.

Two techniques are developed to capture such volumetric scenes. The first technique uses an array of cameras or camera modules to capture different rays/views from each direction. The second technique uses a plenoptic camera (or an array of plenoptic cameras) that can also capture rays from different directions.

In some examples, volumetric scenes may also be synthesized using computer generated imagery (CGI) techniques, and then rendered using the same techniques as are used to render volumetric scenes captured by cameras.

Whether captured by plenoptic cameras or synthesized by CGI, multimedia content for light field based displays is captured and stored in a media server (also referred to as media server devices). Ultimately, the content is converted into geometric representations that include explicit information about the geometry of each object in the visual scene, as well as metadata to describe the surface properties (e.g., smoothness, roughness, ability to reflect, refract, or absorb light). Each object in the visual scene is referred to as an "asset" for the scene. To transmit this data over to a client device requires a massive amount of bandwidth even after the data is compressed. Therefore, in situations when the bandwidth is limited, the client device may experience buffering or interruptions, making the experience unpleasant.

In some examples, the use of CDNs and edge network elements can reduce the delay between a client device's request for a scene and the delivery of the scene (including each visual object for the scene, the collection of which are referred to as the "assets" for the scene) to the client device. Furthermore, in contrast to video which is simply decoded and placed in a series of rectilinear frame buffers to be presented to a user, immersive media scenes are comprised of objects and rich metadata that need to be rendered by a real-time renderer (similar to the renderers provided with game engines such as Unity Engine by Unity Technologies, or Unreal Engine by Epic Games) that may be compute intensive and require significant resources to fully construct the scene. For such scene-based media, the use of cloud/edge network elements may be used to offload the computational load of rendering by the client device to a more powerful computational engine, such as one or more server devices, and the like in the network.

The multimedia content for the light field based displays is captured and stored in a media server. The multimedia content may be real-world or synthetic content. To transmit the data of the multimedia content over to an end device of a client (also referred to as a client device or an end device) requires a massive amount of bandwidth even after the data is compressed. Therefore, in situations when the bandwidth is limited, the client device may experience buffering or interruptions that may make the experience unpleasant.

As previously described, immersive media generally refers to media that stimulates any or all human sensory systems (visual, auditory, somatosensory, olfactory, and possibly gustatory) to create or enhance the perception of the user being physically present in the experience of the media, i.e., beyond what is distributed over existing commercial networks for timed two-dimensional (2D) video and corresponding audio which is known as "legacy media". In some examples, immersive media refers to media that attempt to create, or imitate the physical world through digital simulation of kinetics and laws of physics, thereby stimulating any or all human sensory systems so as to create the perception by the user of being physically present inside a scene that depicts a real or virtual world. Both immersive media and legacy media can be characterized as either timed or untimed.

Timed media refers to media that is structured and presented according to time. Examples include movie features, news reports, episodic content, all of which are organized according to periods of time. Legacy video and audio are generally considered to be timed media.

Untimed media is media that is not structured by time; but rather structured by logical, spatial, and/or temporal relationships. An example includes a video game where the user has control over the experience created by the gaming device. Another example of untimed media is a still image photograph taken by a camera. Untimed media may incorporate timed media, for example, in a continuously looped audio or video segment of a scene for a video game. Conversely, timed media may incorporate untimed media, for example a video with a fixed still image as background.

Immersive media-capable devices may refer to devices equipped with sufficient resources and capabilities to access, interpret, and present immersive media. Such media and devices are heterogeneous in terms of the quantity and formats of the media, and numbers and types of network resources required to distribute such media at scale, i.e., to achieve distribution equivalent to that of legacy video and audio media over networks. Likewise, media are heterogenous in terms of the amount and types of network resources required to distribute such media at scale. "At scale" may refer to the distribution of media by service providers that achieve distribution equivalent to that of legacy video and audio media over networks, e.g., Netflix, Hulu, Comcast subscriptions, and Spectrum subscriptions.

Generally, legacy devices such as laptop displays, televisions, and mobile handset displays are homogenous in their capabilities since all of these devices are comprised of rectangular display screens, and consume 2D rectangular video or still images as their primary media formats. Likewise, the number of audio formats supported in legacy devices is limited to a relatively small set.

The term "frame-based" media refers to the characteristic that the visual media are comprised of one or more consecutive rectangular frames of imagery. In contrast, "scene-based" media refers to visual media that are organized by "scenes" in which each scene refers to individual assets that collectively describe the visual characteristics of the scene.

A comparative example between frame-based and scene-based visual media can be described using visual media illustrating a forest. In the frame-based representation, the forest is captured using camera devices, such as mobile phones with cameras. A user can enable a camera device to focus on the forest and the frame-based media that is captured by the camera device is the same as what the user sees through the camera viewport provided on the camera device, including any movement of the camera device initiated by the user. The resulting frame-based representation of the forest is the series of 2D images that are recorded by the camera device usually at a standard rate of 30 frames-per-second or 60 frames-per-second. Each image is a collection of pixels where the information stored in each pixel is congruent, one pixel to the next.

In contrast, a scene-based representation of a forest is comprised of individual assets that describe each of the objects in the forest, and a human-readable scene graph description that presents a myriad of metadata that describe the assets or how the assets are to be rendered. For example, the scene-based representation can include individual objects called "trees" where each tree is comprised of a collection of smaller assets called "trunks," "branches," and "leaves." Each tree trunk can be further described individually by a mesh (tree trunk mesh) that describes a full 3D geometry of the tree trunk and a texture that is applied to the tree trunk mesh to capture the color and radiance properties of the tree trunk. Furthermore, the tree trunk may be accompanied by additional information that describes the surface of the tree trunk in terms of its smoothness or roughness or ability to reflect light. The corresponding human-readable scene graph description may provide information as to where to place the tree trunks relative to the viewport of a virtual camera that is focused into the forest scene. Furthermore the human-readable description may include information as to how many branches to generate and where to place them into the scene from the single branch asset called "branch." Likewise the description may include how many leaves to generate and the position of the leaves relative to the branches and the tree trunks. Moreover, a transformation matrix may provide information as to how to scale or rotate the leaves so that the leaves do not appear homogenous. Overall, the individual assets that comprise the scene vary in terms of the type and quantities of information that is stored in each asset. Each asset is usually stored in its own file, but often the assets are used to create multiple instances of the objects that they are designed to create, e.g., the branches and leaves for each tree.

In some examples, the human-readable portion of a scene graph is rich in metadata to not only describe the relationships of assets to their position within the scene, but also instructions as to how to render the object, e.g., with various types of light sources, or with surface properties (to indicate the object has a metallic vs. matte surface) or other materials (poreous or smooth texture). Other information often stored in the human readable portion of the graph is the relationship of assets with other assets, e.g., to form groups of assets that are rendered or handled as a single entity, e.g., the tree trunks with branches and leaves.

Examples of scene graphs with human readable components include glTF 2.0 where the node-tree component is provided in Jave Script Obejct Notation (JSON) which is a human-readable notation to describe objects. Another example of a scene graph with a human readable component is the Immersive Technologies Media Format in which the OCS file is generated using XML, another human-readable notation format.

Yet another difference between scene-based and frame-based media is that in frame-based media, the view that is created for the scene is identical to the view that the user captured via the camera, i.e., at the time that the media was created. When the frame-based media is presented by a client, the view of the media that is presented is the same as the view that is captured in the media, e.g., by the camera that was used to record the video. With scene-based media, however, there may be multiple ways for the user to view the scene using a variety of virtual camera, e.g., a thin-lens camera vs. a panoramic camera. In some examples, visual information of a scene that is viewable to a viewer may change depending on the viewer's viewing angle and location.

Client devices that support scene-based media may be equipped with a renderer and or resources (e.g., GPUs, CPUs, local media cache storage) whose capabilities and supported functions collectively comprise an upper bound or upper limit to characterize the total capabilities of the client device to ingest a variety of scene-based media formats. For example, a mobile handset client device may be limited in the complexity of the geometric assets, e.g., the number of polygons that describe the geometric assets, that the mobile handset client device can render, especially for support of real-time applications. Such a limitation may be established based on the fact that a mobile client is powered by batteries, and hence the amount of computation resources that are available to perform real-time rendering are likewise limited. In such a scenario, it may be desirable for the client device to inform the network that the client device prefers to have access to geometric assets with a polygon count no larger than a client-specified upper limit. Furthermore, the information conveyed from the client to the network may be best communicated using a well-defined protocol that leverages a lexicon of well-defined attributes.

Likewise, a media distribution network may have compute resources that facilitate the distribution of immersive media in a variety of formats to a variety of clients with variety of capabilities. In such a network, it may be desirable for the network to be informed of the client-specific capabilities according to a well-defined profile protocol, e.g., a lexicon of attributes that is communicated via a well-defined protocol. Such a lexicon of attributes may include information to describe the media or the minimum compute resources needed to render the media in real-time, so that the network can better establish priorities for how to serve media to its heterogeneous clients. Furthermore a centralized data store in which the client-provided profile information is collected across the domain of clients is helpful to provide a summary of which types of assets, and in which format, are in high demand. Provisioned with the information about which types of assets are in higher vs. lower demand allows an optimized network to prioritize tasks that respond to the requests for assets that are in higher demand.

In some examples, the distribution of media over networks can employ media delivery systems and architectures that reformat the media from an input or network "ingest" media format to a distribution media format. In an example, the distribution media format is not only suitable to be ingested by the target client device and its applications, but is also conducive to being "streamed" over the network. In some examples, there may be two processes that are performed upon the ingested media by a network: 1) converting the media from a format A into a format B that is suitable to be ingested by the target client device, i.e., based upon the client device's capabilities to ingest certain media formats, and 2) preparing the media to be streamed.

In some examples, "streaming" of media broadly refers to the fragmenting and/or packetizing of the media so that the processed media can be delivered over the network in consecutive smaller-sized "chunks" logically organized and sequenced according to either or both the media's temporal or spatial structure. In some examples, "transforming," which may sometimes be referred to as "transcoding," of media from a format A to a format B may be a process that is performed, usually by the network or by a service provider, prior to distributing the media to a target client device. Such transcoding may be comprised of converting the media from a format A to a format B based upon prior knowledge that format B is somehow a preferred format, or the only format, that can be ingested by the target client device, or is better suited for distribution over a constrained resource such as a commercial network. One example of the transformation of media is the conversion of the media from a scene-based representation to a frame-based representation. In some examples, both steps of transforming the media and preparing the media to be streamed are necessary before the media can be received and processed by the target client device from the network. Such prior knowledge about client-preferred formats may be acquired via the use of a profile protocol utilizing an agreed-upon lexicon of attributes that summarizes the characteristics of scene-based media that are preferred across a variety of client devices.

In some examples, the above one or two-step processes acted upon the ingested media by the network, i.e., prior to distributing the media to the target client device, results in a media format referred to as a "distribution media format," or simply, the "distribution format." In general, these steps can be performed only once, if performed at all for a given media data object, if the network has access to information to indicate that the target client device will need the transformed and or streamed media object for multiple occasions that otherwise would trigger the transformation and streaming of such media multiple times. That is, the processing and transfer of data for transformation and streaming of media is generally regarded as a source of latency with the requirement for expending potentially significant amount of network and or compute resources. Hence, a network design that does not have access to information to indicate when a client device potentially already has a particular media data object stored in its cache or stored locally with respect to the client device, will perform suboptimally to a network that does have access to such information.

In some examples, for legacy presentation devices, the distribution format may be equivalent or sufficiently equivalent to the "presentation format" ultimately used by the client device (e.g., client presentation device) to create the presentation. For example, a presentation media format is a media format whose properties (resolution, framerate, bit-depth, colour gamut, etc, . . . ) are closely tuned to the capabilities of the client presentation device. Some examples of distribution vs. presentation formats include: a high-definition (HD) video signal (1920 pixel columns× 1080 pixel rows) distributed by a network to an ultra-high-definition (UHD) client device with resolution (3840 pixel columns×2160 pixel rows). For example, an UHD client device can apply a process called "super-resolution" to the HD distribution format to increase the resolution of the video signal from HD to UHD. Thus, the final signal format that is presented by the UHD client device is the "presentation format" which, in this example, is a UHD signal, whereas the HD signal comprises the distribution format. In this example, the HD signal distribution format is very similar to the UHD signal presentation format because both signals are in a rectilinear video format, and the process to convert the HD format to a UHD format is a relatively straightforward and easy process to perform on most legacy client devices.

In some examples, the preferred presentation format for the target client device may be significantly different from the ingest format received by the network. Nevertheless, the target client device may have access to sufficient compute, storage, and bandwidth resources to transform the media from the ingest format into the necessary presentation format suitable for presentation by the target client device. In this scenario, the network may bypass the step of reformatting the ingested media, e.g., "transcoding" the media, from a format A to a format B simply because the client device has access to sufficient resources to perform all media transforms without the network having to do so. However, the network may still perform the step of fragmenting and packaging the ingest media so that the media may be streamed to the target client device.

In some examples, the ingested media received by the network is significantly different from the target client device's preferred presentation format, and the target client device does not have access to sufficient compute, storage, and or bandwidth resources to convert the media to the preferred presentation format. In such a scenario, the network may assist the target client device by performing some or all of the transformation from the ingest format into a format that is either equivalent or nearly equivalent to the target client device's preferred presentation format on behalf of the target client device. In some architecture designs, such assistance provided by the network on behalf of the target client device is referred to as "split rendering" or "adaptation" of the media.

FIG. 1 shows a media flow process 100 (also referred to as process 100) in some examples. The media flow process 100 includes first steps that can be executed by in a network cloud (or an edge device) 104, and second steps that can be executed by a client device 108. In some examples, a media in an ingest media format A is received by a network from a content provider at a step 101. A step 102 that is a network process step can prepare the media for distribution to the client device 108 by formatting the media into a format B and or by preparing the media to be streamed to the client device 108. In a step 103, the media is streamed from the network cloud 104 to the client device 108 via a network connection, for example using a network protocol such as TCP or UDP. In some examples, such streamable media depicted as media 105 can be streamed to a media store 110. The client device 108 accesses the media store 110 via a fetching mechanism 111 (e.g. ISO/IEC 23009 Dynamic Adaptive Streaming over HTTP). The client device 108 receives, or fetches from the network, the distribution media and can prepare the media for presentation via a render process as shown by 106. The output of render process 106 is the presentation media in yet another potentially different format C as shown by 107.

Figure 2:
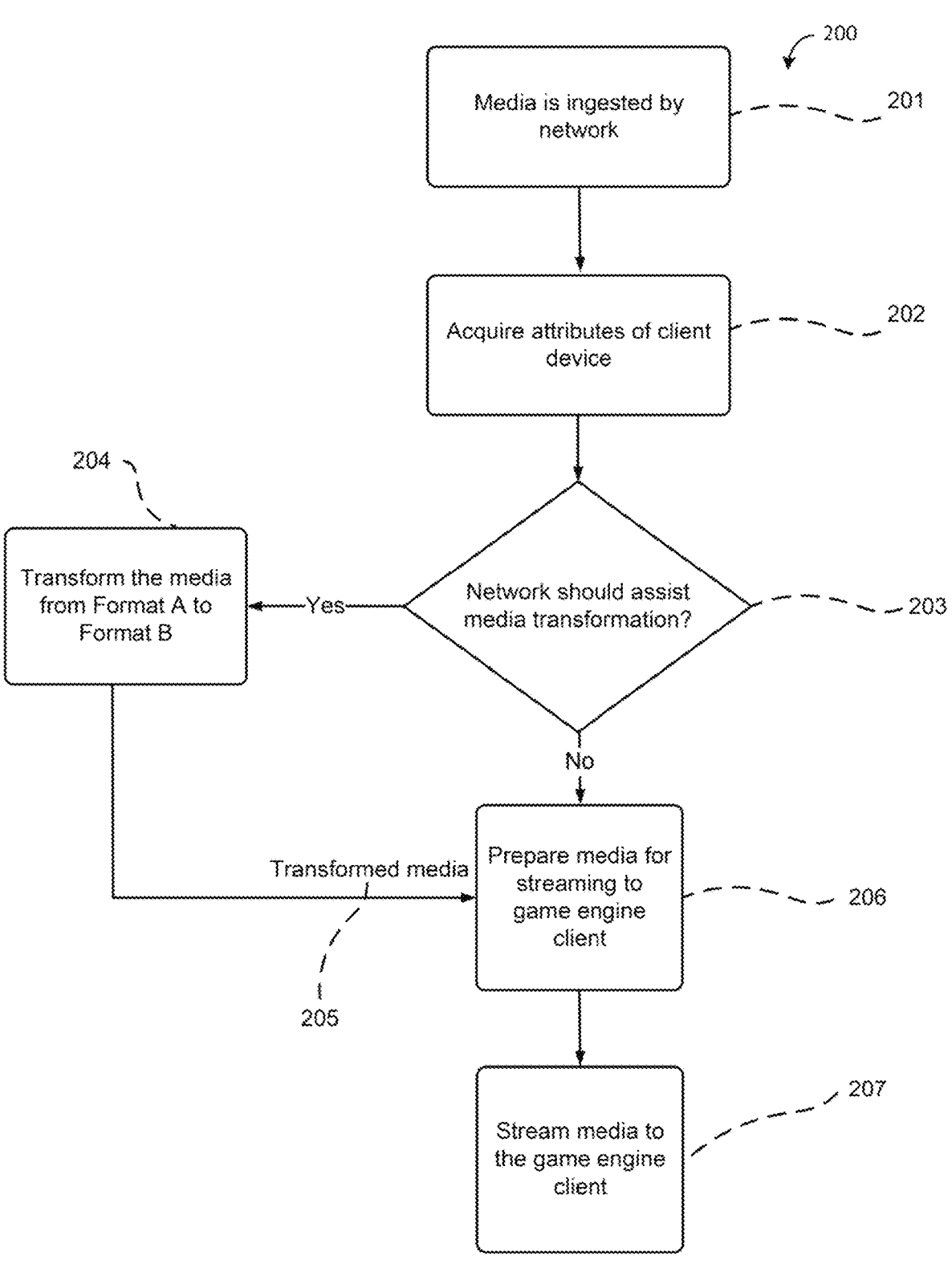
FIG. 2 shows a media transform decision making process in some examples.

FIG. 2 shows a media transform decision making process 200 (also referred to as process 200) that illustrates a network logic flow for processing ingested media within a network (also referred to as network cloud), for example by one or more devices in the network. At 201, a media is ingested by a network cloud from a content provider. The attributes for a target client device, if not already known, are acquired at 202. A decision making step 203 determines if the network should assist with the transformation of the media, if needed. The ingested media is transformed by a process step 204 to convert the media from a Format A into a Format B producing transformed media 205 when the decision making step 203 determines that the network should assist with the transformation. At 206, the media, either transformed or in its original form, is prepared to be streamed. At 207, the prepared media is suitably streamed to the target client device, such as a game engine client device, or to the media store 110 in FIG. 1.

An important aspect to the logic in FIG. 2 is the decision making process 203 that may be performed by an automated process. That decision making step can determine whether the media can be streamed in its original ingested format A, or if the media needs to be transformed into a different format B to facilitate the presentation of the media by the target client device.

In some examples, the decision making process step 203 may require access to information that describes aspects or features of the ingest media, in such a way so as to aid the decision making process step 203 to make an optimal choice, i.e., to determine if a transformation of the ingest media is needed prior to streaming the media to the target client device, or if the media can be streamed in the original ingest format A directly to the target client device.

According to an aspect of the disclosure, streaming of scene-based immersive media can be different from streaming frame-based media. For example, streaming of frame-based media may be equivalent to streaming of frames of video, where each frame captures a full picture of the entire scene or a complete picture of the entire object to be presented by a client device. The sequence of frames when reconstructed by the client device from their compressed forms, and presented to the viewer, creates a video sequence that comprises the entire immersive presentation or a portion of the presentation. For frame-based media streaming, the order in which the frames are streamed from the network to the client device may be consistent with a predefined specification, such as ITU-T Recommendation H.264 Advanced Video Coding for Generic Audio Visual Services.

However, scene-based streaming of media is unlike frame-based streaming because the scene may be comprised of individual assets that may be themselves independent of each other. A given scene-based asset may be used multiple times within a particular scene or across a series of scenes. The amount of time that a client device, or any given renderer, needs to create the correct presentation of the particular asset may depend on a number of factors including, but not limited to: the size of the asset, the availability of compute resources to perform the rendering, and other attributes that describe the overall complexity of the asset. Client devices that support scene-based streaming may require that some or all of the rendering for each asset within a scene is completed before any of the presentation for the scene can begin. Hence the order in which assets are streamed from a network to a client device may impact the overall performance.

According to an aspect of the disclosure, given each of the above scenarios where transformations of media from a format A to another format may be done either entirely by the network, entirely by the client device, or jointly between both the network and the client device, e.g., for split rendering, a lexicon of attributes that describe a media format may be needed so that both the client device and network have complete information to characterize the transformation work. Furthermore, a lexicon that provides attributes of a client device's capabilities, e.g., in terms of available compute resources, available storage resources, and access to bandwidth may likewise be needed. Even further, a mechanism to characterize the level of compute, storage, or bandwidth complexity of an ingest format may be needed so that a network and a client device may jointly, or singly, determine if or when the network may employ a split-rendering step for distributing the media to the client device. Moreover, if the transformation and or streaming of a particular media object that is or will be needed by the client device to complete its presentation of the media can be avoided, then the network may skip the steps of transform and streaming of the ingest media assuming that the client device has access or availability to the media object that it may need (e.g., previously streamed to the client device) in order to complete the client device's presentation of the media. In some examples, if the transformation from a Format A to another format is determined to be a necessary step to be performed either by or on behalf of the client device, then a prioritization scheme for ordering the transformation processes of individual assets within the scene can be performed and can benefit an intelligent and efficient network architecture.

With respect to the order in which scene-based assets are streamed from the network to the client device to facilitate the client device's ability to perform at its full potential, it may be desirable for a network to be equipped with sufficient information so that the network can determine such an order to improve the performance of the client device. For example, such a network that has sufficient information to avoid repetitive transformation and or streaming steps for assets that are used more than once, in a particular presentation, may perform more optimally than a network that is not so designed. Likewise, a network that can "intelligently" sequence the delivery of assets to the client may facilitate the client device's ability to perform at its full potential, i.e., to create an experience that may be more enjoyable to the end user. Further, the interface between the client device and a network (e.g., server device in the network) may be implemented using one or more channels of communication upon which essential information concerning the characteristics of the client device's operating state, the availability of resources at the client device, or local to the client device, the types of media to be streamed, and the frequency of the assets to be used or across a multitude of scenes is conveyed. Hence, a network architecture that implements streaming of scene-based media to heterogenous clients may need access to a client interface that can provide and update the network server processes with information related to the processing of each scene, including the current conditions related to the client device's ability to access compute and storage resources. Such a client interface may also interact closely with other processes executing on the client device, in particular with game engines that may serve essential roles on behalf of client device's ability to deliver an immersive experience to the end user. Examples of essential roles that game engines may serve include providing the application program interfaces (API's) to enable the delivery of interactive experiences. Another role that may be provided by game engines on behalf of the client device is the rendering of the exact visual signal needed by the client device to deliver a visual experience congruent with the capabilities of the client device.

The definitions of some terms used in the present disclosure are provided in the following paragraphs.

Scene graph: general data structure commonly used by vector-based graphics editing applications and modern computer games, which arranges the logical and often (but not necessarily) spatial representation of a graphical scene; a collection of nodes and vertices in a graph structure.

Scene: in the context of computer graphics, a scene is a collection of objects (e.g., 3D assets), object attributes, and other metadata that comprise the visual, acoustic, and physics-based characteristics describing a particular setting that is bounded either by space or time with respect to the interactions of the objects within that setting.

Node: fundamental element of the scene graph comprised of information related to the logical or spatial or temporal representation of visual, audio, haptic, olfactory, gustatory, or related processing information; each node shall have at most one output edge, zero or more input edges, and at least one edge (either input or output) connected to it.

Base Layer: a nominal representation of an asset, usually formulated to minimize the compute resources or time needed to render the asset, or the time to transmit the asset over a network.

Enhancement Layer: a set of information that when applied to the base layer representation of an asset, augments the base layer to include features or capabilities that are not supported in the base layer.

Attribute: metadata associated with a node used to describe a particular characteristic or feature of that node either in a canonical or more complex form (e.g. in terms of another node).

Binding LUT: a logical structure that associates metadata from the IMS of ISO/IEC 23090 Part 28 with metadata or other mechanisms used to describe features or functions of a specific scene graph format, e.g. ITMF, glTF, Universal Scene Description.

Container: a serialized format to store and exchange information to represent all natural, all synthetic, or a mixture of synthetic and natural scenes including a scene graph and all of the media resources that are required for rendering of the scene.

Serialization: the process of translating data structures or object state into a format that can be stored (for example, in a file or memory buffer) or transmitted (for example, across a network connection link) and reconstructed later (possibly in a different computer environment). When the resulting series of bits is reread according to the serialization format, it can be used to create a semantically identical clone of the original object.

Renderer: a (typically software-based) application or process, based on a selective mixture of disciplines related to: acoustic physics, light physics, visual perception, audio perception, mathematics, and software development, that, given an input scene graph and asset container, emits a typically visual and/or audio signal suitable for presentation on a targeted device or conforming to the desired properties as specified by attributes of a render target node in the scene graph. For visual-based media assets, a renderer may emit a visual signal suitable for a targeted display, or for storage as an intermediate asset (e.g. repackaged into another container i.e. used in a series of rendering processes in a graphics pipeline); for audio-based media assets, a renderer may emit an audio signal for presentation in a multi-channel loudspeaker and/or binauralized headphones, or for repackaging into another (output) container. Popular examples of renderers include the real-time rendering features of the game engines Unity and Unreal Engine.

Evaluate: produces a result (e.g., similar to evaluation of a Document Object. Model for a webpage) that causes the output to move from an abstract to a concrete result.

Scripting language: An interpreted programming language that can be executed by a renderer at runtime to process dynamic input and variable state changes made to the scene graph nodes, which affect rendering and evaluation of spatial and temporal object topology (including physical forces, constraints, inverse kinematics, deformation, collisions), and energy propagation and transport (light, sound).

Shader: a type of computer program that was originally used for shading (the production of appropriate levels of light, darkness, and color within an image) but which now performs a variety of specialized functions in various fields of computer graphics special effects or does video post-processing unrelated to shading, or even functions unrelated to graphics at all.

Path Tracing: a computer graphics method of rendering three-dimensional scenes such that the illumination of the scene is faithful to reality.

Timed media: Media that is ordered by time; e.g., with a start and end time according to a particular clock.

Untimed media: Media that is organized by spatial, logical, or temporal relationships; e.g., as in an interactive experience that is realized according to the actions taken by the user(s).

Neural Network Model: a collection of parameters and tensors (e.g., matrices) that define weights (i.e., numerical values) used in well defined mathematical operations applied to the visual signal to arrive at an improved visual output which may include the interpolation of new views for the visual signal that were not explicitly provided by the original signal.

Translation: referring to the process of converting one media format or type, to another media format or type, respectively.

Adaptation: referring to translation and or converting the media into multiple representations of bitrates.

Frame-based media: 2D video with or without associated audio.

Scene-based media: audio, visual, haptic, and other primary types of media and media-related information organized logically and spatially by a use of a scene graph.

In the last decade, a number of immersive media-capable devices have been introduced into the consumer market, including head-mounted displays, augmented-reality glasses, hand-held controllers, multi-view displays, haptic gloves, and game consoles. Likewise, holographic displays and other forms of volumetric displays are poised to emerge into the consumer market within the next three to five years. Despite the immediate or imminent availability of these devices, a coherent end-to-end ecosystem for the distribution of immersive media over commercial networks has failed to materialize for several reasons.

One of the impediments to realizing a coherent end-to-end ecosystem for distribution of immersive media over commercial networks is that the client devices that serve as end-points for such a distribution network for immersive displays are all very diverse. Some of them support certain immersive media formats while others do not. Some of them are capable of creating an immersive experience from legacy raster-based formats, while others cannot. Unlike a network designed only for distribution of legacy media, a network that must support a diversity of display clients needs a significant amount of information pertaining to the specifics of each of the client's capabilities, and the formats of the media to be distributed, before such network can employ an adaptation process to translate the media into a format suitable for each target display and corresponding application. Such a network, at a minimum, would need access to information describing the characteristics of each target display and the complexity of the ingested media in order for the network to ascertain how to meaningfully adapt an input media source to a format suitable for the target display and application. Similarly, a network that is optimized for efficiency may want to maintain a database of the types of media, and their corresponding attributes, that are supported by the client devices attached to such a network.

Likewise, an ideal network supporting heterogeneous client devices can leverage the fact that some of the assets that are adapted from an input media format to a specific target format may be reused across a set of similar display targets. That is, some assets, once converted to a format suitable for a target display may be reused across a number of such displays that have similar adaptation requirements. Therefore, such an ideal network would employ a caching mechanism to store adapted assets into an area that is relatively immutable, i.e., similar to the use of Content Distribution Networks (CDNs) in use for legacy networks.

Moreover, immersive media may be organized into "scenes," e.g., "scene-based media," that are described by scene graphs, which are also known as scene descriptions. The scope of a scene graph is to describe visual, audio, and other forms of immersive assets that comprise a particular setting that is part of a presentation, for example, the actors and events taking place in a particular location in a building that is part of a presentation, e.g., movie. A list of all scenes that comprise a single presentation may be formulated into a manifest of scenes (also referred to as a scene manifest).

An additional benefit of such an approach is that for content that is prepared in advance of having to distribute such content, a "bill of materials" can be created that identifies all of the assets that will be used for the entire presentation, and how often each asset is used across the various scenes within the presentation. An ideal network should have knowledge of the existence of cached resources that can be used to satisfy the asset requirements for a particular presentation. Similarly a client that is presenting a series of scenes may wish to have knowledge about the frequency of any given asset to be used across multiple scenes. For example, if a media asset (also known as an "object") is referenced multiple times across multiple scenes that are or will be processed by the client, then the client should avoid discarding the asset from its caching resources until the last scene that requires that particular asset has been presented by the client.

Furthermore, such a process that may produce a "bill of materials" for a given scene or collection of scenes may also annotate the scene(s) with standardized metadata, e.g., from the IMS of ISO/IEC 23090 Part 28 to facilitate the adaptation of a scene from one format to another format.

Finally, many emerging advanced imaging displays, including but not limited to: Oculus Rift, Samsung Gear VR, Magic Leap goggles, all Looking Glass Factory displays, SolidLight by Light Field Lab, Avalon Holographic displays, and Dimenco displays, utilize game engines as mechanisms by which their respective displays may ingest content to be rendered and presented on the display. Currently, the most popular game engines employed across this aforementioned set of displays includes Unreal Engine by Epic Games, and Unity by Unity Technologies. That is, advanced imaging displays are currently designed and shipped with either one or both of these game engines employed as a mechanism by which the display may acquire media to be rendered and presented by such advanced imaging displays. Both Unreal Engine and Unity are optimized to ingest scene-based as opposed to frame-based media. The existing media distribution ecosystem, however, is capable of streaming only frame-based media. A large "gap" exists in the current media distribution ecosystem, including standards (de jure or defacto) and best practices to enable the distribution of scene-based content to the emerging advanced imaging displays so that media can be delivered "at scale," e.g., at the same scale by which frame-based media is distributed.

In some examples, a mechanism or process that responds to the network server process(es) and participates in the combined network and immersive client architecture can be used, on behalf of the client device on which a game engine is utilized to ingest scene-based media. Such a "smart client" mechanism is especially relevant in a network designed to stream scene-based media to immersive heterogenous and interactive client devices such that the distribution of media is performed efficiently, and within the constraints of the capabilities of the various components that comprise the network as a whole. A "smart client" is associated with a particular client device and responds to the network's requests for information pertaining to the current state of its associated client device, including the availability of resources on the client device for rendering and creating presentations of scene-based media. The "smart client" also serves as an "intermediary" between the client device on which a game engine is employed, and the network itself.

Note that the remainder of the disclosed subject matter assumes, without loss of generality, that a smart client capable of responding on behalf of a particular client device is also capable of responding on behalf of a client device on which one or more other applications (i.e., not the game engine applications) are active. That is, the problem of responding on behalf of a client device is equivalent to the problem of responding on behalf of a client device on which one or more other applications are active.

Further note that the term "media object" and "media asset" may be used interchangeably, both referring to a specific instance of a specific format of media. The term client device or client (without any qualification) refers to the device and its constituent components on which the presentation of the media is ultimately performed. The term "game engine" refers to Unity or Unreal Engine, or any game engine that serves a role in a distribution network architecture.

In some examples, a mechanism or process that analyzes an immersive media scene to obtain sufficient information that can be used to support a decision making process can be used by a network or a client device. When the mechanism or process is employed by a network or a client, the mechanism or process can provide an indication as to whether the transformation of a media object (or media asset) from a Format A to a Format B should be performed either entirely by the network, entirely by the client, or via a mixture of both (along with an indication of which assets should be transformed by the client or network). Such an "immersive media data complexity analyzer" (also referred to as media analyzer in some examples) may be employed by either a client device or a network device in an automated context.

Referring back to FIG. 1, the media flow process 100 demonstrates the flow of media through the network 104 or distribution to the client device 108 on which a game engine is employed. In FIG. 1, processing of an ingest media format A is performed by processing in a cloud or edge devices 104.

At 101, the media is obtained from a content provider (not shown). A process step 102 performs any necessary transformations or conditioning of the ingested media to create a potentially alternative representation of the media as a distribution format B. Media formats A and B may or may not be representations following the same syntax of a particular media format specification, however the format B is likely to be conditioned into a scheme that facilitates the distribution of the media over a network protocol such as TCP or UDP. Such "streamable" media is depicted to be streamed via network connection 105 as media that is streamed to the client device 108. The client device 108 may have access to some rendering capabilities depicted as 106. Such render capabilities 106 may be rudimentary or likewise, sophisticated, depending on the type of the client device 108 and game engine that is operating on the client device. Render process 106 creates presentation media that may or may not be represented according to a third format specification, e.g., Format C. In some examples, in a client device that employs a game engine, render process 106 is typically a function provided by the game engine.

Referring to FIG. 2, the media transform decision making process 200 can be employed to determine if the network needs to transform the media prior to distributing the media to a client device. In FIG. 2, the ingested media 201 represented in format A is provided by a content provider (not depicted) to the network. The process step 202 acquires attributes that describe the processing capabilities of targeted client (not depicted). Decision making process step 203 is employed to determine if the network or the client should perform any format conversions for any of the media assets contained within the ingested media 201, e.g., such as a conversion of a particular media object from a format A to a format B, prior to the media being streamed to the client. If any of the media assets needs to be transformed by the network, then the network employs process step 204 to transform the media object from format A to format B. The transformed media 205 is the output from process step 204. The transformed media is merged into the preparation process 206 to prepare the media to be streamed to the game engine client (not shown). The process step 207 streams the prepared media to the game engine client for example.

Figure 3:
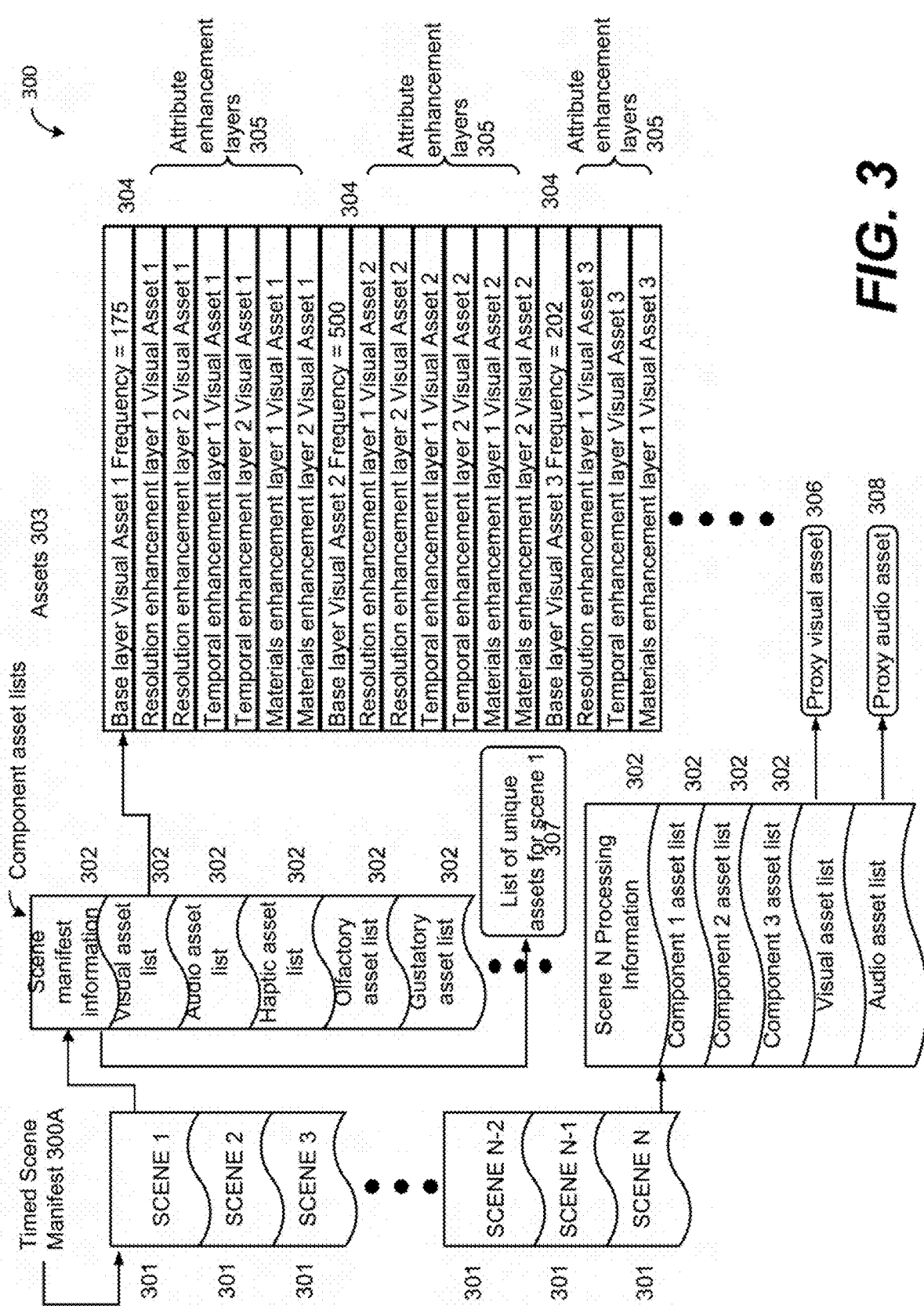
FIG. 3 shows a representation of a format for heterogenous immersive media that is timed in an example.
Figure 4:
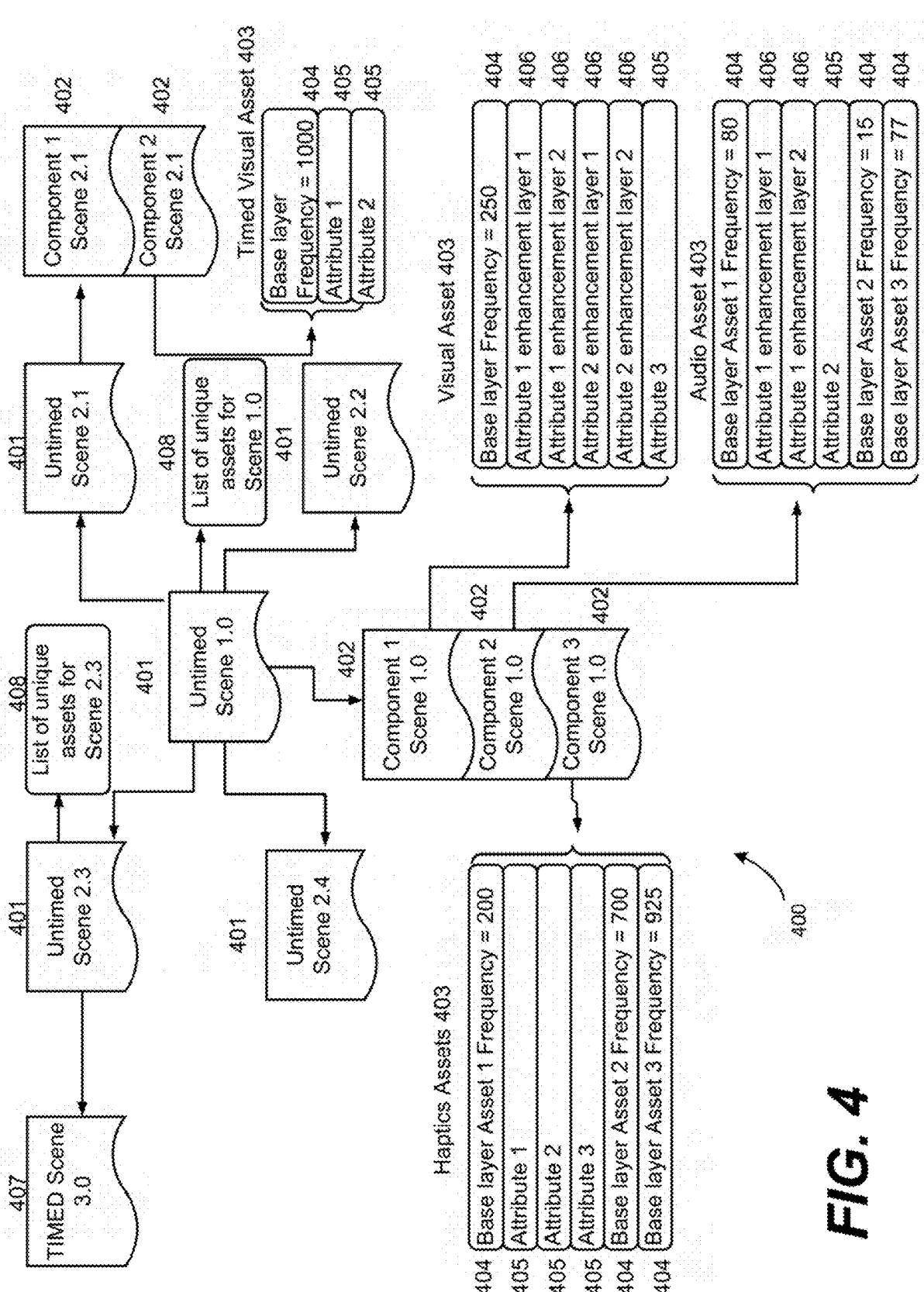
FIG. 4 shows a representation of a streamable format for heterogeneous immersive media that is untimed in an example.

FIG. 3 shows a representation of a streamable format 300 for heterogenous immersive media that is timed in an example; and FIG. 4 shows a representation of a streamable format 400 for heterogeneous immersive media that is untimed in an example. In the case of FIG. 3, FIG. 3 refers to a scene 301 for timed media. In the case of FIG. 4, FIG. 4 refers to a scene 401 for untimed media. For both cases, a scene may be embodied by various scene representations, or scene descriptions.

For example, in some immersive media designs, a scene may be embodied by a scene graph, or as a multi-plane image (MPI), or as a multi-spherical image (MSI). Both the MPI and MSI techniques are examples of technologies that aid in the creation of display-agnostic scene representations for natural content, i.e., images of the real world captured simultaneously from one or more cameras. Scene graph technologies, on the other hand, may be employed to represent both natural and computer-generated imagery in the form of synthetic representations, however, such representations are especially compute-intensive to create for the case when the content is captured as natural scenes by one or more cameras. That is, scene graph representations of naturally-captured content are both time and compute-intensive to create, requiring complex analysis of natural images with techniques of photogrammetry or deep learning or both, in order to create synthetic representations that can subsequently be used to interpolate sufficient and adequate numbers of views to fill a target immersive client display's viewing frustum. As a result, such synthetic representations are presently impractical to consider as candidates for representing natural content, because they cannot practically be created in real-time for consideration of use cases that require real-time distribution. In some examples, the best candidate representations for computer generated imagery is to employ the use of a scene graph with synthetic models, as computer generated imagery is created using 3D modeling processes and tools.

Such a dichotomy in optimal representations of both natural and computer generated content suggests that the optimal ingest format for naturally-captured content is different from the optimal ingest format for computer generated content or for natural content that is not essential for real-time distribution applications. Therefore, the disclosed subject matter targets to be robust enough to support multiple ingest formats for visually immersive media, whether they are created naturally through the use of physical cameras or by a computer.

The following are example technologies that embody scene graphs as a format suitable for representing visual immersive media that is created using computer generated techniques, or naturally captured content for which deep learning or photogrammetry techniques are employed to create the corresponding synthetic representations of a natural scene, i.e., not essential for real-time distribution applications.

1. ORBX® by OTOY

ORBX by OTOY is one of several scene graph technologies that is able to support any type of visual media, timed or untimed, including ray-traceable, legacy (frame-based), volumetric, and other types of synthetic or vector-based visual formats. According to an aspect, ORBX is unique from other scene graphs because ORBX provides native support for freely available and/or open source formats for meshes, point clouds, and textures. ORBX is a scene graph that has been intentionally designed with the goal of facilitating interchange across multiple vendor technologies that operate on scene graphs. Moreover, ORBX provides a rich materials system, support for open shader language, a robust camera system, and support for Lua scripts. ORBX is also the basis of the immersive technologies media format published for license under royalty-free terms by the immersive digital experiences alliance (IDEA). In the context of real time distribution of media, the ability to create and distribute an ORBX representation of a natural scene is a function of the availability of compute resources to perform a complex analysis of the camera-captured data and synthesis of the same data into synthetic representations. To date, the availability of sufficient compute for real-time distribution is not practical, but nevertheless, not impossible.

2. Universal Scene Description by Pixar

Universal scene description (USD) by Pixar is another scene graph that can be used in the visual effects (VFX) and professional content production communities. USD is integrated into Nvidia's Omniverse platform which is a set of tools for developers for 3D model creation and rendering with Nvidia's GPUs. A subset of USD was published by Apple and Pixar as USDZ. USDZ is supported by Apple's ARKit.

3. glTF2.0 by Khronos glTF2.0 is the most recent version of the graphics language transmission format specification written by the Khronos 3D Group. This format supports a simple scene graph format that is generally capable of supporting static (un-timed) objects in scenes, including "png" and "jpeg" image formats. glTF2.0 supports simple animations, including support for translate, rotate, and scale, of basic shapes described using the glTF primitives, i.e. for geometric objects. glTF2.0 does not support timed media, and hence does not support video nor audio.

4. ISO/IEC 23090 Part 14 Scene Description is an Extension of glTF2.0 that Adds Support for Timed Media, e.g., Video and Audio.

It is noted that the above scene representations of immersive visual media are provided for example only, and do not limit the disclosed subject matter in its ability to specify a process to adapt an input immersive media source into a format that is suitable to the specific characteristics of a client end-point device.

Moreover, any or all of the above example media representations either currently employ or may employ deep learning techniques to train and create a neural network model that enables or facilitates the selection of specific views to fill a particular display's viewing frustum based on the specific dimensions of the frustum. The views that are chosen for the particular display's viewing frustum may be interpolated from existing views that are explicitly provided in the scene representation, e.g., from the MSI or MPI techniques, or they may be directly rendered from render engines based on specific virtual camera locations, filters, or descriptions of virtual cameras for these render engines.

The disclosed subject matter is therefore robust enough to consider that there is a relatively small but well known set of immersive media ingest formats that is sufficiently capable to satisfy requirements both for real-time or "on-demand" (e.g., non-real-time) distribution of media that is either captured naturally (e.g., with one or more cameras) or created using computer generated techniques.

Interpolation of views from an immersive media ingest format by use of either neural network models or network-based render engines is further facilitated as advanced network technologies such as 5G for mobile networks, and fiber optical cable for fixed networks are deployed. That is, these advanced network technologies increase the capacity and capabilities of commercial networks because such advanced network infrastructures can support transport and delivery of increasingly larger amounts of visual information. Network infrastructure management technologies such as multi-access edge computing (MEC), software defined networks (SDN), and network functions virtualization (NFV), enable commercial network service providers to flexibly configure their network infrastructure to adapt to changes in demand for certain network resources, e.g., to respond to dynamic increases or decreases in demand for network throughputs, network speeds, roundtrip latency, and compute resources. Moreover, this inherent ability to adapt to dynamic network requirements likewise facilitates the ability of networks to adapt immersive media ingest formats to suitable distribution formats in order to support a variety of immersive media applications with potentially heterogenous visual media formats for heterogenous client end-points.

Immersive media applications themselves may also have varying requirements for network resources including gaming applications which require significantly lower network latencies to respond to real-time updates in the state of the game, telepresence applications which have symmetric throughput requirements for both the uplink and downlink portions of the network, and passive viewing applications that may have increased demand for downlink resources depending on the type of client end-point display that is consuming the data. In general, any consumer-facing application may be supported by a variety of client end-points with various onboard-client capabilities for storage, compute, and power, and likewise various requirements for particular media representations.

The disclosed subject matter therefore enables a sufficiently equipped network, i.e., a network that employs some or all of the characteristics of a modern network, to simultaneously support a plurality of legacy and immersive media-capable devices according to features that are specified within that:

1. Provide flexibility to leverage media ingest formats that are practical for both real-time and on demand use cases for the distribution of media.

2. Provide flexibility to support both natural and computer generated content for both legacy and immersive-media capable client end-points.

3. Support both timed and untimed media.

4. Provide a process for dynamically adapting a source media ingest format to a suitable distribution format based on the features and capabilities of the client end-point, as well as based on the requirements of the application.

5. Ensure that the distribution format is streamable over IP-based networks.

6. Enable the network to simultaneously serve a plurality of heterogenous client end-points that may include both legacy and immersive media-capable devices and applications.

7. Provide an exemplary media representation framework that facilitates the organization of the distribution media along scene boundaries.

An end-to-end embodiment of the improvements enabled by the disclosed subject matter is achieved according to the processing and components described in the following detailed description.

FIG. 3 and FIG. 4 respectively employ an exemplary encompassing distribution format that can be adapted from an ingest source format to match the capabilities of a specific client end-point. As described above, the media that is shown in FIG. 3 is timed and the media that is shown in FIG. 4 is untimed. The specific encompassing format is robust enough in its structure to accommodate a large variety of media attributes that each may be layered based on the amount of salient information that each layer contributes to the presentation of the media. It is noted that the layering process can be applied in, for example progressive JPEG and scalable video architectures (e.g., specified in ISO/IEC 14496-10 Scalable Advanced Video Coding).

According to an aspect, the media that is streamed according to the encompassing media format is not limited to legacy visual and audio media, but may include any type of media information that is capable of producing a signal that interacts with machines to stimulate the human senses for sight, sound, taste, touch, and smell.

According to another aspect, the media that is streamed according to the encompassing media format can be both timed or untimed media, or a mixture of both.

According to another aspect, the encompassing media format is furthermore streamable by enabling a layered representation for media objects by use of a base layer and enhancement layer architecture. In one example, the separate base layer and enhancement layers are computed by application of multi-resolution or multi-tesselation analysis techniques for media objects in each scene. This is analogous to the progressively rendered image formats specified in ISO/IEC 10918-1 (JPEG), and ISO/IEC 15444-1

(JPEG2000), but not limited to raster-based visual formats. In an example, a progressive representation for a geometric object could be a multi-resolution representation of the object computed using wavelet analysis.

In another example of the layered representation of the media format, the enhancement layers apply different attributes to the base layer, such as refining the material properties of the surface of a visual object that is represented by the base layer. In yet another example, the attributes may refine the texture of the surface of the base layer object, such as changing the surface from a smooth to a porous texture, or from a matted surface to a glossy surface.

In yet another example of the layered representation, the surfaces of one or more visual objects in the scene may be altered from being Lambertian to being ray-traceable.

In yet another example of the layered representation, the network will distribute the base-layer representation to the client so that the client may create a nominal presentation of the scene while the client awaits the transmission of additional enhancement layers to refine the resolution or other characteristics of the base representation.

According to another aspect, the resolution of the attributes or refining information in the enhancement layers is not explicitly coupled with the resolution of the object in the base layer as it is today in existing MPEG video and JPEG image standards.

According to another aspect, the encompassing media format supports any type of information media that can be presented or actuated by a presentation device or machine, thereby enabling the support of heterogenous media formats to heterogenous client end-points. In one embodiment of a network that distributes the media format, the network will first query the client end-point to determine the client's capabilities, and if the client is not capable of meaningfully ingesting the media representation then the network will either remove the layers of attributes that are not supported by the client, or adapt the media from its current format into a format that is suitable for the client end-point. In one example of such adaptation, the network would convert a volumetric visual media asset into a 2D representation of the same visual asset, by use of a Network-Based Media Processing protocol. In another example of such adaptation, the network may employ a neural network process to reformat the media to an appropriate format or optionally synthesize views that are needed by the client end-point.

According to another aspect, the manifest for a complete or partially-complete immersive experience (live streaming event, game, or playback of on-demand asset) is organized by scenes which is the minimal amount of information that rendering and game engines can currently ingest in order to create a presentation. The manifest includes a list of the individual scenes that are to be rendered for the entirety of the immersive experience requested by the client. Associated with each scene are one or more representations of the geometric objects within the scene corresponding to streamable versions of the scene geometry. One embodiment of a scene representation refers to a low resolution version of the geometric objects for the scene. Another embodiment of the same scene refers to an enhancement layer for the low resolution representation of the scene to add additional detail, or increase tessellation, to the geometric objects of the same scene. As described above, each scene may have more than one enhancement layer to increase the detail of the geometric objects of the scene in a progressive manner.

According to another aspect, each layer of the media objects that are referenced within a scene is associated with a token (e.g., URI) that points to the address of where the resource can be accessed within the network. Such resources are analogous to CDN's where the content may be fetched by the client.

According to another aspect, the token for a representation of a geometric object may point to a location within the network or to a location within the client. That is, the client may signal to the network that its resources are available to the network for network-based media processing.

FIG. 3 shows a timed media representation 300 in some examples. The timed media representation 300 describes an example of the encompassing media format for timed media. A timed scene manifest 300A includes a list of scene information 301. A scene information 301 refers to a list of components 302 that separately describe processing information and types of media assets that are in the scene information 301. The components 302 refer to assets 303 that further refer to base layers 304 and attribute enhancement layers 305. In the FIG. 3 example, each of the base layers 304 refer to a numeric frequency metric that indicates the number of times the asset is used across the set of scenes in the presentation. A list of unique assets that have not been previously used in other scenes is provided in 307. Proxy visual asset 306 includes information of reused visual asset, such as a unique identifier of the reused visual asset, and proxy audio asset 308 includes information of reused audio asset, such as a unique identifier of the reused audio asset.

FIG. 4 shows an untimed media representation 400 in some examples. The untimed media representation 400 describes an example of the encompassing media format for untimed media. An untimed scene manifest (not depicted) references a Scene 1.0 for which there is no other scene that can branch to Scene 1.0. The scene information 401 is not associated with a start and end duration according to a clock. The scene information 401 refers to a list of components 402 that separately describe processing information and types of media assets that comprise the scene. The components 402 refer to assets 403 that further refer to base layers 404 and attribute enhancement layers 405 and 406. In the FIG. 4 example, each of the base layers 404 refer to a numeric frequency value that indicates the number of times the asset is used across the set of scenes in the presentation. Furthermore, the Scene Information 401 can refer to other Scenes Information 401 that are for untimed media. The Scene Information 401 can also refer to Scene Information 407 that is for a timed media scene. Lists 408 identify unique assets associated with a particular scene that have not been previously used in higher order (e.g., parent) scenes.

Figure 5:
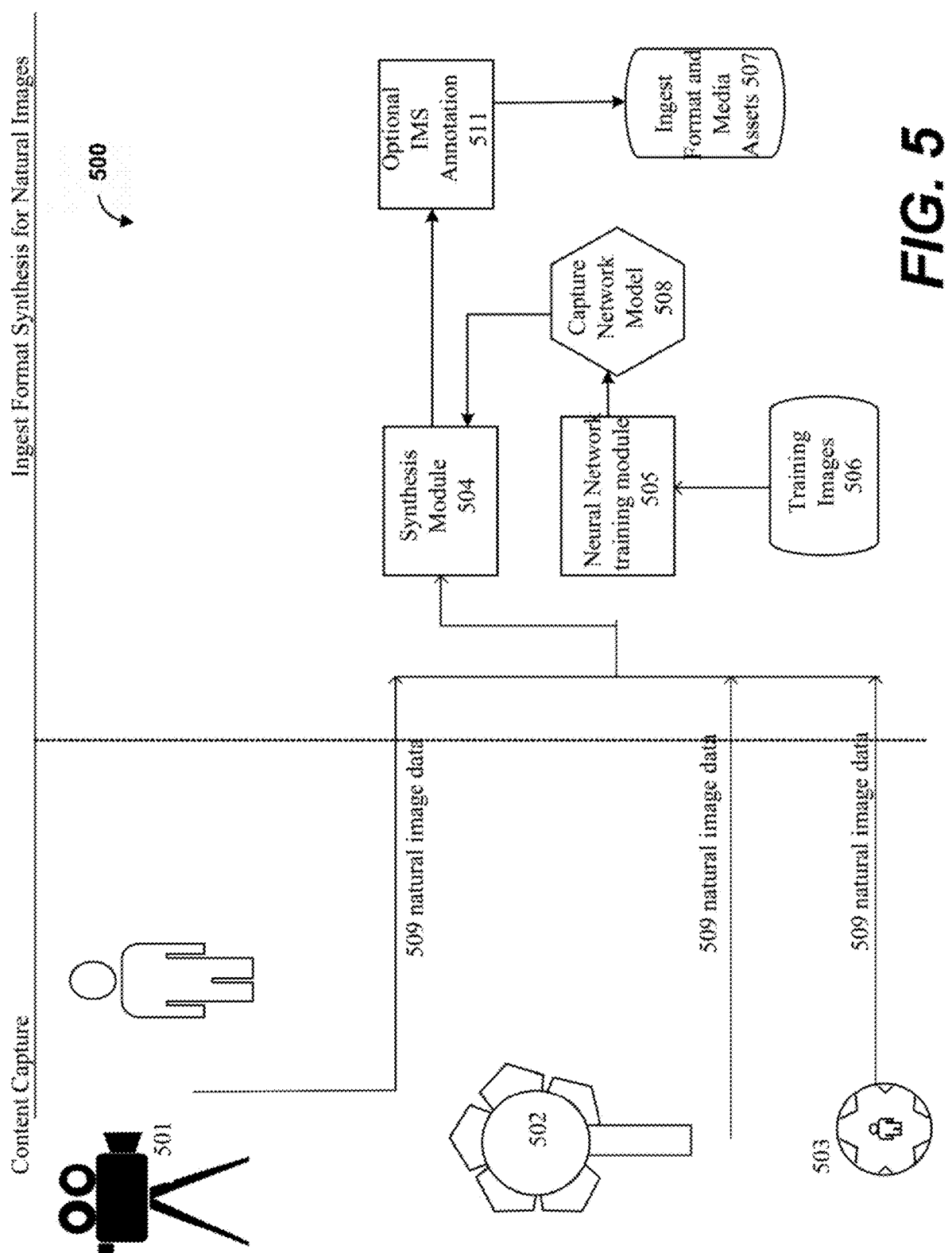
FIG. 5 shows a diagram of process to synthesize media into an ingest format from natural content in some examples.

FIG. 5 shows a diagram of process 500 to synthesize an ingest format from natural content. The process 500 includes a first sub-process for content capture and a second sub-process of ingest format synthesis for natural images.

In the FIG. 5 example, in the first sub-process, camera unit can be used to capture natural image content 509. For example, camera unit 501 can use a single camera lens to capture a scene of a person. Camera unit 502 can capture a scene with five diverging fields of view by mounting five camera lenses around a ring-shaped object. The arrangement in the camera unit 502 is an exemplary arrangement for capturing omnidirectional content for VR applications. Camera unit 503 captures a scene with seven converging fields of view by mounting seven camera lenses on the inner diameter portion of a sphere. The arrangement in the camera unit 503 is an exemplary arrangement for capturing light fields for light field or holographic immersive displays.

In the FIG. 5 example, in the second sub-process, the natural image content 509 is synthesized. For example, the natural image content 509 is provided as input to a synthesis module 504 that may, in an example, employ a neural network training module 505 using a collection of training images 506 to produce a capture neural network model 508. Another process commonly used in lieu of training process is photogrammetry. If the model 508 is created during process 500 depicted in FIG. 5, then the model 508 becomes one of the assets in the ingest format 507 for the natural content. In some examples, an annotation Process 511 may optionally be performed to annotate scene-based media with IMS metadata. Exemplary embodiments of the ingest format 507 include MPI and MSI.

Figure 6:
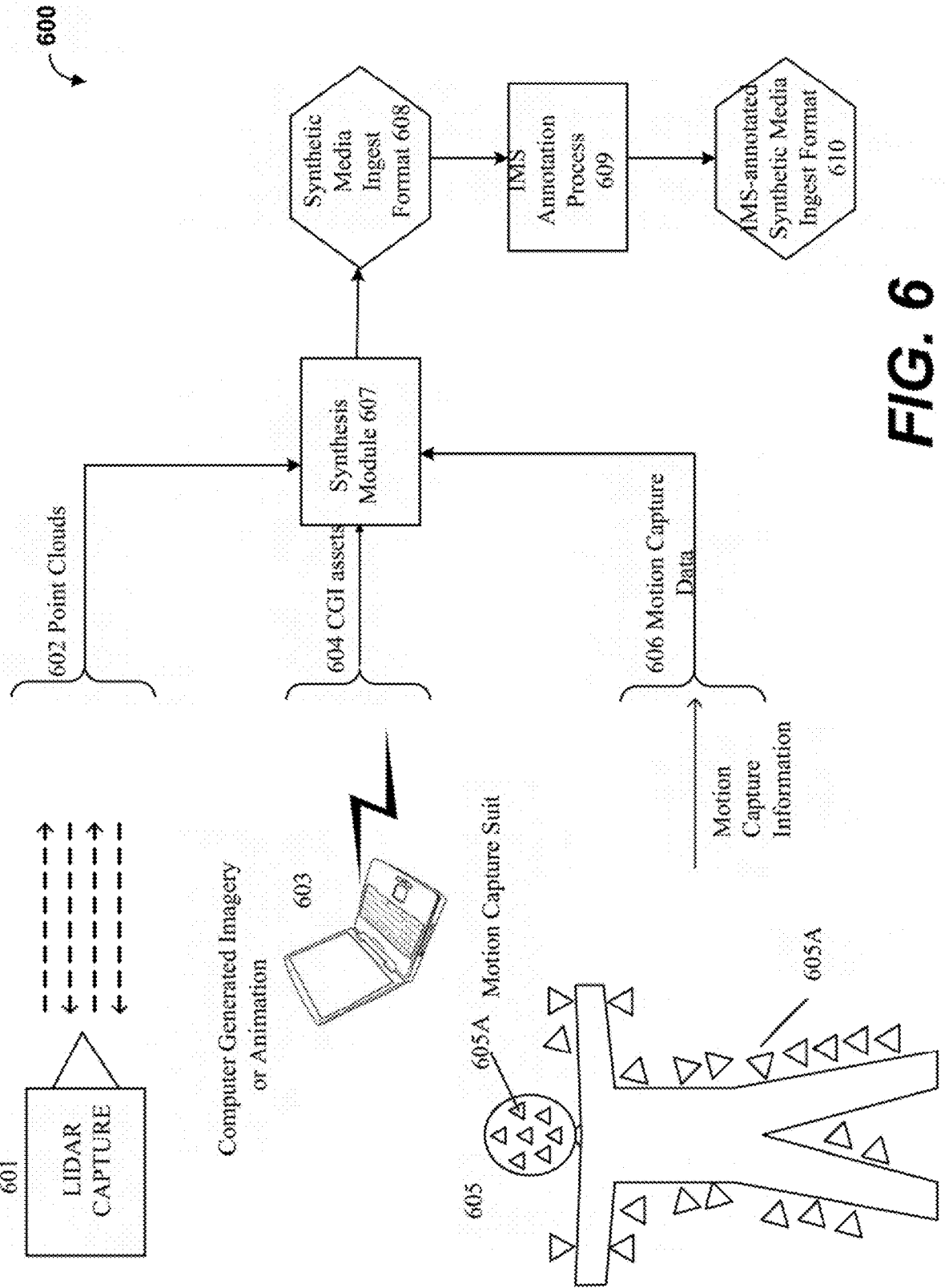
FIG. 6 shows a diagram of a process to create an ingest format for synthetic media in some examples.

FIG. 6 shows a diagram of a process 600 to create an ingest format for synthetic media 608, e.g., computer-generated imagery. In the FIG. 6 example, LIDAR camera 601 captures point clouds 602 of a scene. Computer-generated imagery (CGI) tools, 3D modelling tools, or another animation processes to create synthetic content are employed on computer 603 to create 604 CGI assets over a network. Motion capture suit with sensors 605A are worn on actor 605 to capture a digital recording of the motion for actor 605 to produce animated motion capture (MoCap) Data 606. Data 602, 604, and 606 are provided as input to a synthesis module 607 which likewise may, for example, use a neural network and training data to create a neural network model (not shown in FIG. 6). In some examples, the synthesis module 607 outputs the synthetic media 608 of the ingest format. The synthetic media 6608 of the ingest format may then be input into an optional IMS annotation process 609 whose output is IMS-annotated Synthetic Media 610 of the Ingest Format.

The techniques for representing, streaming and processing heterogeneous immersive media in the present disclosure can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
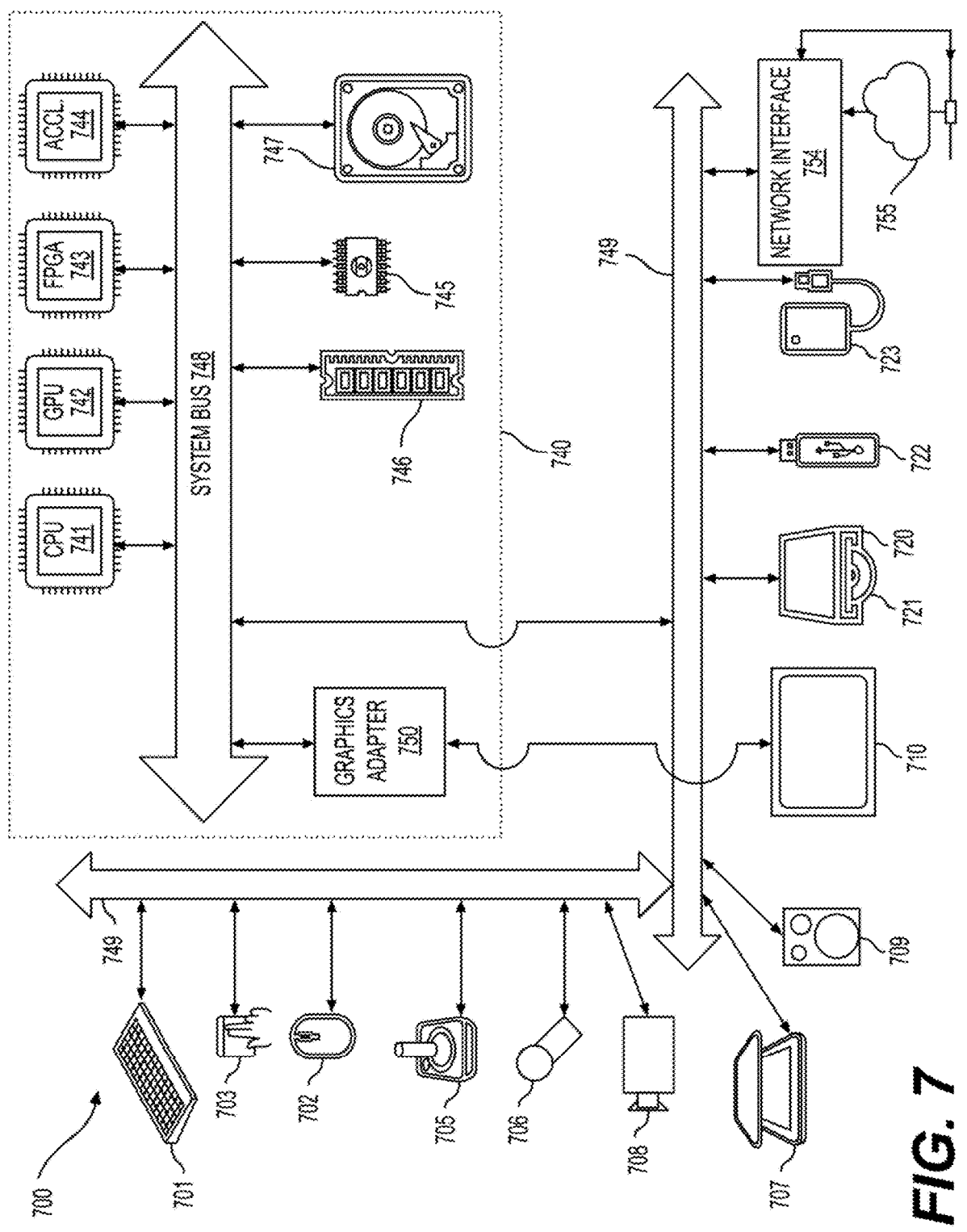
FIG. 7 is a schematic illustration of a computer system in accordance with an embodiment.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove (not shown), joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove (not shown), or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW (720) with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include an interface 754 to one or more communication networks 755. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 749 (such as, for example USB ports of the computer system 700); others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks (744), graphics adapters 750, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. In an example, the screen 710 can be connected to the graphics adapter 750. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Figure 8:
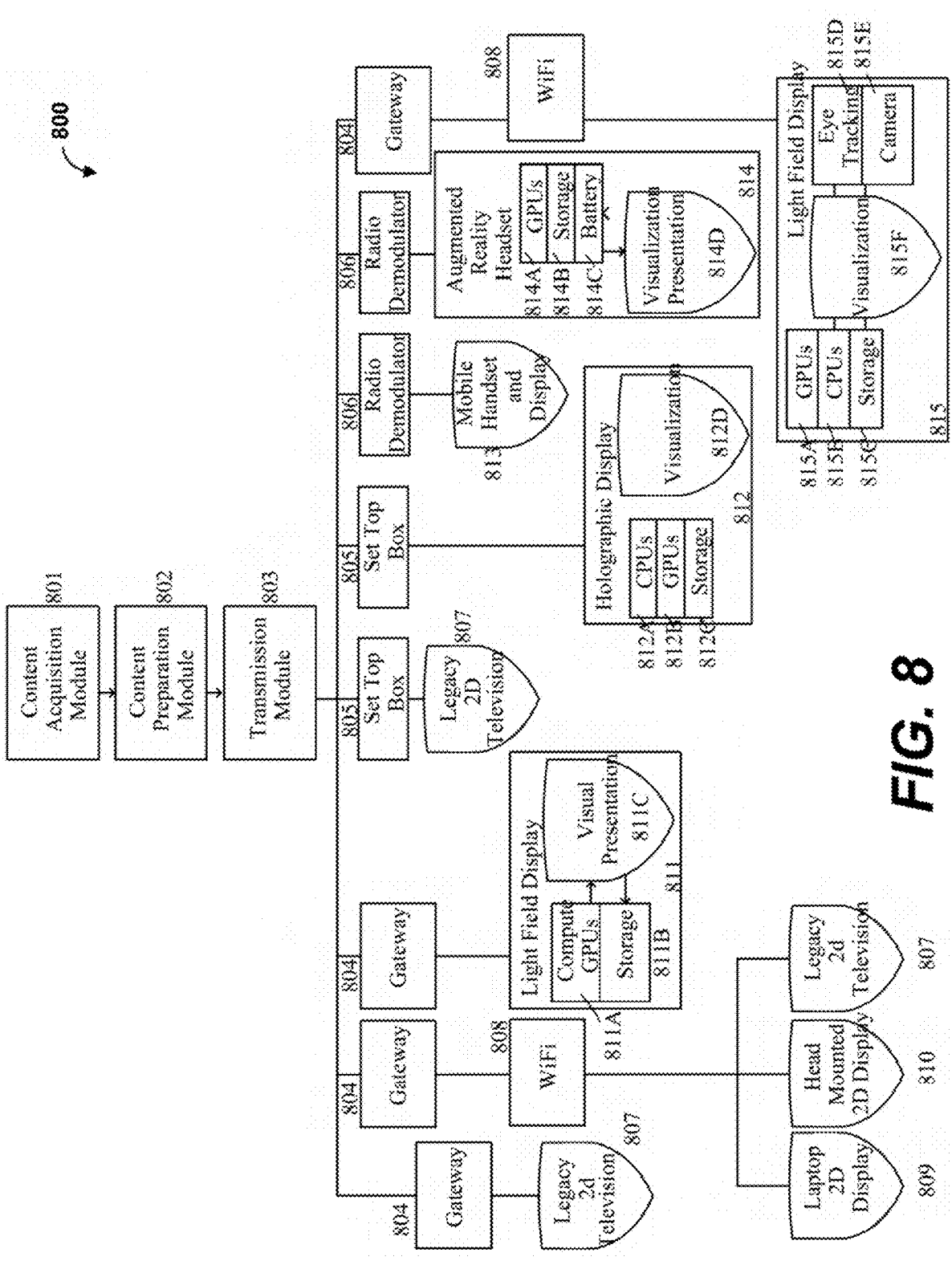
FIG. 8 shows a network media distribution system that supports a variety of legacy and heterogenous immersive-media capable displays as client end-points in some examples.

FIG. 8 shows a network media distribution system 800 that supports a variety of legacy and heterogenous immersive-media capable displays as client end-points in some examples. In the FIG. 8 example, content acquisition module 801 captures or creates the media using example embodiments in FIG. 6 or FIG. 5. Ingest formats are created in content preparation module 802 and then are transmitted to one or more client end-points in a network media distribution system using transmission module 803. Gateways 804 may serve customer premise equipment to provide network access to various client end-points for the network. Set top boxes 805 may also serve as customer premise equipment to provide access to aggregated content by the network service provider. Radio demodulators 806 may serve as mobile network access points for mobile devices (e.g., as with mobile handset and displays 813). In one or more embodiments, legacy 2D televisions 807 may be directly connected to gateways 804, set-top boxes 805, or WiFi routers 808. A computer laptop with a legacy 2D display 809 may be a client end-point connected to a WiFi router 808. A head mounted 2D (raster-based) display 810 may also connected to a router 808. A Lenticular light field display 811 may be connected to a gateway 804. The display 811 may be comprised of local compute GPUs 811A, storage devices 811B, and a visual presentation unit 811C that creates multiple views using a ray-based lenticular optical technology. A Holographic Display 812 may be connected to a set top box 805 and may include local compute CPUs 812A, GPUs 812B, storage devices 812C, and a Fresnal pattern, wave-based holographic visualization unit 812D. An augmented reality headset 814 may be connected to a radio demodulator 806 and may include a GPU 814A, a storage device 814B, a battery 814C, and a volumetric visual presentation component 814D. A dense light field display 815 may be connected to a WiFi router 808 and may include multiple GPUs 815A, CPUs 815B, and storage devices 815C; an eye tracking device 815D; a camera 815E; and a dense ray-based light field panel 815F.

Figure 9:
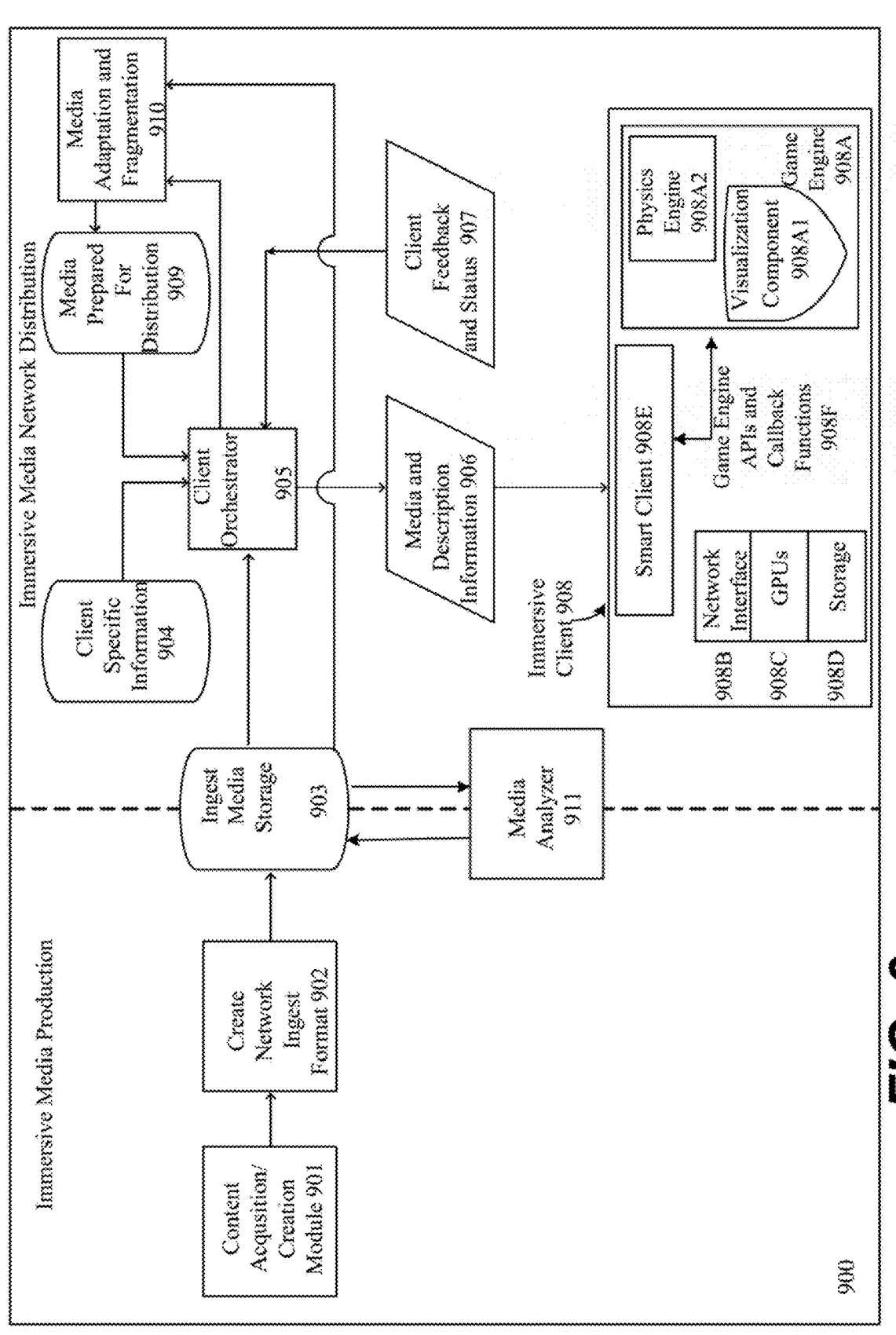
FIG. 9 shows a diagram of an immersive media distribution module that is capable of serving legacy and heterogenous immersive media-capable displays in some examples.

FIG. 9 shows a diagram of an immersive media distribution module 900 that is capable of serving legacy and heterogenous immersive media-capable displays as previously depicted in FIG. 8. Content is either created or acquired in module 901, which is embodied in FIG. 5 and FIG. 6 for natural and CGI content respectively. Content is then converted into an ingest format using the create network ingest format module 902. Some examples of the module 902 are embodied in FIG. 5. and FIG. 6 for natural and CGI content respectively. In some examples, a media analyzer 911 can perform suitable media analysis on the ingest media, and the injected media may be updated to store information from the media analyzer 911. In an example, the ingest media is updated to annotated with IMS metadata by a scene analyzer with optional IMS notation in the media analyzer 911. The ingest media format is transmitted to the network and stored on storage device 903. In some other examples, the storage device may reside in the immersive media content producer's network, and accessed remotely by the immersive media network distribution module 900 as depicted by the dashed line that bisects. Client and application specific information is, in some examples, available on a remote storage device 904, which may optionally exist remotely in an alternate cloud network in an example.

As depicted in FIG. 9, a network orchestrator 905 serves as the primary source and sink of information to execute the major tasks of the distribution network. In this particular embodiment, the network orchestrator 905 may be implemented in unified format with other components of the network. Nevertheless the tasks depicted by network orchestrator 905 in FIG. 9 form elements of the disclosed subject matter in some examples. The network orchestrator 905 can be implemented in software, and can be executed by processing circuitry to perform a process.

According to some aspects of the disclosure, the network orchestrator 905 may further employ a bidirectional message protocol for communication with client devices to facilitate processing and distribution of the media (e.g., immersive media) in accordance with the characteristics of the client devices. Furthermore, the bi-directional message protocol may be implemented across different delivery channels, i.e., a control plane channel and a data plane channel.

The network orchestrator 905 receives information about the features and attributes of client devices, such as a client 908 (also referred to as client device 908) in FIG. 9, and furthermore collects requirements regarding the application currently running on the client 908. This information may be obtained from the device 904, or in an alternate embodiment, may be obtained by directly querying the client 908. In some examples, a bidirectional message protocol is used to enable direct communication between the network orchestrator 905 and the client 908. For example, the network orchestrator 905 can send a direct query to the client 908. In some examples, a smart client 908E can participate in the gathering and reporting of client status and feedback on behalf of the client 908. The smart client 908E can be implemented in software that can be executed by processing circuitry to perform a process.

The network orchestrator 905 also initiates and communicates with media adaptation and fragmentation module 910 which will be described in FIG. 10. As ingest media is adapted and fragmented by the module 910, the media is, in some examples, transferred to an *intermedia* storage device depicted as the media prepared for distribution storage device 909. As the distribution media is prepared and stored in device 909, the network orchestrator 905 ensures that immersive client 908, via its network interface 908B, either receives the distribution media and corresponding descriptive information 906 either through a push request, or client 908 itself may initiate a pull request of the media 906 from storage device 909. In some examples, the network orchestrator 905 may employ a bi-directional message interface (not shown in FIG. 9) to perform the "push" request or to initiate a "pull" request by the immersive client 908. In an example, the immersive client 908 can employ the network interface 908B, GPUs (or CPUs not shown) 908C, and storage 908D. Furthermore, Immersive Client 908 may employ a game engine 908A. The game engine 908A may further employ visualization component 908A1 and a physics engine 908A2. The game engine 908A communicates with the smart client 908E to collectively orchestrate the processing of the media via game engine APIs and callback functions 908F. The distribution format of the media is stored in the client 908's storage device or storage cache 908D. Finally, the client 908 visually presents the media via the visualization component 908A1.

Throughout the process of streaming the immersive media to the immersive client 908, the network orchestrator 905 can monitor the status of the client's progress via client progress and status feedback channel 907. The monitoring of status may be performed by means of a bi-directional communication message interface (not shown in FIG. 9), which may be implemented in the smart client 908E.

Figure 10:
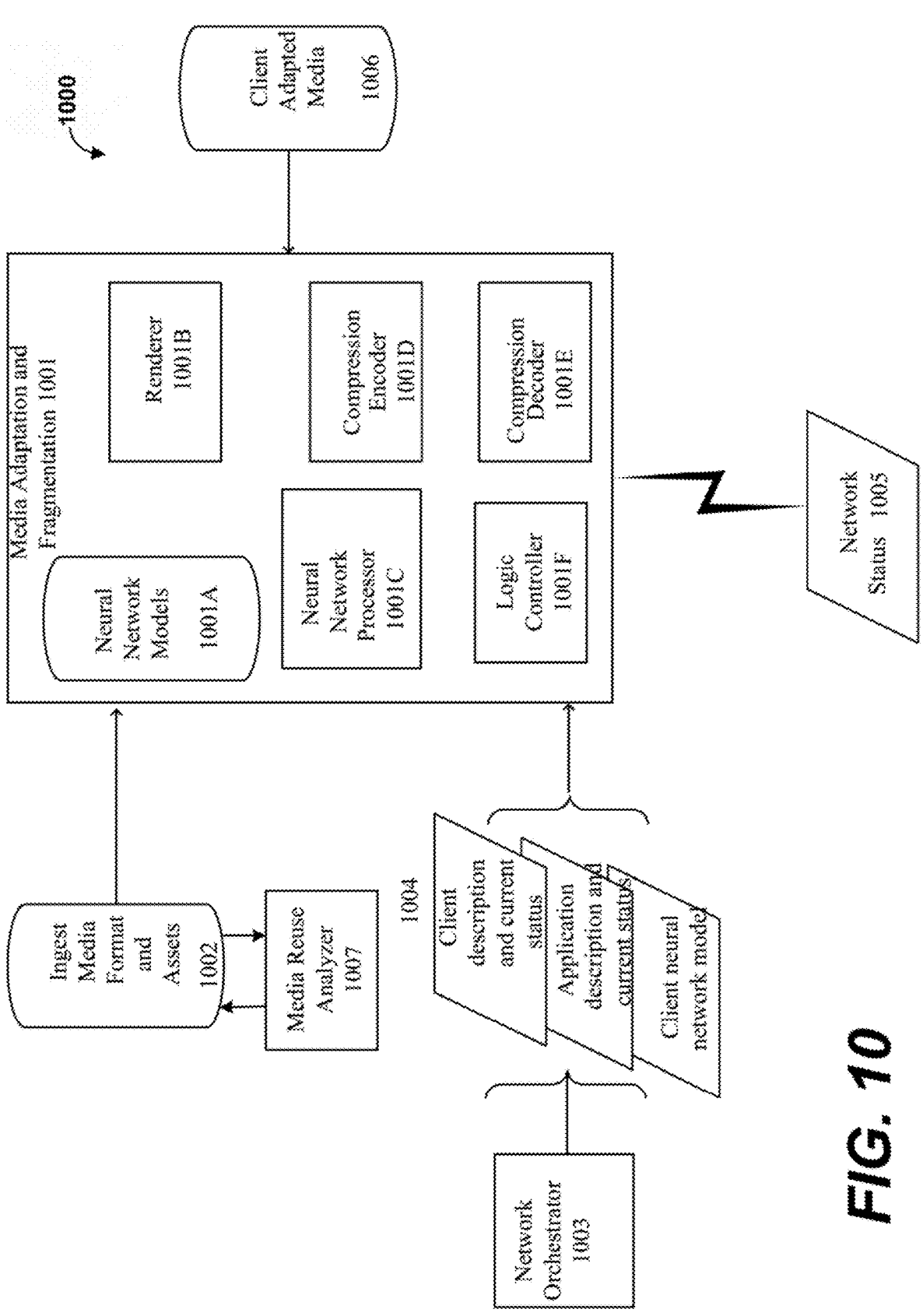
FIG. 10 shows a diagram of a media adaptation process in some examples.

FIG. 10 depicts a diagram of a media adaptation process 1000 so that the ingested source media may be appropriately adapted to match the requirements of the immersive client 908 in some examples. A media adaptation and fragmentation module 1001 is comprised of multiple components that facilitate the adaptation of the ingest media into an appropriate distribution format for immersive client 908. In FIG. 10, the media adaptation and fragmentation module 1001 receives input network status 1005 to track the current traffic load on the network. The immersive client 908 information can include attributes and features description, application features and description as well as application current status, and a client neural network model (if available) to aid in mapping the geometry of the client's frustum to the interpolation capabilities of the ingest immersive media. Such information may be obtained by means of a bi-directional message interface (not shown in FIG. 10) with the aid of a smart client interface shown as 908E in FIG. 9. The media adaptation and fragmentation module 1001 ensures that the adapted output, as it is created, is stored into a client-adapted media storage device 1006. A media analyzer 1007 is depicted in FIG. 10 as a process that may be executed a priori or as part of the network automated process for the distribution of the media. In some examples, the media analyzer 1007 includes a scene analyzer with optional IMS notation function.

In some examples, the network orchestrator 1003 initiates an adaptation process 1001. The media adaptation and fragmentation module 1001 is controlled by a logic controller 1001F. In an example, the media adaptation and fragmentation module 1001 employs a renderer 1001B or a neural network processor 1001C to adapt the specific ingest source media to a format that is suitable for the client. In an example, the media adaptation and fragmentation module 1001 receives client information 1004 from a client interface module 1003, such as a server device in an example. The client information 1004 can include client description and current status, can application description and the current status, and can include client neural network model. The neural network processor 1001C uses neural network models 1001A. Examples of such a neural network processor 1001C include the deepview neural network model generator as described in MPI and MSI. In some examples, the media is in a 2D format, but the client requires a 3D format, then the neural network processor 1001C can invoke a process to use highly correlated images from a 2D video signal to derive a volumetric representation of the scene depicted in the video. An example of such a process could be the neural radiance fields from one or few images process developed at the University of California, Berkley. An example of a suitable renderer 1001B could be a modified version of the OTOY Octane renderer (not shown) which would be modified to interact directly with the media adaptation and fragmentation module 1001. The media adaptation and fragmentation module 1001 may, in some examples, employ media compressors 1001D and media decompressors 1001E depending on the need for these tools with respect to the format of the ingest media and the format required by immersive client 908.

Figure 11:
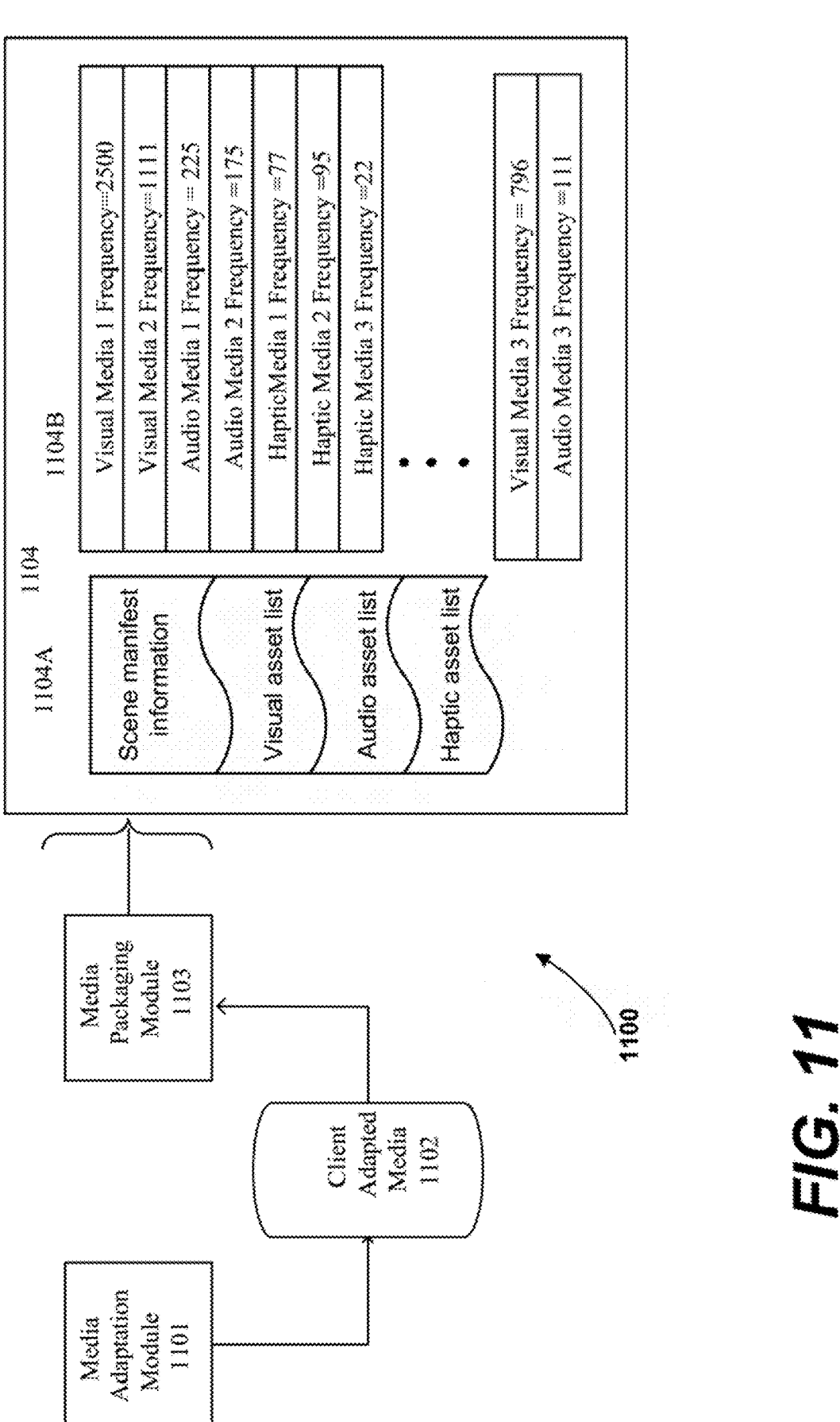
FIG. 11 depicts a distribution format creation process in some examples.

FIG. 11 depicts a distribution format creation process 1100 in some examples. An adapted media packaging module 1103 packages media from media adaptation module 1101 (depicted as process 1000 in FIG. 10) now residing on client adapted media storage device 1102. The packaging module 1103 formats the adapted media from media adaption module 1101 into a robust distribution format 1104, for example, the exemplary formats shown in FIG. 3 or FIG. 4.

Manifest information 1104A provides client 908 with a list of scene data assets 1104B that it can expect to receive as well as optional metadata describing the frequency by each asset is used across the set of scenes comprising the presentation. List 1104B depicts a list of visual assets, audio assets, and haptic assets, each with their corresponding metadata. In this exemplary embodiment, each of the assets in list 1104B references metadata that contains a numeric frequency value that indicates the number of times that a particular asset is used across all scenes that comprise the presentation.

Figure 12:
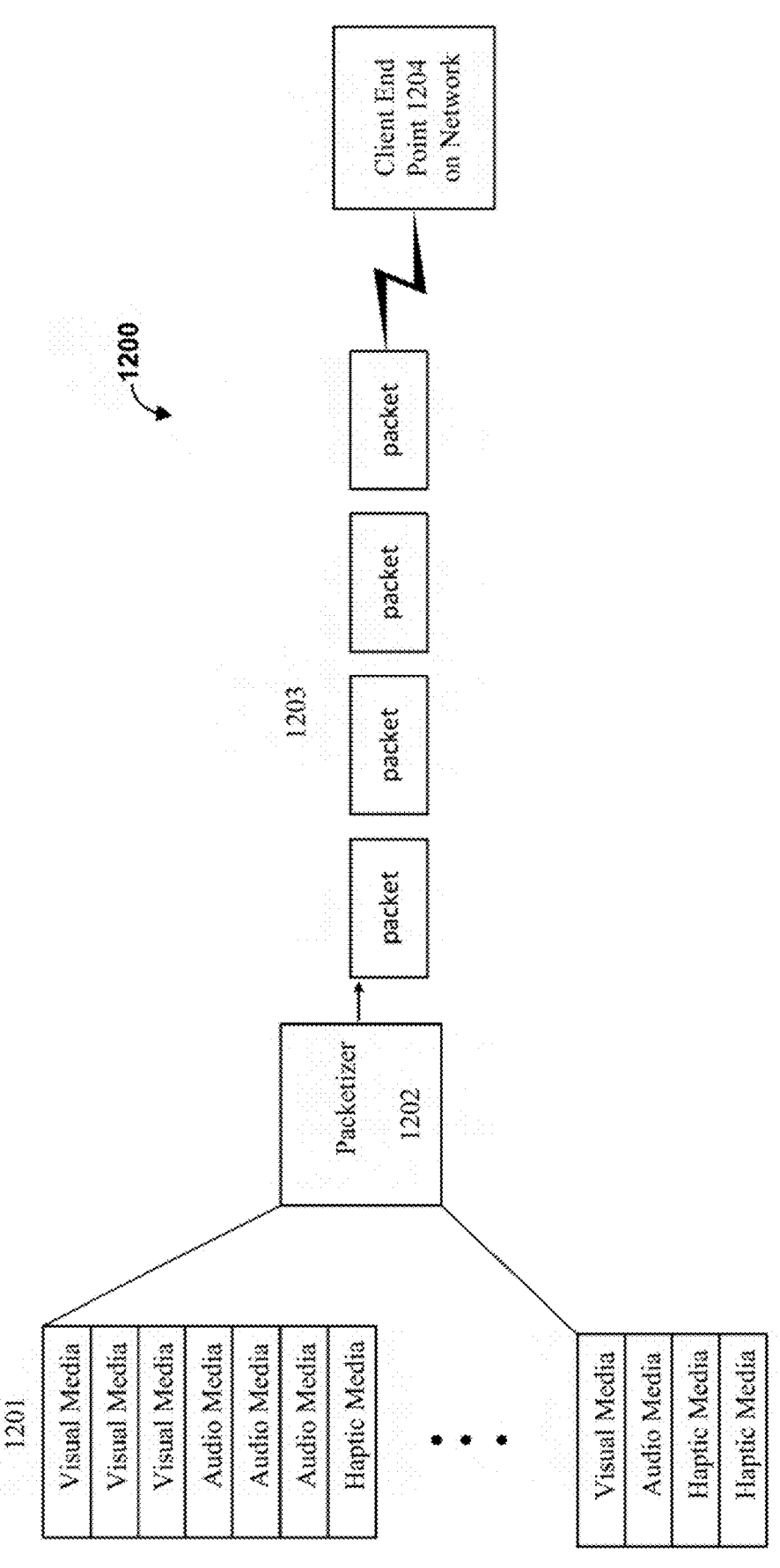
FIG. 12 shows a packetizer process system in some examples.

FIG. 12 shows a packetizer process system 1200 in some examples. In the FIG. 12 example, a packetizer 1202 separates the adapted media 1201 into individual packets 1203 that are suitable for streaming to the immersive client 908, shown as client end point 1204 on network.

Figure 13:
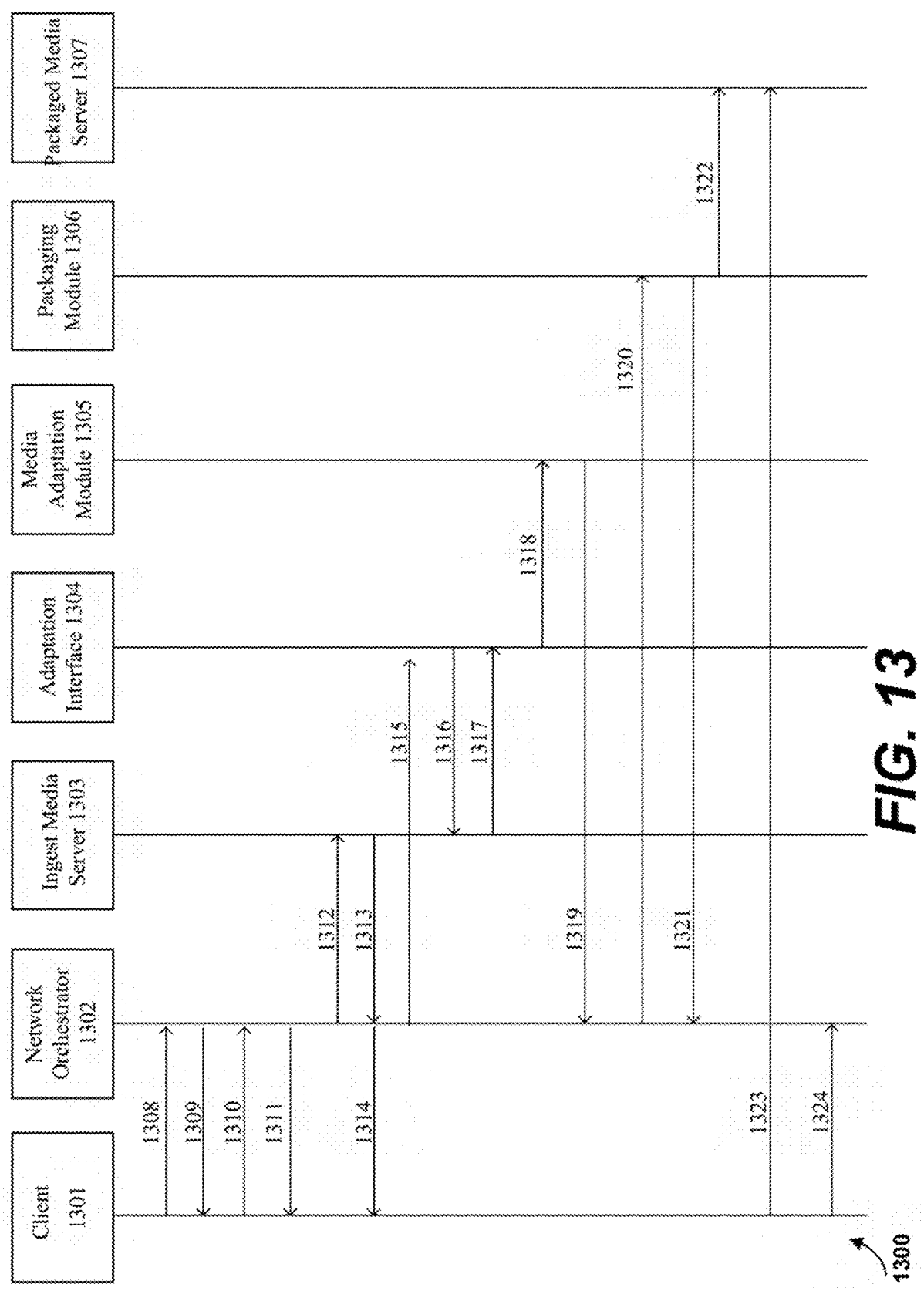
FIG. 13 shows a sequence diagram of a network adapting a specific immersive media in an ingest format to a streamable and suitable distribution format for a specific immersive media client end-point in some examples

FIG. 13 shows a sequence diagram 1300 of a network adapting a specific immersive media in an ingest format to a streamable and suitable distribution format for a specific immersive media client end-point in some examples.

The components and communications shown in FIG. 13 are explained as follows: client 1301 (also referred to as client end-point, client device, in some examples) initiates a media request 1308 to a network orchestrator 1302 (also referred to as network distribution interface in some examples). The media request 1308 includes information to identify the media that is requested by the client 1301, either by URN or other standard nomenclature. The network orchestrator 1302 responds to media request 1308 with profiles request 1309, which requests that client 1301 provide information about its currently available resources (including compute, storage, percent battery charged, and other information to characterize the current operating status of the client). The profiles request 1309 also requests that the client provide one or more neural network models that can be used by the network for neural network inferencing to extract or interpolate the correct media views to match the features of the client's presentation system, if such models are available at the client. Response 1310 from client 1301 to the network orchestrator 1302 provides a client token, application token, and one or more neural network model tokens (if such neural network model tokens are available at the client). The network orchestrator 1302 then provides client 1301 with a session ID token 1311. The network orchestrator 1302 then requests ingest media server 1303 with ingest media request 1312, which includes the URN or standard nomenclature name for the media identified in request 1308. The ingest media server 1303 replies to the request 1312 with a response 1313 which includes an ingest media token. The network orchestrator 1302 then provides the media token from the response 1313 in a call 1314 to client 1301. The network orchestrator 1302 then initiates the adaptation process for the media request 1308 by providing the adaptation interface 1304 with the ingest media token, client token, application token, and neural network model tokens 1315. The adaptation interface 1304 requests access to the ingest media by providing the ingest media server 1303 with the ingest media token at call 1316 to request access to the ingest media assets. The ingest media server 1303 responds to request 1316 with an ingest media access token in response 1317 to the adaptation interface 1304. The adaptation interface 1304 then requests that media adaptation module 1305 adapt the ingest media located at the ingest media access token for the client, application, and neural network inference models corresponding to the session ID token created at 1313. Request 1318 from the adaptation interface 1304 to media adaptation module 1305 contains the required tokens and session ID. The media adaptation module 1305 provides the network orchestrator 1302 with adapted media access token and session ID in update 1319. The network orchestrator 1302 provides the packaging module 1306 with adapted media access token and session ID in interface call 1320. The packaging module 1306 provides response 1321 to the network orchestrator 1302 with the packaged media access token and session ID in response message 1321. The packaging module 1306 provides packaged assets, URNs, and the packaged media access token for the session ID to the packaged media server 1307 in response 1322. Client 1301 executes request 1323 to initiate the streaming of media assets corresponding to the packaged media access token received in response message 1321. The client 1301 executes other requests and provides status updates in message 1324 to the network orchestrator 1302.

Figure 14:
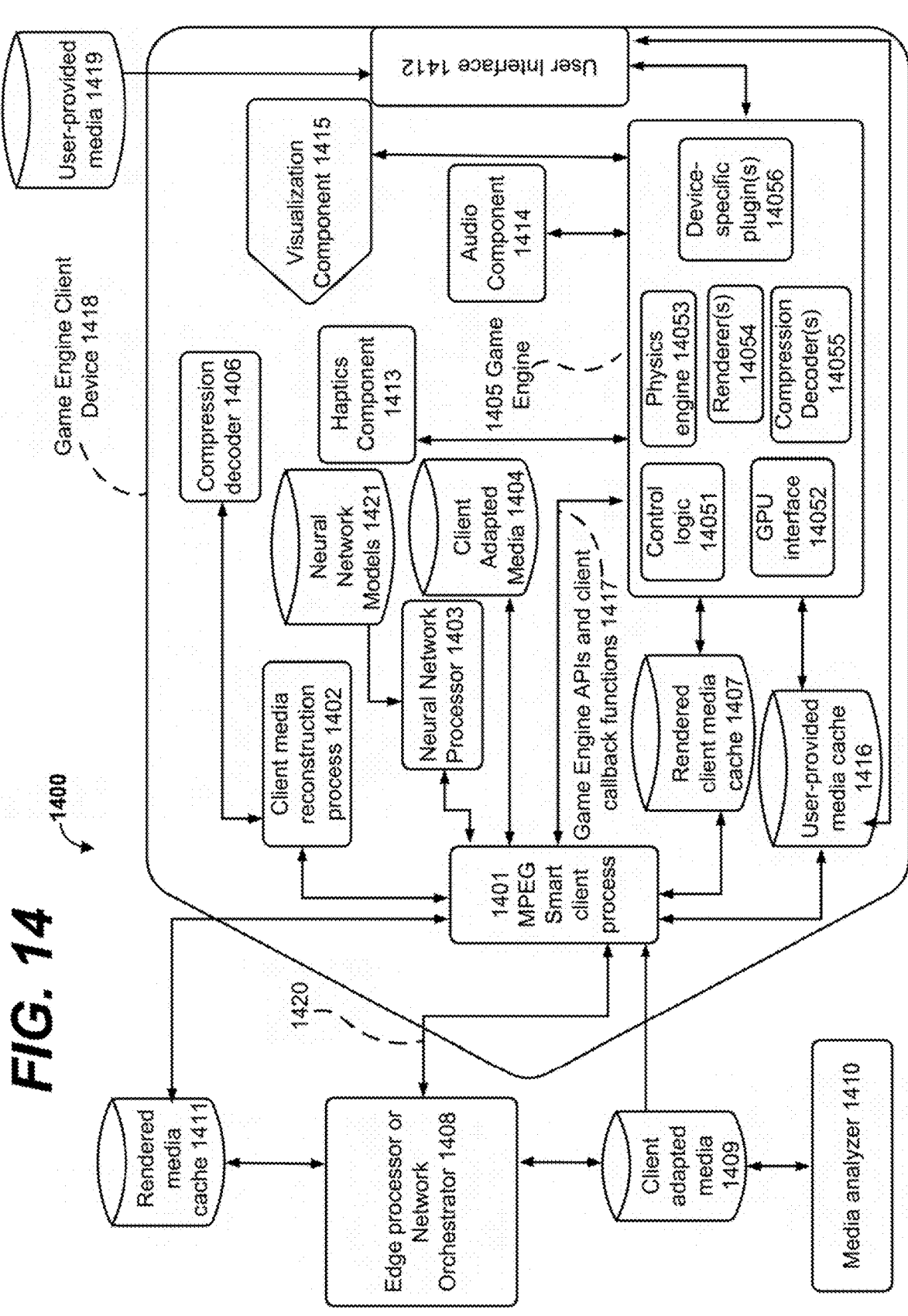
FIG. 14 shows a diagram of a media system with a hypothetical network and a client device for scene-based media processing in some examples.

FIG. 14 shows a diagram of a media system 1400 with a hypothetical network and a client device 1418 (also referred to as game engine client device 1418) for scene-based media processing in some examples. In FIG. 4, a smart client, such as shown by an MPEG smart client process 1401, can serve as a central coordinator to prepare media to be processed by and for other entities within game engine client device 1418, as well as for entities that exist outside of game engine client device 1418. In some examples, the smart client is implemented as software instructions that can be executed by processing circuitry to perform a process, such as the MPEG smart client process 1401 (also referred to as MPEG smart client 1401 in some examples). A game engine 1405 is primarily responsible for rendering the media to create the presentation that will be experienced by end-user(s). A haptics component 1413, a visualization component 1415, and an audio component 1414 can assist the game engine 1405 to render haptics, visual, and audio media respectively. An edge processor or network orchestrator device 1408 can convey information and system media to and receive status updates and other information from the MPEG smart client 1401 via network interface protocol 1420. The network interface protocol 1420 may be split across multiple communication channels and processes, and employ multiple communication protocols. In some examples, the game engine 1405 is a game engine device that includes control logic 14051, GPU interface 14052, physics engine 14053, renderer(s) 14054, compression decoder(s) 14055, and device-specific plugin(s) 14056. The MPEG smart client 1401 also serves as the primary interface between the network and the client device 1418. For example, the MPEG smart client 1401 may employ game engine APIs and callback functions 1417 to interact with the game engine 1405. In an example, the MPEG smart client 1401 may be responsible for reconstructing the streamed media conveyed in 1420 prior to invoking game engine APIs and callback functions 1417 that are managed by the game engine control logic 14051 to cause the game engine 1405 to process the reconstructed media. In such a example, the MPEG smart client 1401 may utilize client media reconstruction process 1402 which may in turn utilize compression decoder process 1406.

In some other examples, the MPEG smart client 1401 may not be responsible for reconstructing the packetized media streamed in 1420 prior to invoking APIs and callback functions 1417. In such examples, the game engine 1405 may decompress and reconstruct the media. Furthermore, in such examples, the game engine 1405 may employ the compression decoder(s) 14055 to decompress the media. Upon receipt of reconstructed media, the game engine control logic 14051 may employ the GPU interface 14052 to render the media via renderer process(es) 14054.

In some examples, the rendered media is animated, then the physics engine 14053 may be employed by the game engine control logic 14051 to simulate laws of physics in the animation of the scene.

In some examples, throughout the processing of the media by the client device 1418, the neural network models 1421 may be employed by the neural network processor 1403 to assist the operations orchestrated by the MPEG smart client 1401. In some examples, the reconstruction process 1402 may need to employ the neural network models 1421 and the neural network processors 1403 to fully reconstruct the media. Likewise, the client device 1418 may be configured via the user interface 1412 by a user to cache the media received from the network in client-adapted media cache 1404 after the media has been reconstructed or cache the rendered media in the rendered client media cache 1407 once the media has been rendered. Further, in some examples, the MPEG smart client 1401 may substitute system-provided visual/nonvisual assets with user-provided visual/nonvisual assets from a user-provided media cache 1416. In such an embodiment, the user interface 1412 may guide end-users to execute the steps to load user-provided visual/non visual assets from a user-provided media cache 1419 (e.g., external of the client device 1418) into a client-accessible user-provided media cache 1416 (e.g., inside the client device 1418). In some embodiments, the MPEG smart client 1401 may be configured to store rendered assets (for potential reuse or sharing with other clients) in the rendered media cache 1411.

In some examples, a media analyzer 1410 may examine client adapted media 1409 (in the network) to determine the complexity of assets, or the frequency with which assets are reused across one or more scenes (not shown), for potential prioritization for rendering by the game gngine 1405 and or for reconstruction processing via the MPEG smart client 1401. In such examples, the media analyzer 1410 will store complexity, prioritization, and frequency-of-asset-use information in media stored in 1409.

It is noted that, in the present disclosure, while a process is shown and described, the process can be implemented as instructions in a software module, and the instructions can be executed by processing circuitry to perform the process. It is also noted that, in the present disclosure, while a module is shown and described, the module can be implemented as a software module with instructions, and the instructions can be executed by processing circuitry to perform a process.

In some related examples, a variety of techniques can address the problem of providing clients with a smooth flow of scenes, including the use of content delivery networks (CDNs) and edge network elements to reduce the delay between a client device request for a scene and the appearance of the scene at the client device, and the use of cloud/edge network elements to offload the computational load of rendering to a more powerful computational engine. Although these techniques can shorten the delay between the client device's request for a scene and the appearance of the scene at the client device, they rely on the availability of a CDN to accomplish, and the immersive scene provider may depend on the end device to request scenes before the data of the scenes can be streamed to the end device, whether with, or without, the use of CDNs and network edge devices.

According to first aspects of the disclosure, a prioritized scene streaming methodology for immersive media streaming can be used for immersive media streaming for light field based displays (e.g., lightfield display, holographic display and the like). The priorities of scenes are determined by the relationship between scenes in some examples.

In some examples, during operation, a media server can use adaptive streaming for streaming media data to end devices, such as end devices with light field based displays. In an example, when an end device requests the entire immersive environment at once, the order in which scenes become available may not provide an acceptable user experience.

Figure 15:
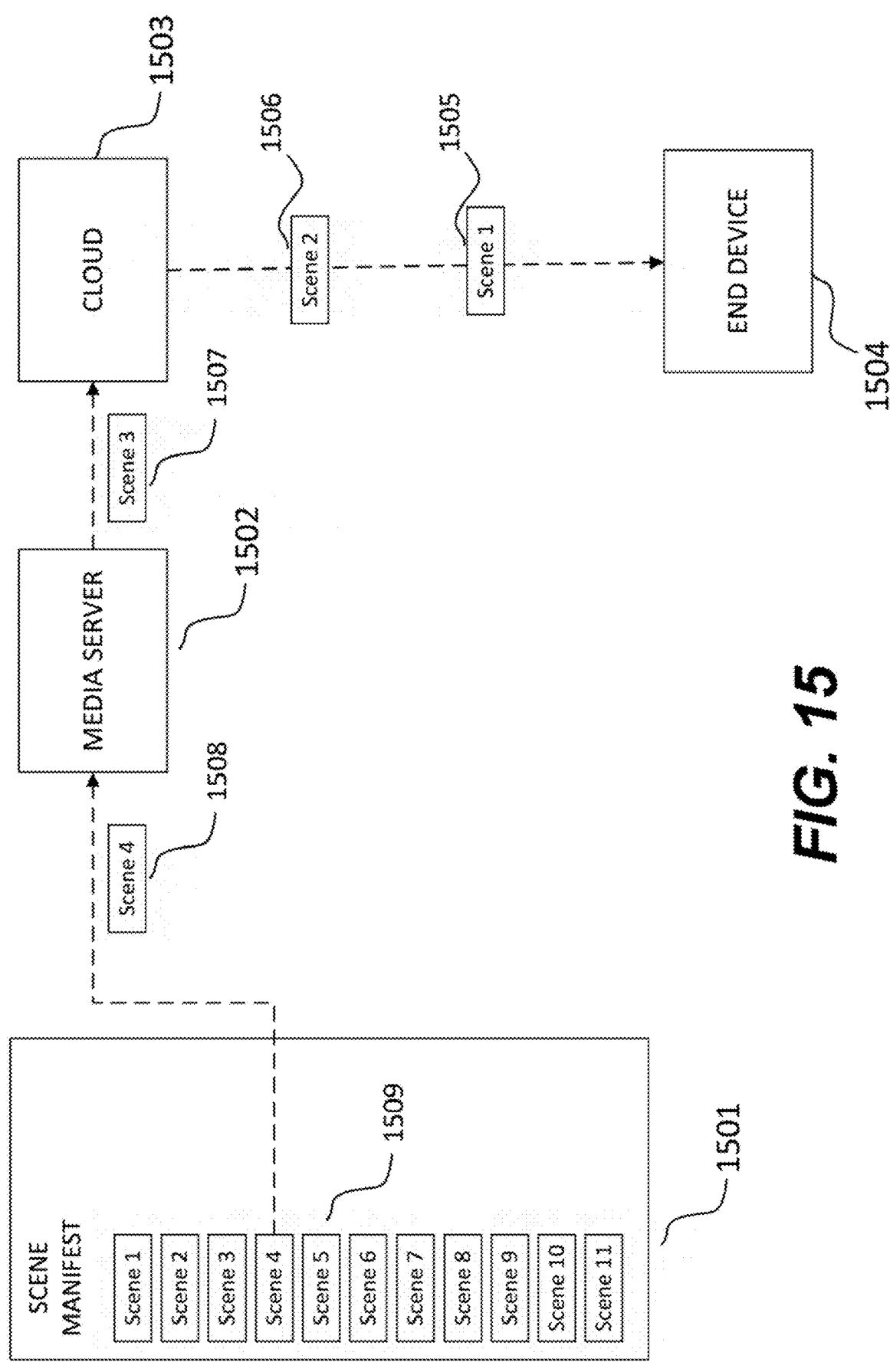
FIG. 15 shows a diagram of an example for streaming scene-based immersive media to an end device in some examples.

FIG. 15 shows a diagram of an example for streaming scene-based immersive media to an end device in some examples. In the FIG. 15 example, the scene-based immersive media is represented by a scene manifest 1501 that includes a list of individual scenes that are to be rendered for an immersive experience. The scene manifest 1501 is provided by a media server 1502 to an end device 1504 through a cloud 1503 (e.g., network cloud). In the FIG. 15 example, the scenes are being retrieved by the end device 1504, and sent to the end device 1504, in a scene number order in the scene manifest 1501. For example, the scenes in the scene manifest 1501 are ordered by scene 1, scene 2, scene 3, scene 4, scene 5, and the so on. The scenes are retrieved and sent to the end device 1504 by an order of scene 1 (shown by 1505), scene 2 (shown by 1506), scene 3 (shown by 1507), scene 4 (shown by 1508), scene 5 (shown by 1509), and so on.

In some examples, each scene in a scene manifest can include, for example in metadata of the scene, a complexity value indicative of a complexity of the scene and a priority value indicative of a priority of the scene.

Figure 16:
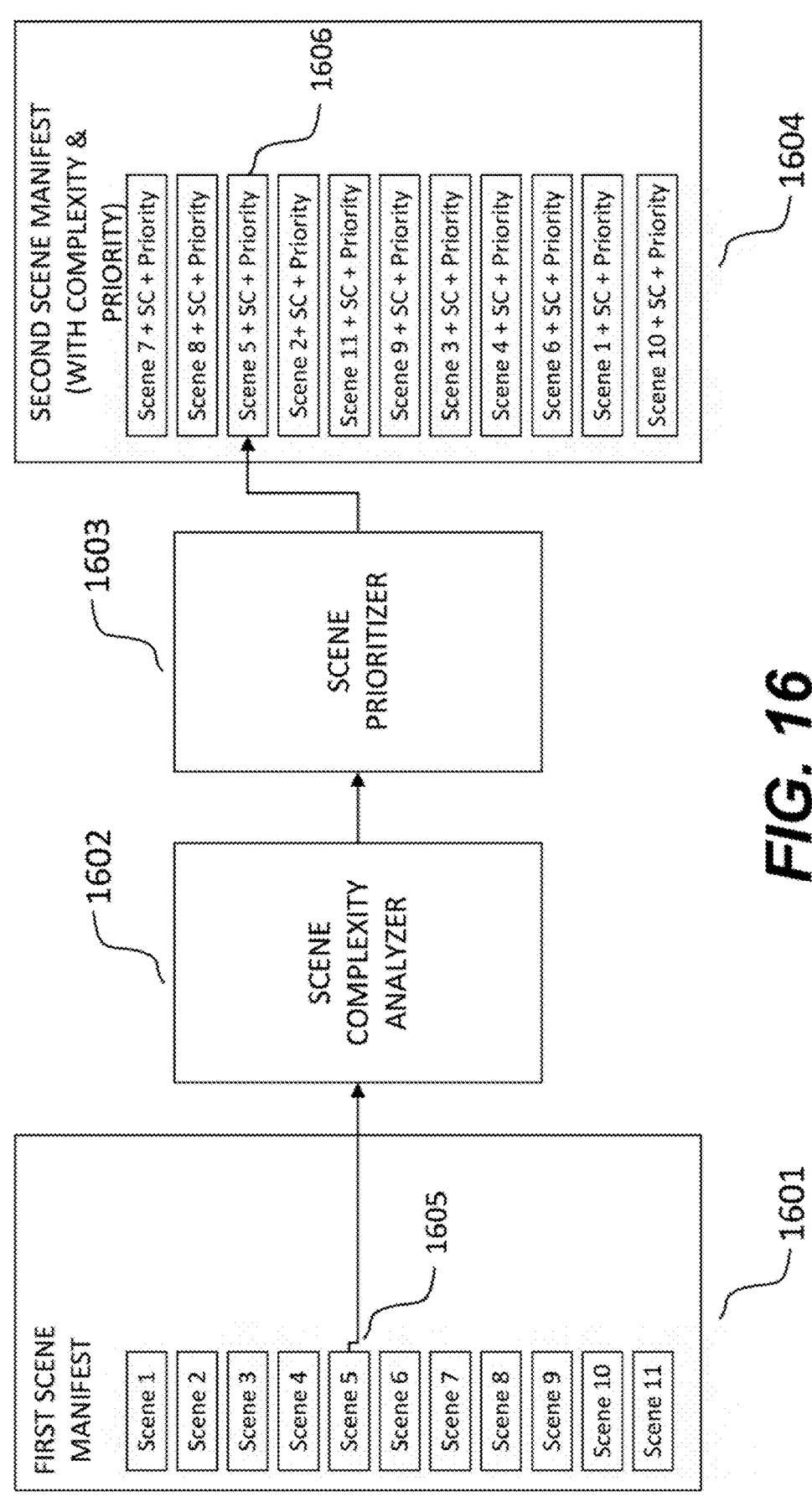
FIG. 16 shows a diagram for adding complexity values and priority values to scenes in a scene manifest in some examples.

FIG. 16 shows a diagram for adding complexity values and priority values to scenes in a scene manifest in some examples. In the FIG. 16 example, a scene complexity analyzer 1602 is used to analyze the complexity of each scene and assign a complexity value for each scene, and then a scene prioritizer (1603) is used to assign a priority value to each scene. For example, a first scene manifest 1601 includes a plurality of scenes to be rendered for an immersive experience. The first scene manifest 1601 is processed by the scene complexity analyzer 1602, which determines a complexity value (shown as SC) for each scene in the plurality of scenes, and then processed by the scene prioritizer 1603, which assigns a priority value (shown as Priority) to each scene in the plurality of scenes, resulting in a second scene manifest 1604. The second scene manifest 1604 includes the plurality of scenes with respective complexity values and priority values. The plurality of scenes in the second scene manifest 1604 are reordered according to the complexity values and/or the priority values. For example, scene 5 is ordered to be the fifth scene in the first scene manifest 1601 (as shown by 1605), and is reordered to be the third scene in the second scene manifest 1604 according to the priority values (as shown by 1606).

Further, in some examples, a priority-aware media server can be used to stream scenes to an end device in an order according to the priority values of the scenes.

Figure 17:
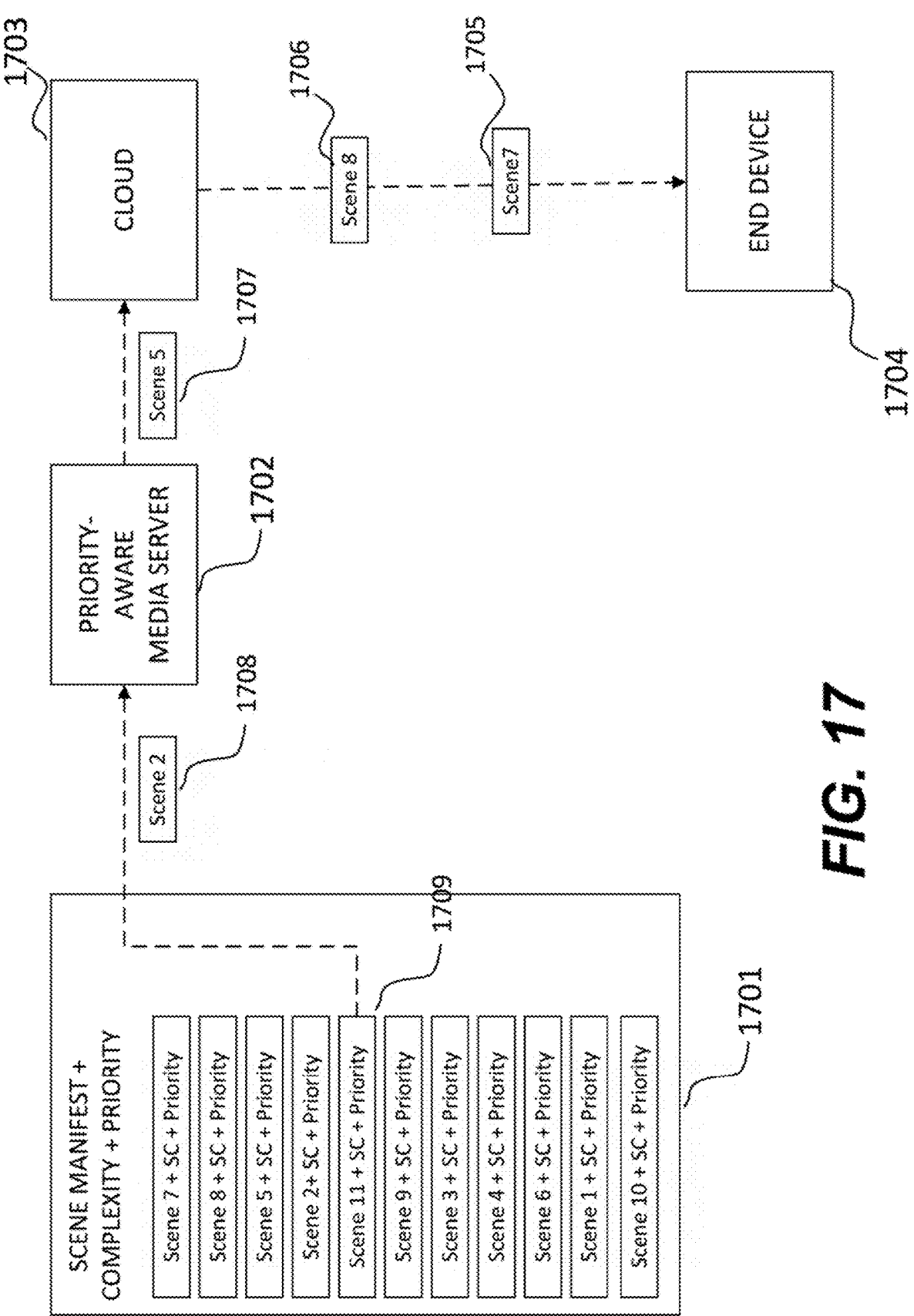
FIG. 17 shows a diagram of an example for streaming scene-based immersive media to an end device in some examples.

FIG. 17 shows a diagram of an example for streaming scene-based immersive media to an end device in some examples. In the FIG. 17 example, the scene-based immersive media is represented by a scene manifest 1701 that includes a list of individual scenes that are to be rendered for an immersive experience. Each of the plurality of scenes has an analyzed complexity value (shown by SC) and an assigned priority value (shown by Priority). The scene manifest 1701 is provided by a priority-aware media server 1702 to an end device 1704 through a cloud 1703. In an example, the scenes are being retrieved by the end device 1704, and sent to the end device 1704, in an order according to the priority values in the scene manifest 1701. For example, the scenes in the scene manifest 1701 are ordered according to priority values. The scenes are retrieved and sent to the end device 1704 by an order of scene 7 (shown by 1705), scene 8 (shown by 1706), scene 5 (shown by 1707), scene 2 (shown by 1708), scene 11 (shown by 1709), and so on.

According to an aspect of the disclosure, the scene priority based streaming technique can be used to provide benefits comparing to requesting all of the scenes in an immersive environment simultaneously since, in many cases, there are reasons why an end device may need to render scenes "out of order". For example, scenes may be ordered initially in a most useful order that is generally used in the immersive environment, and immersive environment may include branches, loops, and the like that may need to render scenes different from the most useful order. In an example, there is sufficient bandwidth to potentially provide an acceptable user experience when the scenes are transferred in the most useful order, there can be cases where a needed scene is queued behind one or more scenes that have already been requested. In another example, when bandwidth is limited, the scene priority based streaming technique can be more helpful to improve user experience.

It is noted that the scene prioritizer can use any suitable techniques to determine priority values for scenes. In some examples, a scene prioritizer can use relationships between scenes as part of the prioritization.

Figure 18:
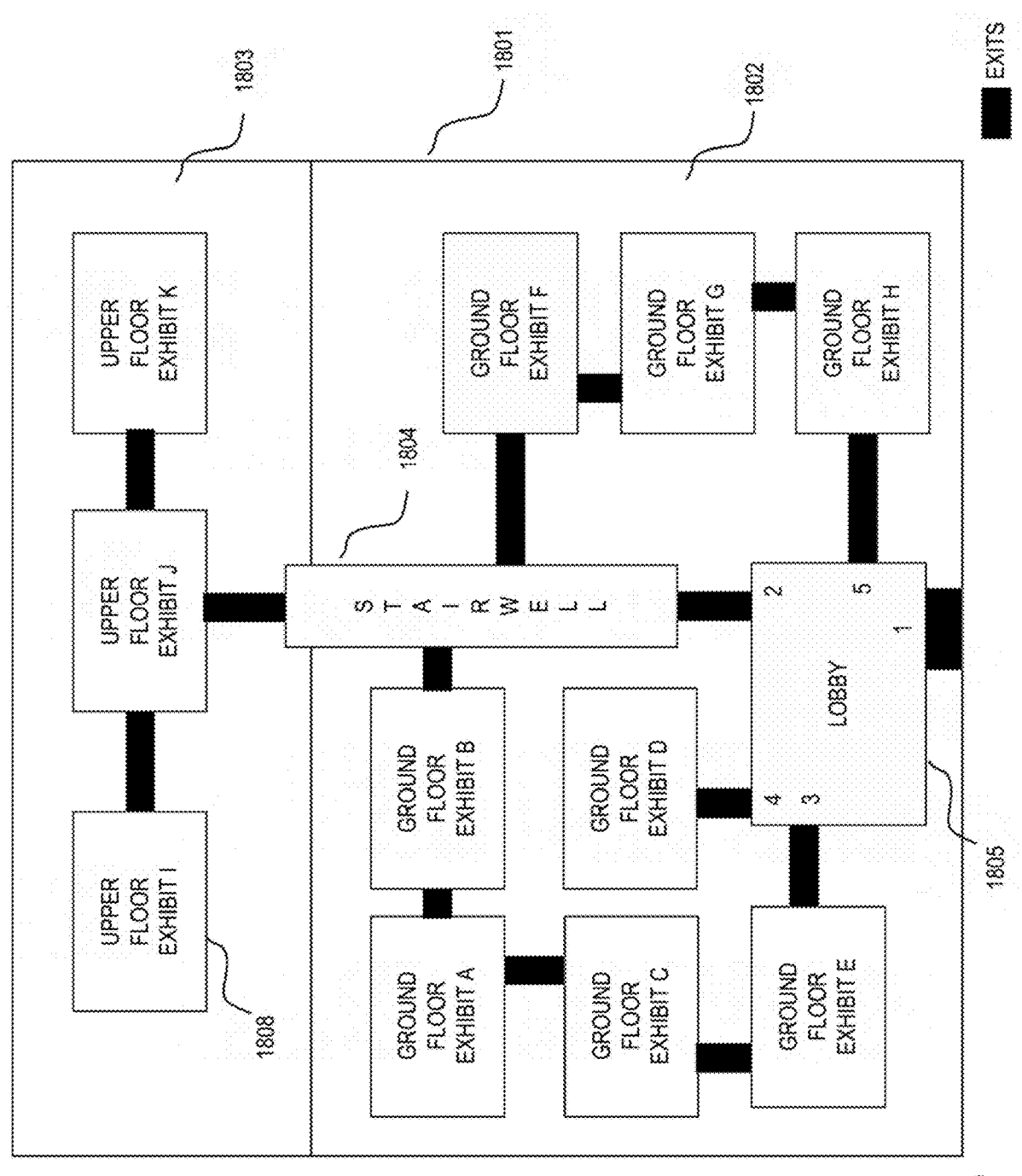
FIG. 18 shows a diagram of a virtual museum to illustrate scene priorities in some examples.

FIG. 18 shows a diagram of a virtual museum 1801 to illustrate scene priorities in some examples. The virtual museum 1801 has a ground floor 1802 and an upper floor 1803, and a stairwell 1804 between the ground floor 1802 and the upper floor 1803. In an example, an immersive tour begins in a lobby 1805. The lobby 1805 has five exits, a first exit for exiting the virtual museum 1801, a second exit for accessing the stairwell 1804, a third exit for accessing the ground floor exhibit E, a fourth exit for accessing the ground floor exhibit D and a fifth exit for accessing the ground floor exhibit H on the ground floor 1802. In an example, a scene prioritizer can reasonably prioritize first scenes for the lobby 1805, and then prioritize second scenes for the stairwell 1804 and then third scenes for the ground floor exhibits E, D and H, because the ground floor exhibits E, D and H are the possible "next" scenes to be rendered when a virtual tourist leaves the lobby 1805.

In some examples, a scene prioritizer can adjust scene priorities based on previous experiences with a same client or with other clients. Refer to FIG. 18, in an example, the virtual museum 1801 opens an especially popular exhibit (e.g., upper floor exhibit I) in an upper floor exhibit room 1808, the scene prioritizer can observe that many virtual tourists are heading straight for the popular exhibit. The scene prioritizer can then adjust the priorities provided previously. For example, the scene prioritizer can prioritize the first scenes for the lobby 1805, the second scenes for the stairwell 1804, and then scenes of the upper floor 1803 on the way to the upper floor exhibit room 1808, such as scenes of the upper floor exhibit J and scenes of the upper floor exhibit I.

In some examples, the content description provided by a media server for an immersive media can include two parts: a media presentation description (MPD) that describes the manifest of the available scenes, various alternatives, and other characteristics; and multiple scenes with varying assets. In some examples, an end device can first obtain an MPD of an immersive media to play. The end device can parse the MPD and learn about the various scenes with varying assets, scene timings, media-content availability, media types, various encoded alternative of the media content, minimum and maximum bandwidth supported and other content characteristics. Using the information obtained from the MPD, the end device can appropriately choose which scene to be rendered when, and at which bandwidth availability. The end device can continuously measure the bandwidth fluctuations and depending on the measurements, the end device decides how to adapt to the available bandwidth by fetching an alternative scene with less or more assets.

In some examples, a priority value of a scene in a scene based immersive media is defined by a server device, or a sender device and may be changed by the end device during a session for playing the scene based immersive media.

According to second aspects of the disclosure, priority values of scenes in scene based immersive media for light field based displays can be dynamically adjusted. In some examples, the priority values can be updated based on feedback from an end device (also referred to as client device. For example, the scene prioritizer can receive feedback from the end device, and can dynamically change the priority values of scenes based on the feedback.

Figure 19:
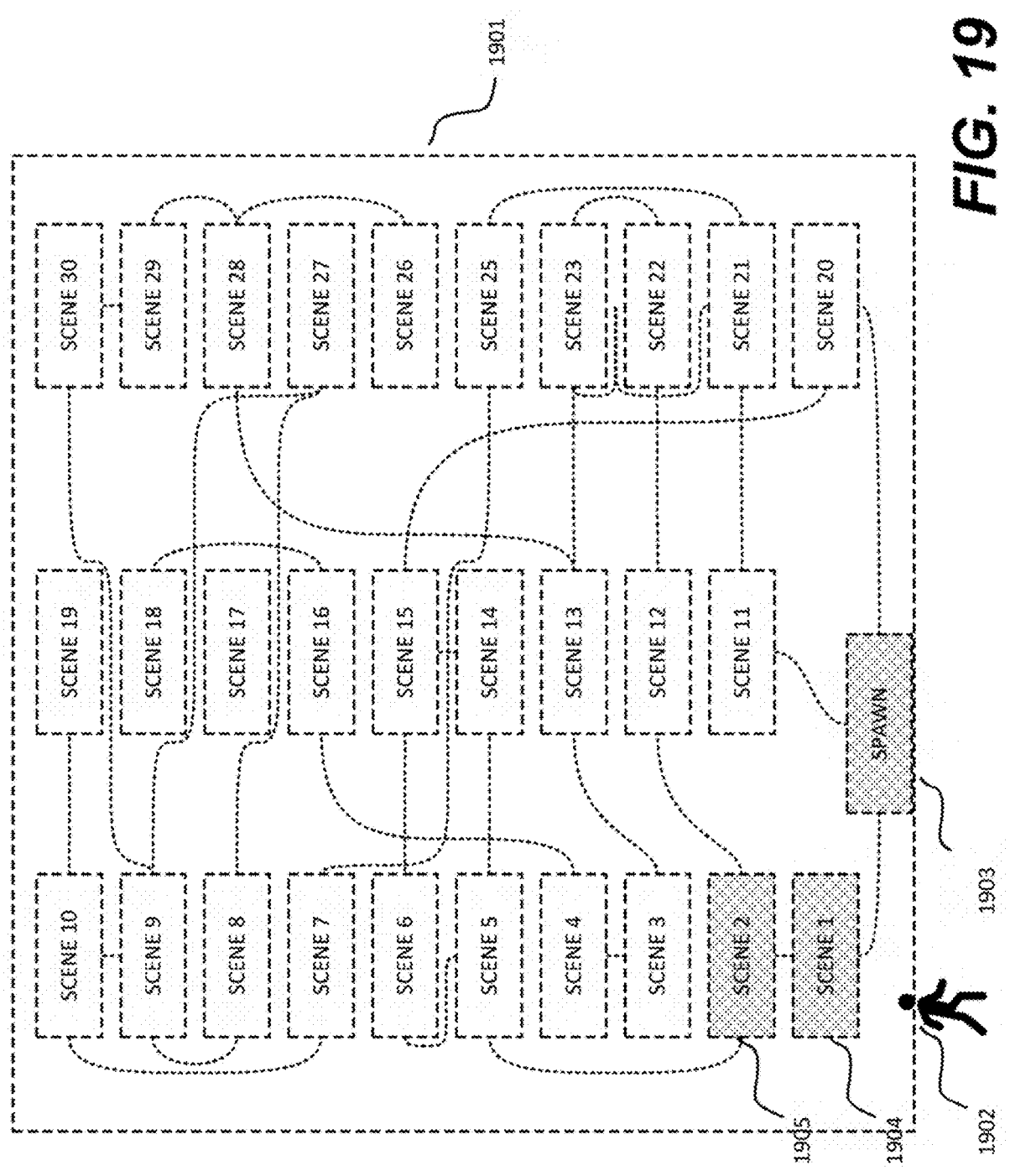
FIG. 19 shows a diagram of scenes for a scene based immersive media in some examples.

FIG. 19 shows a diagram of scenes for a scene based immersive media, such as an immersive game 1901, in some examples. Relationships of the scenes are shown by dotted lines that connect the scenes. In an example, a game FIG. 1902 appears in a spawn area 1903, then scenes with the highest priority are the scenes of the spawn area 1903. The scenes of the spawn area 1903 can be followed by scenes that are directly connected to the spawn area 1903, where the game FIG. 1902 starts out such as scene 1, scene 11, and scene 20. When the game FIG. 1902 moves to scene 1 (shown by 1904), the scenes directly connected to scene 1, such as scene 2 (shown by 1905), are now of the highest priority. When the game FIG. 1902 moves to scene 2, the scenes directly connected by scene 2, such as scene 12 and scene 5, are now of the highest priority.

In some examples, when the game FIG. 1902 moves to a new scene that has not already been streamed to the end device, the end device can send the game figure's current position to the scene prioritizer, so that the current location can be included in the prioritization.

Figure 20:
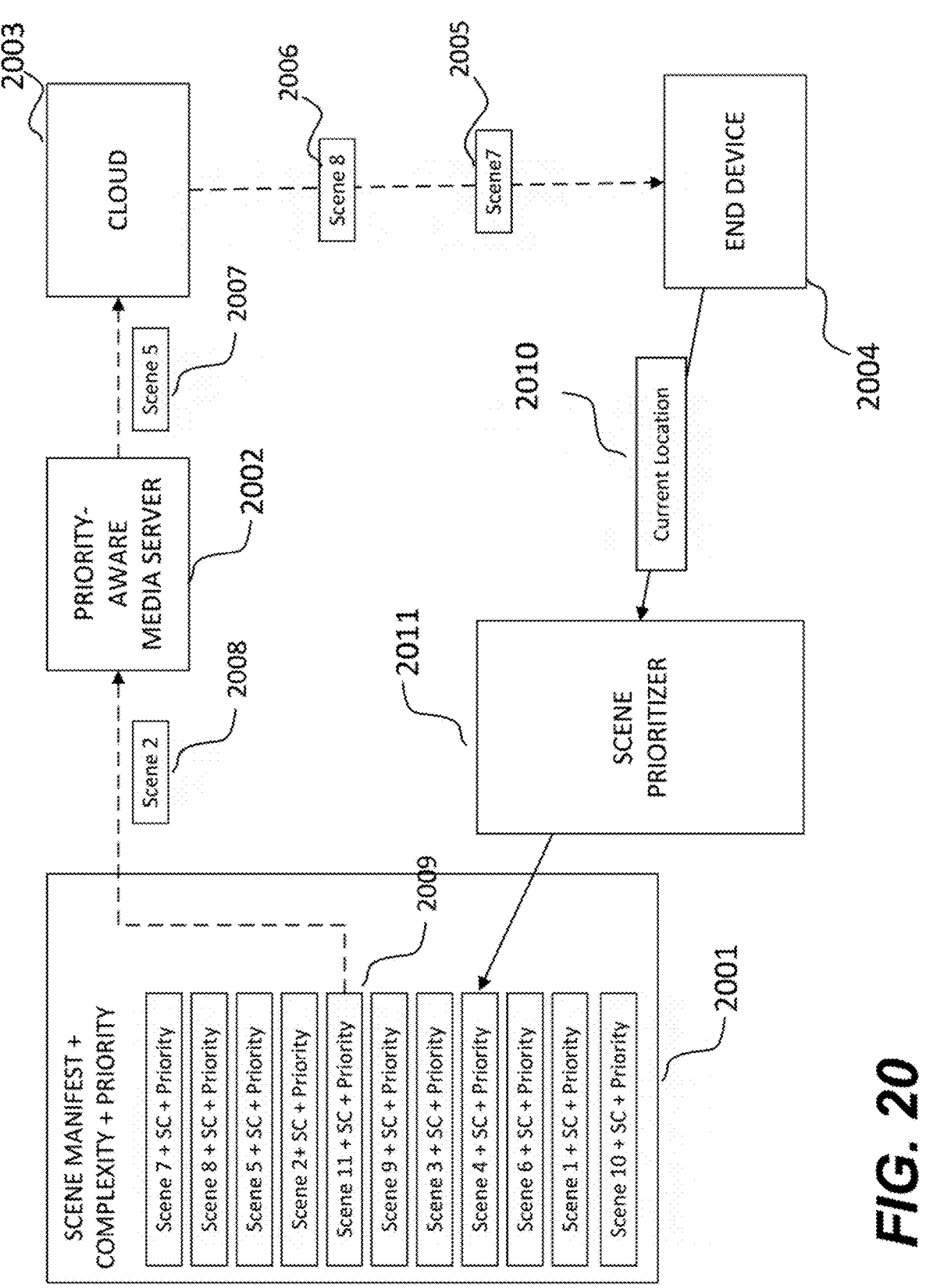
FIG. 20 shows a diagram of an example for streaming scene-based immersive media to an end device in some examples.

FIG. 20 shows a diagram of an example for streaming scene-based immersive media to an end device in some examples. In the FIG. 20 example, the scene-based immersive media is represented by a scene manifest 2001 that includes a list of individual scenes that are to be rendered for an immersive experience. Each of the plurality of scenes has an analyzed complexity value (shown by SC) and an assigned priority value (shown by Priority). The scene manifest 2001 is provided by a priority-aware media server 2002 to an end device 2004 through a cloud 2003. In the FIG. 20 example, the scenes are being retrieved by the end device 2004, and sent to the end device 2004, in a priority order in the scene manifest 2001.

Further, using the immersive game of FIG. 19 as an example, the end device 2004 can send the game figure's current location 2010 to the scene prioritizer 2011. The scene prioritizer 2011 can then include the current location information in the calculations for updates to scene priorities in the scene manifest 2001.

It is noted that the techniques for adaptive streaming for light field based media, described above, can be implemented as computer software using computer-readable instructions and physically stored in one or more computer-readable media.

In some examples, a method for adaptive streaming for light field based displays includes assigning respective priority values to a plurality of scenes in an immersive media for light field based display, and adaptively streaming the plurality of scenes based on the priority values. In an example, the plurality of scenes are transferred (e.g., streamed) based on the assigned priority values. In some examples, a priority value of a scene is assigned based on a likelihood of a need to render the scene. In some examples, a priority value of a scene is dynamically adjusted based on a feedback from an end device. For example, a priority value of a scene can be adjusted based on, for example a location of a game figure, that is feedback from the client device.

In some examples, in response to available network bandwidth being limited, a scene with the highest priority is selected to be streamed as a next scene. In some examples, in response to available network bandwidth being limited, the method includes identifying a plurality of scenes that are unlikely to be needed and refraining the identified plurality of scenes from streaming until the identified plurality of scenes exceeds a likelihood threshold to be needed.

Figure 21:
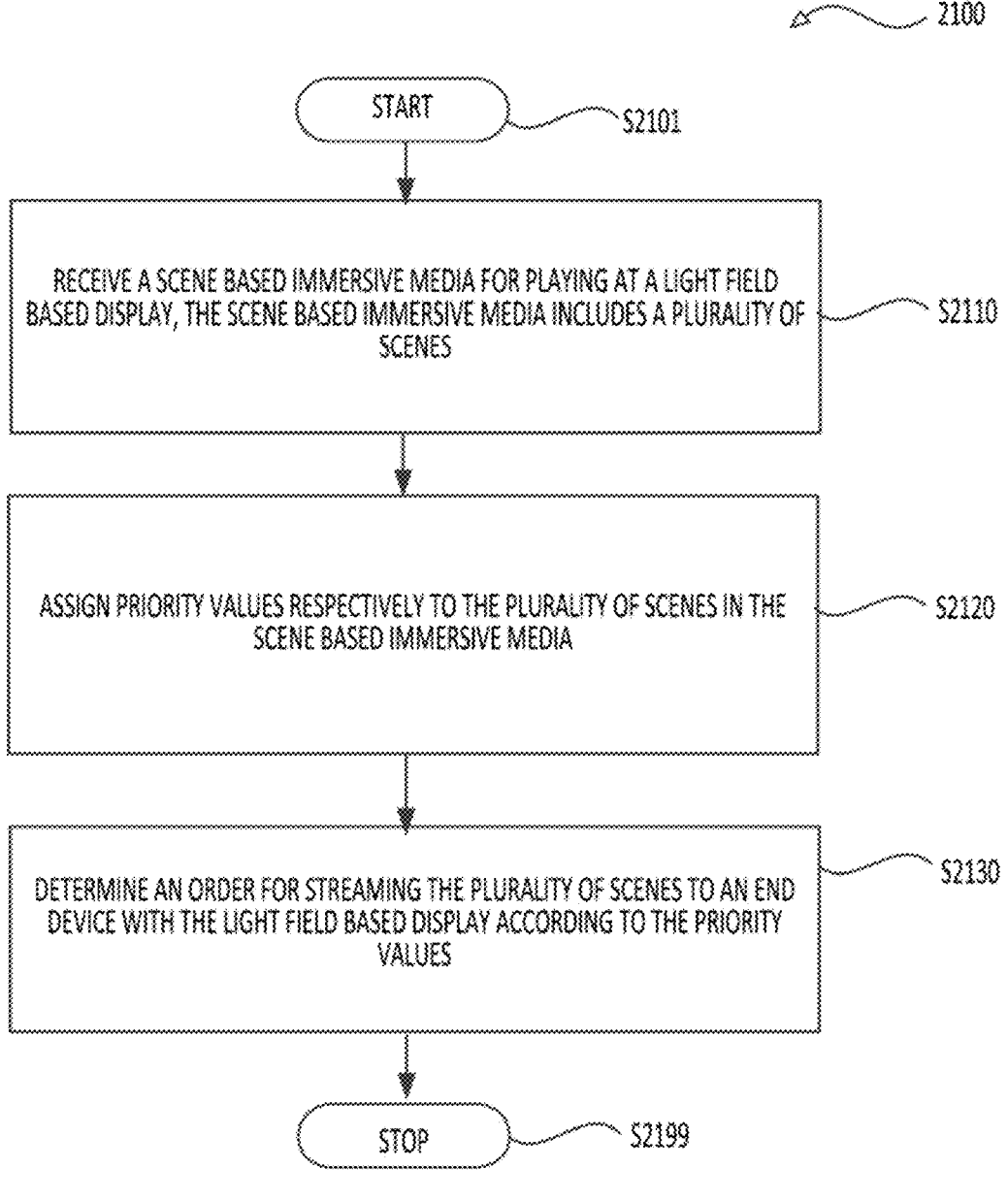
FIG. 21 shows a flow chart outlining a process according to an embodiment of the disclosure.

FIG. 21 shows a flow chart outlining a process 2100 according to an embodiment of the disclosure. The process 2100 can be executed in a network, such as by a server device in the network. In some embodiments, the process 2100 is implemented in software instructions, thus when processing circuitry executes the software instructions, the processing circuitry performs the process 2100. The process starts at S2101, and proceeds to S2110.

At S2110, a scene based immersive media for playing at a light field based display is received. The scene based immersive media includes a plurality of scenes.

At S2120, priority values are assigned respectively to the plurality of scenes in the scene based immersive media.

At S2130, an order for streaming the plurality of scenes to an end device with the light field based display is determined according to the priority values.

In some examples, the plurality of scenes have an initial order in a scene manifest and are reordered according to the priority values, and the reordered scenes are transmitted (streamed) to the end device.

In some examples, a priority-aware network device can select, from a subset of un-transmitted scenes in the plurality of scenes, a highest priority scene with a highest priority value, and transmit the highest priority scene to the end device.

In some examples, a priority value to a scene is determined based on a likelihood of a need to render the scene.

In some examples, it is determined that an available network bandwidth is limited. From a subset of un-transmitted scenes in the plurality of scenes, a highest priority scene with a highest priority value is selected. The highest priority scene is transmitted in response to the available network bandwidth being limited.

In some examples, it is determined that an available network bandwidth is limited. A subset of the plurality of scenes that is unlikely to be needed for rendering next is identified based on the priority values. The subset of the plurality of scenes is refrained from streaming in response to the available network bandwidth is limited.

In some examples, a first priority value is assigned to a first scene based on a second scene having a second priority value in response to a relationship between the first scene and the second scene.

In some examples, a feedback signal is received from the end device. At least a priority value of a scene in the plurality of scenes is adjusted based on the feedback signal. In an example, a highest priority is assigned to a first scene in response to the feedback signal indicative of a current scene being a second scene that is in connection with the first scene. In another example, the feedback signal indicates a priority adjustment that is determined by the end device.

Then, the process 2100 proceeds to S2199 and terminates.

The process 2100 can be suitably adapted to various scenarios and steps in the process 2100 can be adjusted accordingly. One or more of the steps in the process 2100 can be adapted, omitted, repeated, and/or combined. Any suitable order can be used to implement the process 2100. Additional step(s) can be added.

Figure 22:
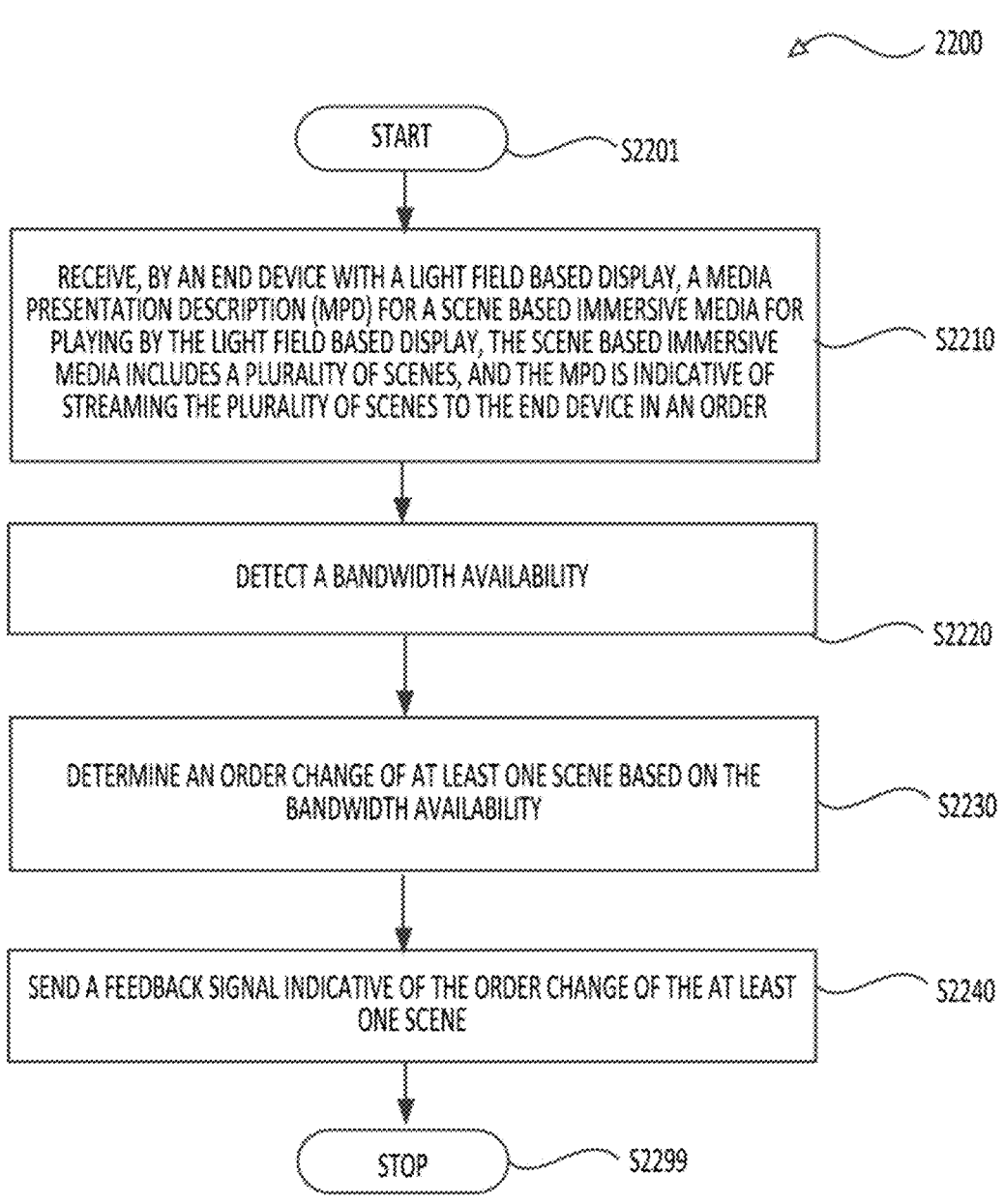
FIG. 22 shows a flow chart outlining a process according to an embodiment of the disclosure.

FIG. 22 shows a flow chart outlining a process 2200 according to an embodiment of the disclosure. The process 2200 can be executed by an end device (also referred to as client device). In some embodiments, the process 2200 is implemented in software instructions, thus when processing circuitry executes the software instructions, the processing circuitry performs the process 2200. The process starts at S2201, and proceeds to S2210.

At S2210, an end device with a light field based display receives a media presentation description (MPD) for a scene based immersive media for playing by the light field based display. The scene based immersive media includes a plurality of scenes, and the MPD is indicative of streaming the plurality of scenes to the end device in an order.

At S2220, a bandwidth availability is detected.

At S2230, an order change of at least one scene is determined based on the bandwidth availability.

At S2240, a feedback signal indicative of the order change of the at least one scene is transmitted.

In some examples, the feedback signal indicates a next scene to render.

In some examples, the feedback signal indicates an adjustment of a priority value of the at least one scene.

In some examples, the feedback signal indicates a current scene.

Then, the process 2200 proceeds to S2299 and terminates.

The process 2200 can be suitably adapted to various scenarios and steps in the process 2200 can be adjusted accordingly. One or more of the steps in the process 2200 can be adapted, omitted, repeated, and/or combined. Any suitable order can be used to implement the process 2200. Additional step(s) can be added.

Some aspects of the disclosure also provide a prioritized asset streaming methodology for immersive media streaming, such as immersive media streaming for light field based displays.

It is noted that the appearance of a scene at a client device (also referred to as end device) in response to a client request from the client device may depend on the availability of the assets that the scene relies on to the client device, so that the client device can render the scene. In order to minimize the amount of time required to transfer the assets to a client device, the assets can be prioritized in some examples.

According to third aspects of the disclosure, assets in a scene based immersive media, such as scene based immersive media for light field based displays (e.g., light field display, holographic display and the like) can be prioritized based on attributes of the assets, such as an asset size of an asset.

In some examples, during operation, a media server may use adaptive streaming for light field based displays. The adaptive streaming relies on the transfer of scenes to the end device, and in turn relies on the transfer of the assets that make up each scene.

Figure 23:
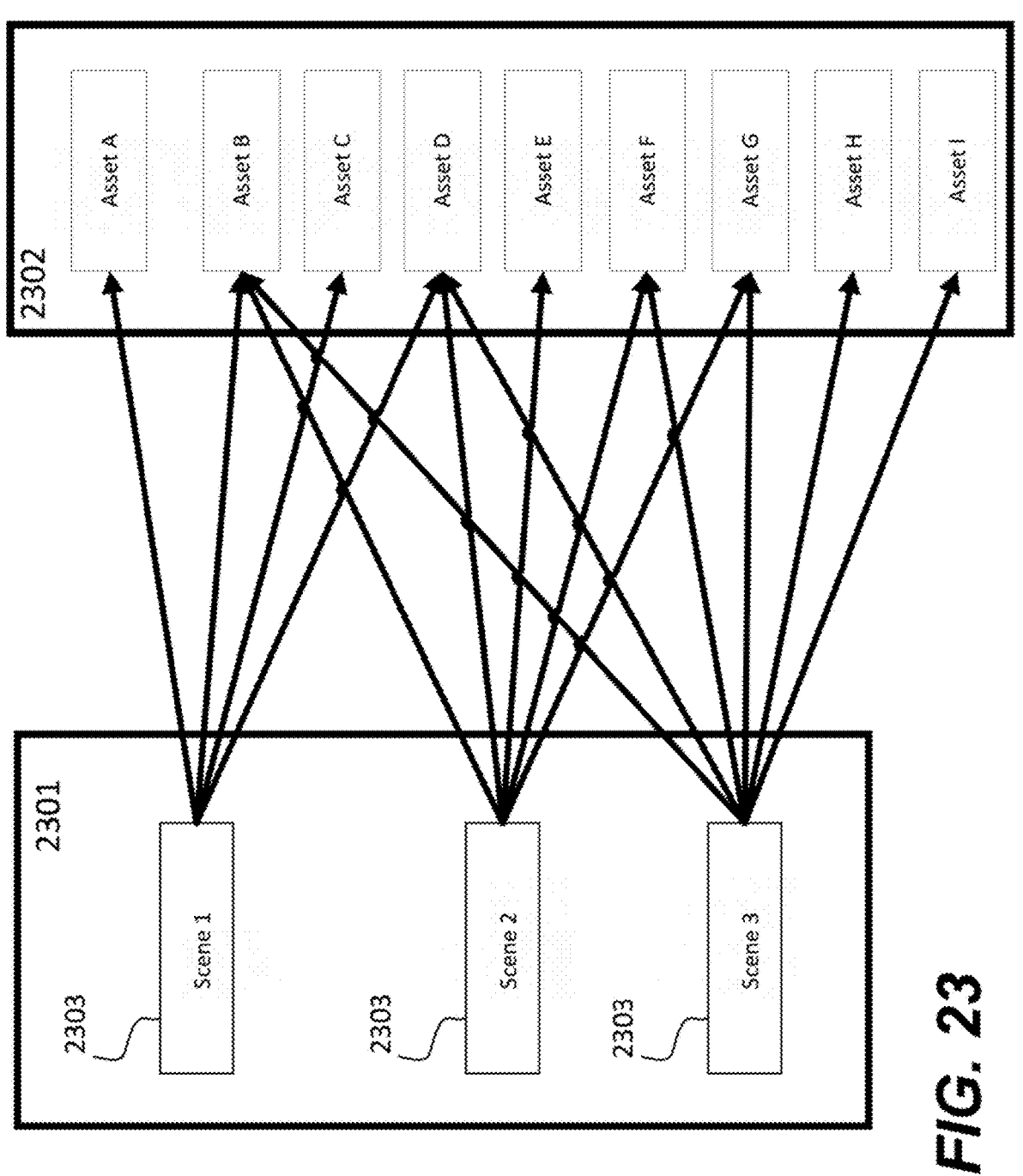
FIG. 23 shows a diagram of a scene manifest with a mapping of scenes to assets in an example.

FIG. 23 shows a diagram of a scene manifest 2301 with a mapping of scenes to assets in an example. The scene manifest 2301 includes multiple scenes 2303, and each of the multiple scenes 2303 relies on one or more assets in a set of assets 2302. For example, scene 2 relies on assets B, D, E, F, and G in the set of assets 2302.

In some examples, when the end device requests the assets for a scene, the assets are streamed to the end device in an order.

Figure 24:
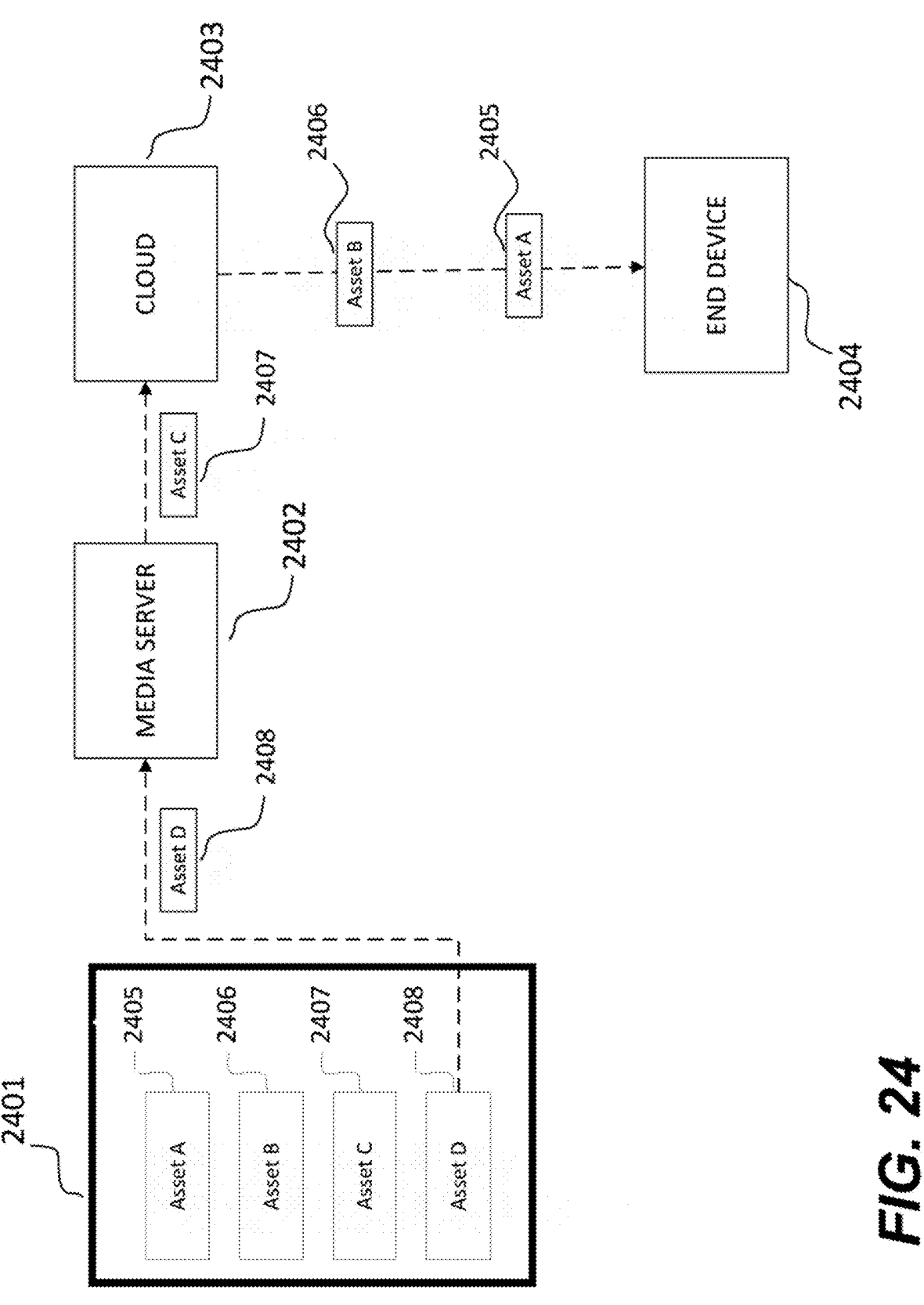
FIG. 24 shows a diagram for streaming assets for a scene in some examples.

FIG. 24 shows a diagram for streaming assets for a scene in some examples. In FIG. 24, a scene 2401 relies on a plurality of assets, such as asset A (shown by 2405), asset B (shown by 2406), asset C (shown by 2407) and asset D (shown by 2408). The plurality of assets is provided by a media server 2402 to an end device 2404 through a cloud 2403. In the FIG. 24 example, the plurality of assets in the scene 2401 are ordered by asset A, asset B, asset C, and asset D. The plurality of assets are retrieved and sent to the end device 1504 by the asset order in the scene 2401, such as in the order of asset A, asset B, asset C and asset D. The asset order in which assets become available to the end device may not provide an acceptable user experience.

According to an aspect of the disclosure, before the assets for a scene are streamed to the end device, an asset prioritizer can be used to analyze the assets needed for the scene and assign a priority value for each asset.

Figure 25:
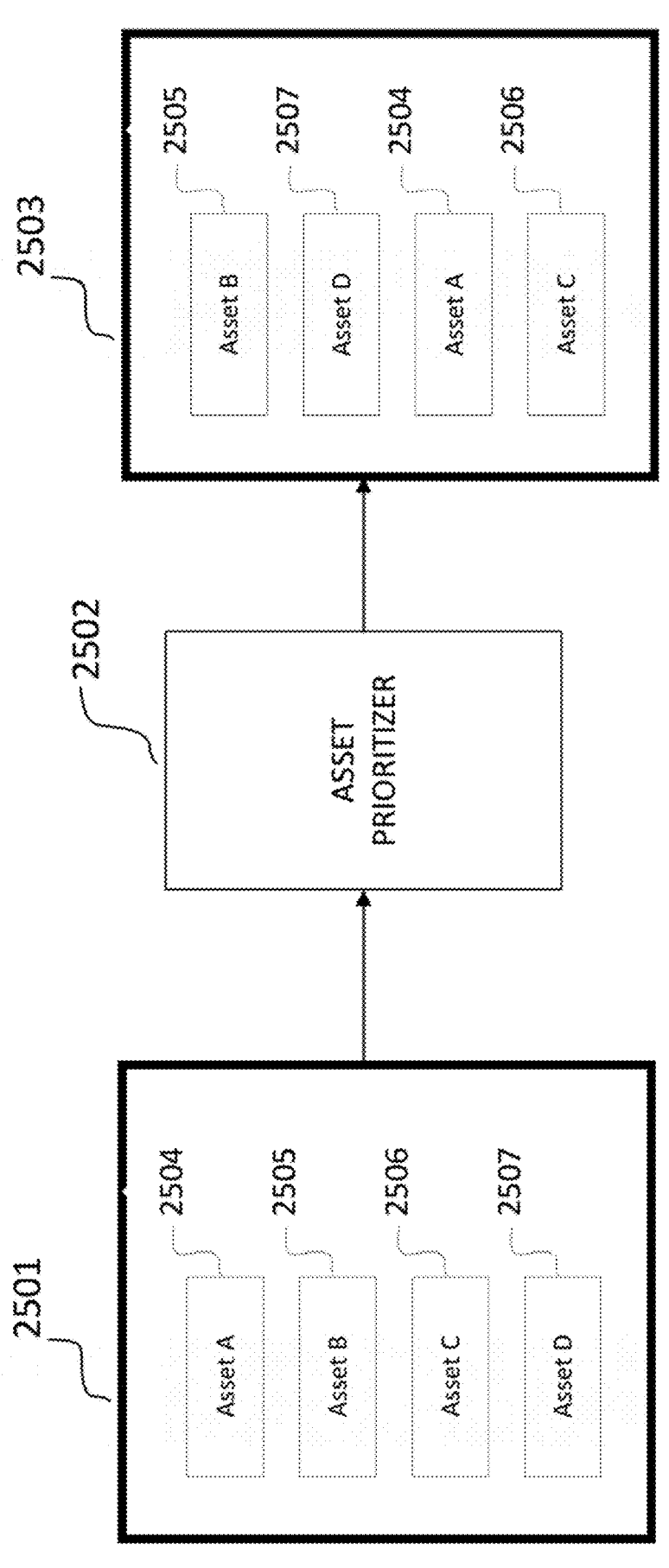
FIG. 25 shows a diagram for reordering assets in a scene in some examples

FIG. 25 shows a diagram for reordering assets in a scene in some examples. In the FIG. 25 example, an asset prioritizer 2502 is used to assign a priority value to each asset in a scene. For example, a scene relies on four assets that are referred to as asset A (as shown by 2504), asset B (as shown by 2505), asset C (as shown by 2506) and asset D (as shown by 2507). Initially, the four assets are in an asset order of asset A, asset B, asset C and asset D, as shown by 2501. The asset prioritizer 2502 assigns a first priority value (e.g., 2) to the asset A, a second priority value (e.g., 4, a highest priority value) to the asset B, a third priority value (e.g., 1, a lowest priority value) to the asset C, and a fourth priority value (e.g., 3) to the asset D. The four assets can be reordered according to the priority values, such as in an order of asset B, asset D, asset A and asset C, as shown by 2503.

In an example, the reordered assets can be streamed by a media server to an end device.

It is noted that while larger value is used in the present disclosure to represent higher priority, other suitable priority numbering techniques can be used to present asset priorities.

Figure 26:
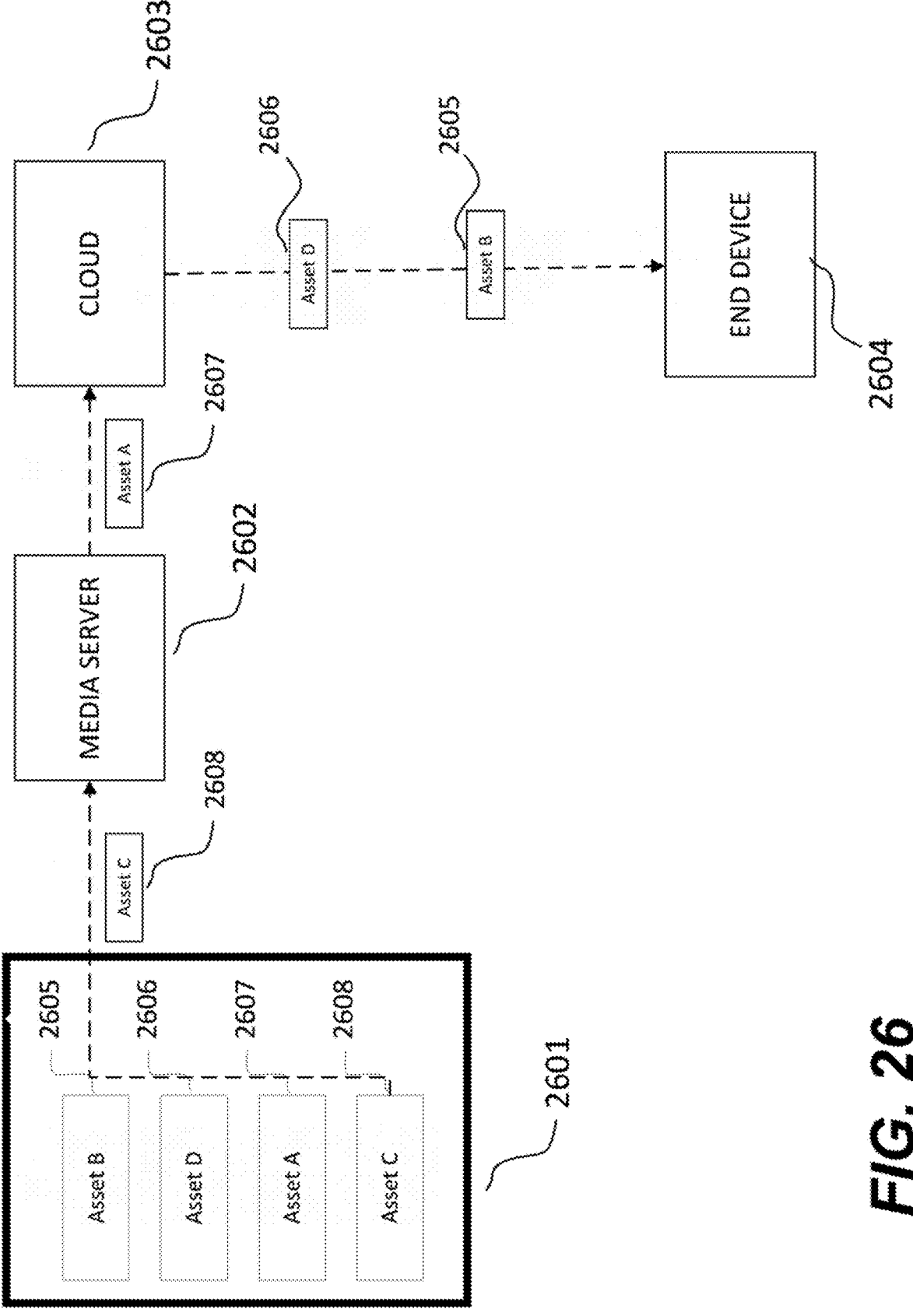
FIG. 26 shows a diagram of an example for streaming scene-based immersive media to an end device in some examples.

FIG. 26 shows a diagram of an example for streaming scene-based immersive media to an end device in some examples. In the FIG. 26 example, a scene of the scene-based immersive media includes four assets that are reordered according to priority values of the four assets, such as in an order of asset B, asset D, asset A and asset C from high to low as shown by 2601. The four assets are provided by a media server 2602 to an end device 2604 through a cloud 2603 in the order of the priority values. For example, the four assets are retrieved and sent to the end device 2604 by an order of asset B (shown by 2605), asset D (shown by 2606), asset A (shown by 2607) and asset C (shown by 2608).

According to an aspect of the disclosure, the asset prioritizer 2502 can assign priority values to assets based on the size of each asset in bytes. In an example, the smallest asset is assigned with the highest priority value, so that a series of assets can be rendered in an order that shows an end user more assets (e.g., smaller assets) more quickly, while the end device is still waiting for the larger assets to arrive. Using FIG. 26 as an example, the asset B has the lowest number of bytes (smallest in size) and asset C has the highest number of bytes (largest in size). Comparing a first streaming order in FIG. 24 and a second streaming order in FIG. 26, the end device 2604 can start showing an asset earlier than the end device 2404, because in FIG. 24, a relatively larger asset is streamed first, and the end device 2404 may have nothing to show until the relatively larger asset has arrived.

In some examples, the prioritization assigned by the asset prioritizer may also be included in a manifest in the MPD. In some examples, the asset priority values of assets in a scene in a scene based immersive media may be defined by a server device or a sender device and the asset priority values may be changed by the client device during the session for playing the scene based immersive media.

Some aspects of the disclosure provide a method for dynamic adaptive streaming for light field based display (e.g., lightfield display or holographic display) according to assigned asset priority values. The assets with the assigned asset priority values can be transmitted (streamed) based on the asset priority values. In some examples, an asset priority value is assigned to an asset based on the size of the asset. In some examples, the asset priority values are adjusted based on feedback from one or more client devices.

According to fourth aspects of the disclosure, assets in a scene based immersive media, such as scene based immersive media for light field based display (e.g., lightfield display, holographic display, etc.) can be prioritized based on asset visibility.

According to an aspect of the disclosure, not all assets in a stream are equally relevant at any moment in time, because some assets may not be visible to an end user at certain moment. In some examples, prioritizing visible assets over hidden assets in streaming can reduce the delay for relevant assets (e.g., the visible assets) to be available to an end device (e.g., client device). In some examples, priority values for assets are determined according to visibility of the assets from a camera position, such as a default entry location of a scene and the like.

In some examples, when a virtual figure associated with an end user (also referred to as a camera in some examples) enters a scene at an entry location (e.g., default entry location of the scene), some assets of the scene are immediately visible, but other assets may not be visible when viewing from the entry location or when a camera is placed at the entry location.

Figure 27:
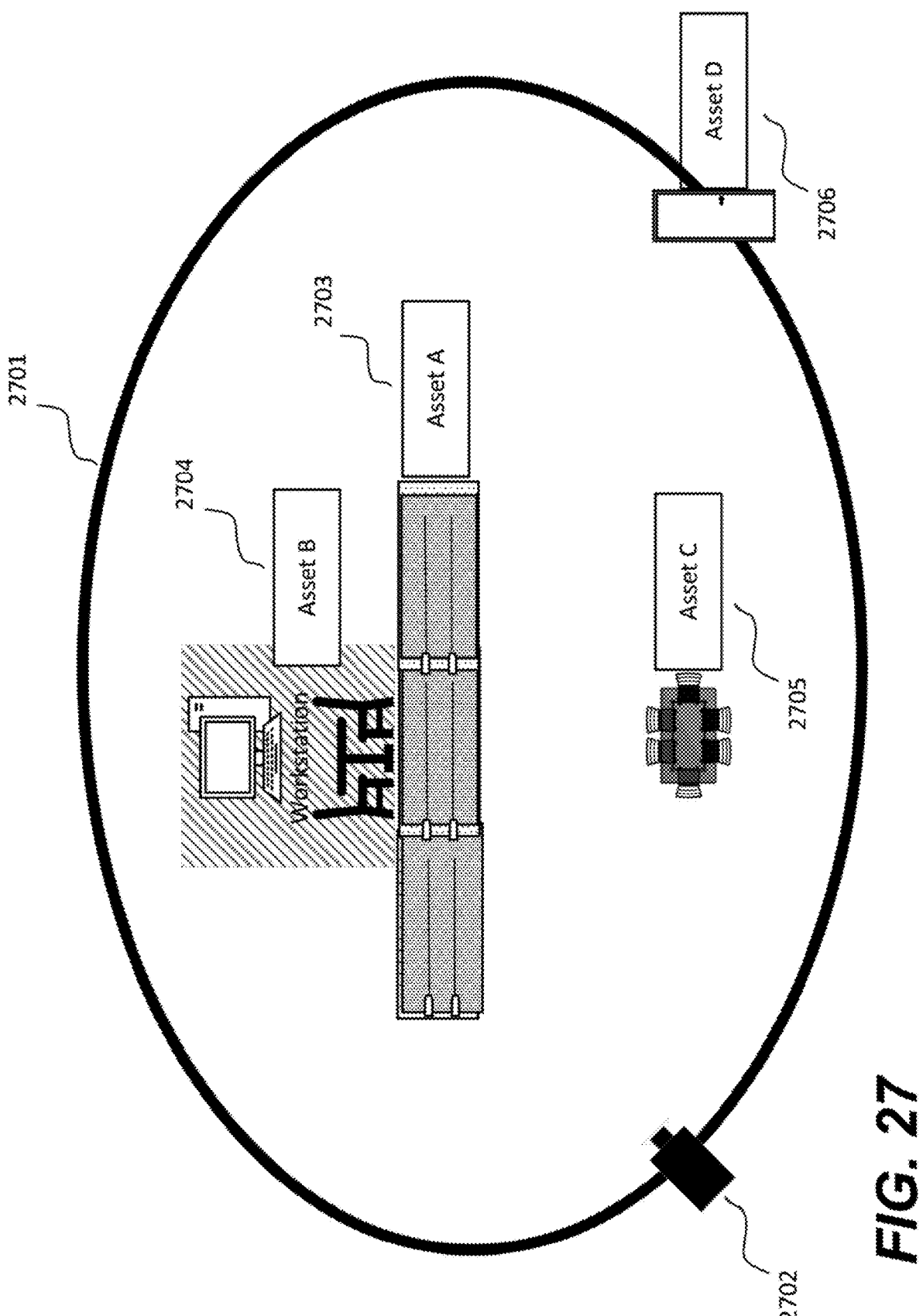
FIG. 27 shows a diagram of a scene in some examples.

FIG. 27 shows a diagram of a scene 2701 in some examples. A camera represents a virtual figure with a viewing position corresponding to an end user. The camera enters the scene 2701 at a default entry location 2702. The scene 2701 includes asset A, asset B, asset C and asset D. Asset A is a floor-to-ceiling set of bookcases as shown by 2703. Asset B is a computer desk as shown by 2704. Asset C is a conference table as shown by 2705. Asset D is a doorway to another scene, as shown by 2706.

In the FIG. 27 example, asset B is not visible from the default location 2702, because the asset B is completely hidden by asset A. In FIG. 27, asset B is shaded to indicate that asset B is invisible to the camera at the default entry location 2702.

In some examples, before the assets for a scene are streamed to the end device, an asset prioritizer is used to analyze the assets for the scene and assign priority values for each asset according to visibility of the asset with regard to a default entry location of the scene.

Figure 28:
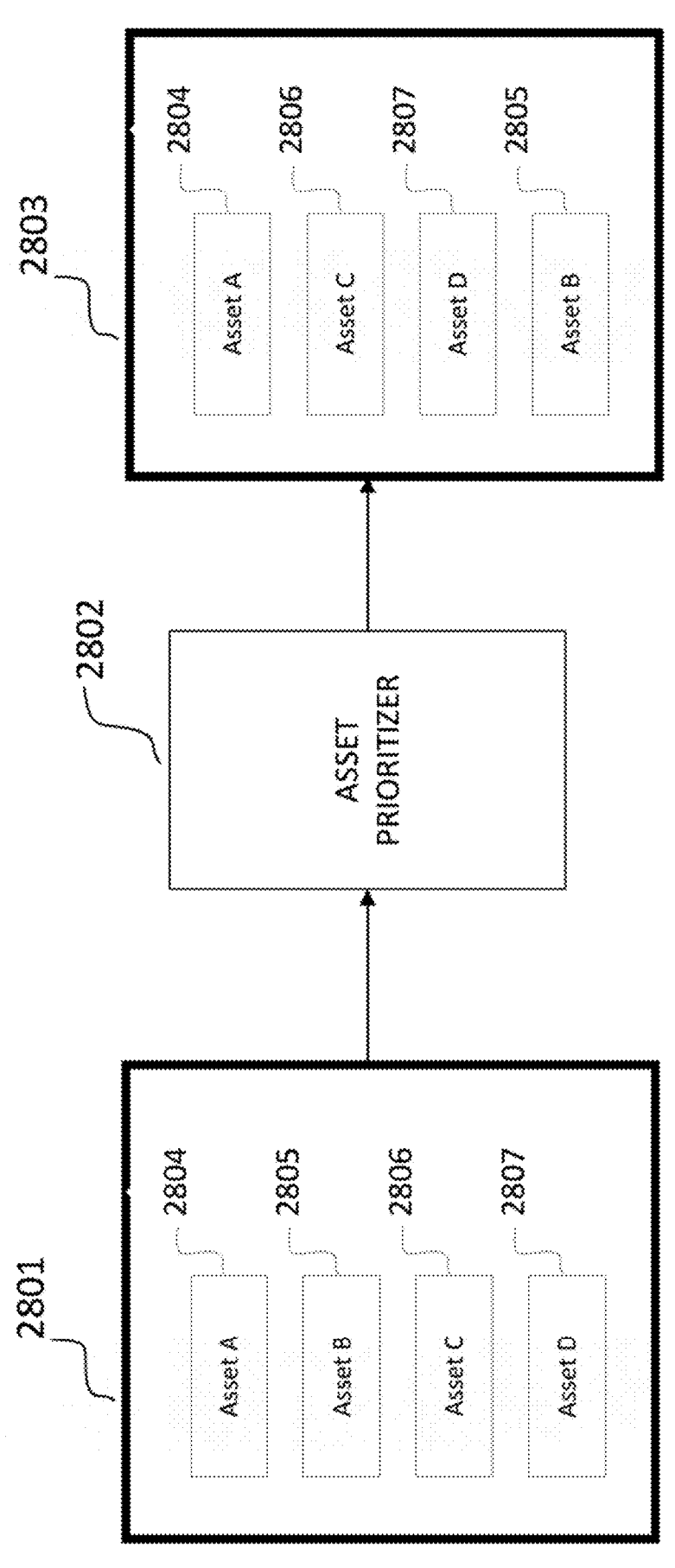
FIG. 28 shows a diagram for reordering assets in a scene in some examples.

FIG. 28 shows a diagram for reordering assets in a scene (e.g., the scene 2701) in some examples. In the FIG. 28 example, an asset prioritizer 2802 is used to assign a priority value to each asset in a scene. For example, a scene (such as the scene 2701 in FIG. 27) relies on asset A (as shown by 2804), asset B (as shown by 2805), asset C (as shown by 2806) and asset D (as shown by 2807). Initially, the four assets are in an asset order of asset A, asset B, asset C and asset D, as shown by 2801. The asset prioritizer 2802 analyzes visibility of the assets according to a default entry location for entering the scene. For example, assets A, C and D are visible from the default entry location and asset B is invisible from the default entry location. The asset prioritizer 2802 assigns priority values to the assets according to the visibility. For example, the asset prioritizer 2802 assigns a high priority value to asset A, asset C and asset D, and assigns a low priority value to asset B. The four assets can be reordered according to the priority values, such as in an order of asset A, asset C, asset D and asset B, as shown by 2803.

In an example, the reordered assets can be streamed by a media server to an end device.

Figure 29:
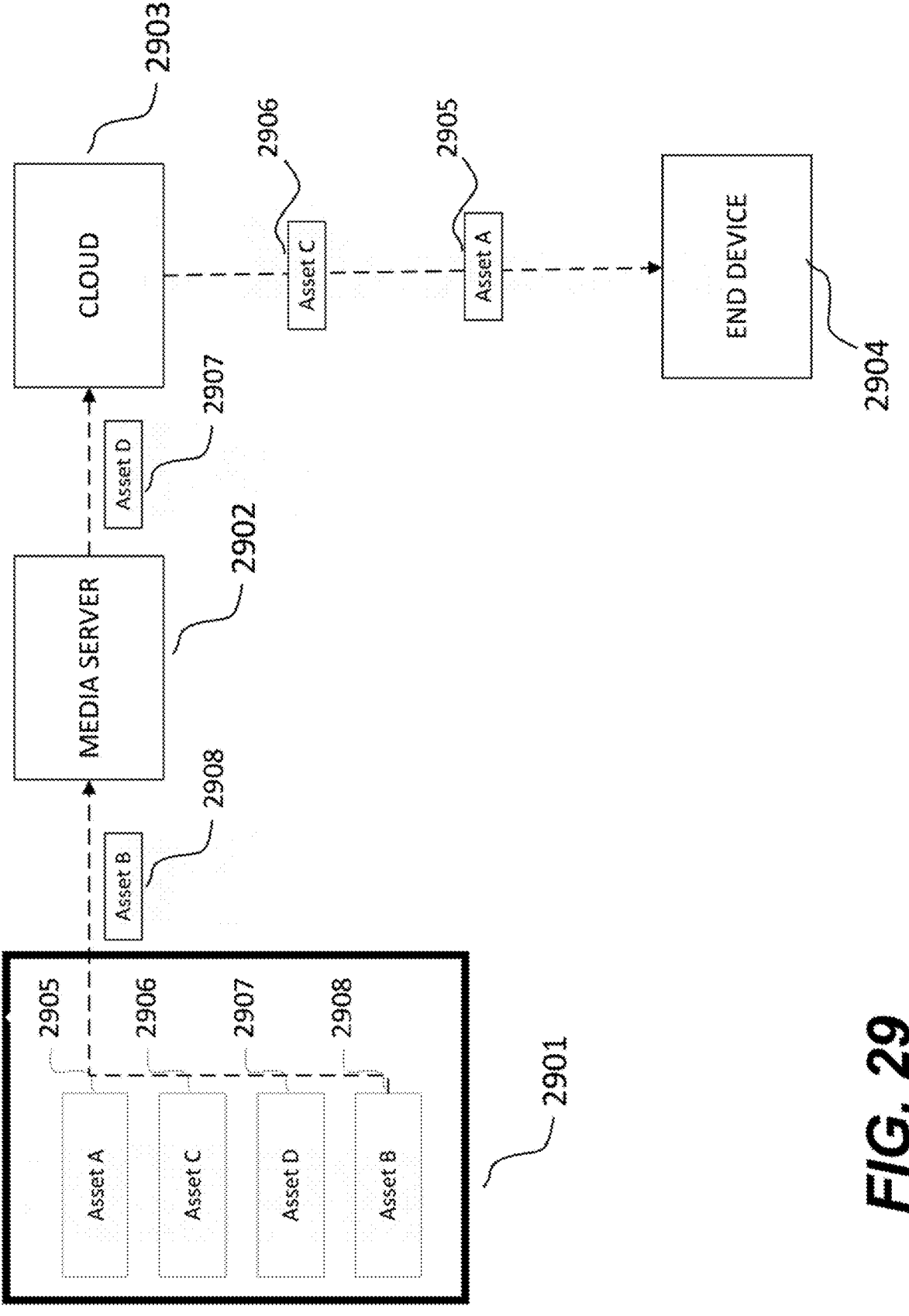
FIG. 29 shows a diagram of an example for streaming scene-based immersive media to an end device in some examples.

FIG. 29 shows a diagram of an example for streaming scene-based immersive media to an end device in some examples. In the FIG. 29 example, a scene (e.g., the scene 2701) of the scene-based immersive media includes four assets that are reordered according to priority values of the four assets, such as in an order of asset A, asset C, asset D and asset B from high to low as shown by 2901. The four assets are provided by a media server 2902 to an end device 2904 through a cloud 2903 in the order of the priority values. For example, the four assets are retrieved and sent to the end device 2904 by an order of asset A (shown by 2905), asset C (shown by 2906), asset D (shown by 2907) and asset B (shown by 2908).

According to an aspect of the disclosure, the asset prioritizer 2802 may assign the priority values to assets in a scene based on the visibility of the assets. In an example, the visible assets are assigned with the highest priority value, so that the visible assets are streamed first and can arrive at the end user more quickly for rendering. Comparing a first streaming order in FIG. 24 and a second streaming order in FIG. 29, the end device 2904 can start showing visible assets of the scene earlier than the end device 2404.

In some examples, the asset prioritizer 2802 may assign priority value to an asset based on whether the asset is blocked from a camera view by another asset. The priority value can be assigned according to a policy of "visible assets first, non-visible assets after all visible assets", so that a series of assets can be rendered in an order that shows the end user all of the visible assets more quickly.

In some examples, the asset prioritizer 2802 may assign priority value to an asset based on whether other assets occlude this asset, because other assets are between this asset and a light source. The priority value can be assigned according to a policy of "visible assets first, non-visible assets after all visible assets", so that a series of assets can be rendered in an order that shows the end user all of the visible assets more quickly.

Figure 30:
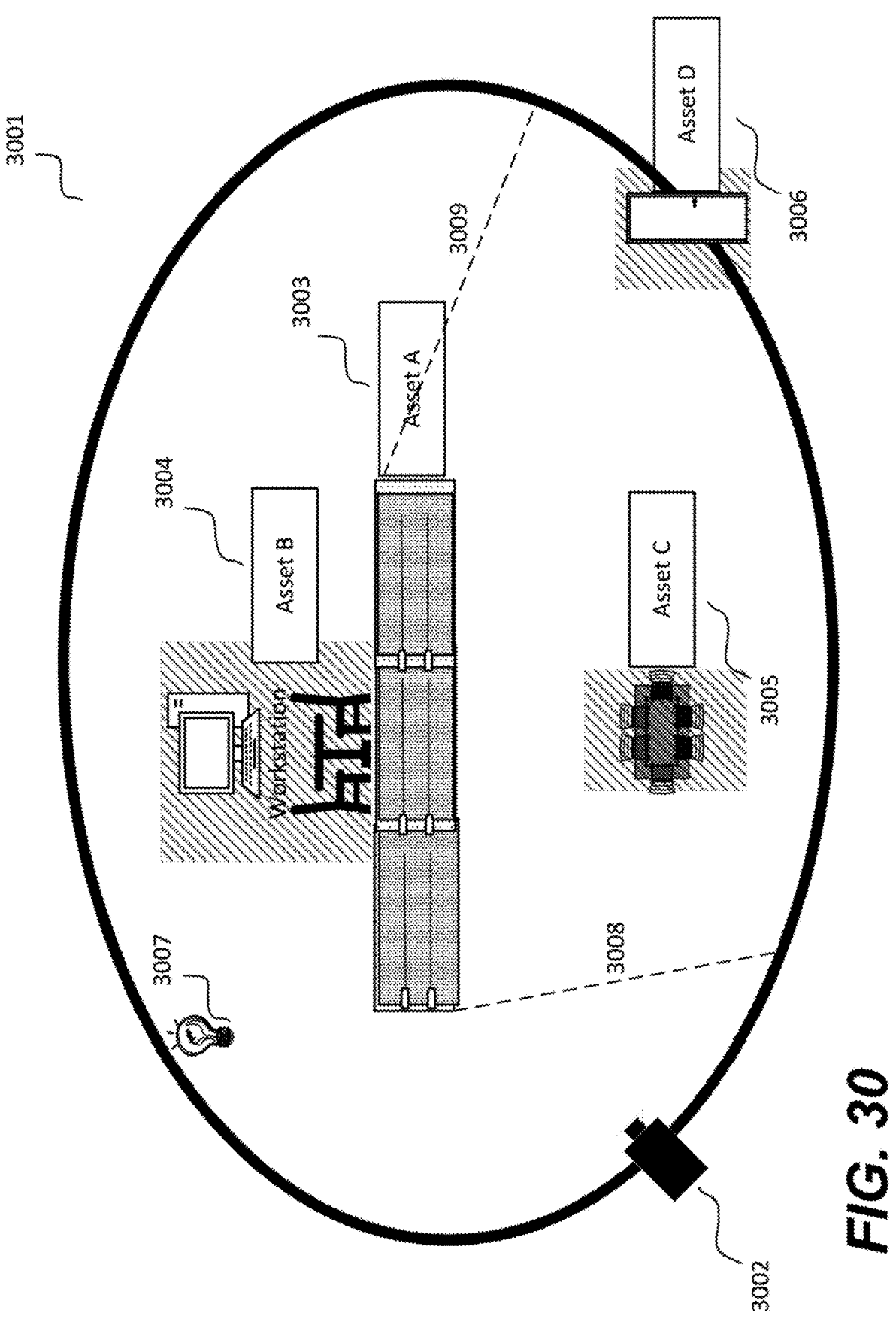
FIG. 30 shows a diagram of a scene in some examples.

FIG. 30 shows a diagram of a scene 3001 in some examples. The scene 3001 is similar to the scene 2701 in FIG. 27. A camera represents a virtual figure with a viewing position corresponding to an end user. The camera enters the scene 3001 at a default entry location 3002. The scene 3001 includes asset A, asset B, asset C and asset D. Asset A is a floor-to-ceiling set of bookcases as shown by 3003. Asset B is a computer desk as shown by 3004. Asset C is a conference table as shown by 3005. Asset D is a doorway to another scene, as shown by 3006. Asset B is not visible from the default entry location 3002, because the asset B is completely hidden by asset A. In FIG. 30, asset B is shaded to indicate that asset B is invisible to the camera at the default entry location 3002.

FIG. 30 further shows a light source 3007. Due to the position of the light source 3007, the conference table 3005 and the doorway 3006 are both occluded by the shadow of the bookcases 3003 (e.g., between 3008 and 3009). Thus, asset C and asset D are not visible to the camera, so the asset prioritizer 2802 can lower the priories of asset C and asset D in an example.

In some examples, the media server may have the content description in two parts: Media Presentation Description (MPD) describing the manifest of the available scenes, various alternatives, and other characteristics; and multiple scenes with varying assets. The prioritization assigned by the asset prioritizer may also be included in the manifest in the MPD.

In some examples, priority values of assets in a scene of a scene based immersive media may be defined by the server device or the sender device. The priority values of the assets may be included in the MPD and provided to the client device. In an example, the priority values can be changed by the client device during the session of playing the scene based immersive media.

Some aspects of the disclosure provide a method for dynamic adaptive streaming for light field based display according to assigned asset priority values. The assets can be transmitted (e.g., streamed) based on the assigned asset priority values. In some examples, an assigned asset priority value to an asset is lowered in response to the asset being blocked from a camera view by one or more other assets and thus not visible. In some examples, an asset priority value to an asset is lowered when the asset is occluded from one or more light sources, by one or more other assets, and is not visible to the camera. In some examples, the priority values (asset priority values) are adjusted based on a feedback from client devices, such as an updated camera position.

According to fifth aspects of the disclosure, assets in a scene based immersive media, such as scene based immersive media for light field based display (e.g., lightfield display, holographic display, etc.) can be prioritized based on multiple policies.

According to an aspect of the disclosure, not all assets in a stream arrive at an end device at the same moment in time, for various reasons, including, but not limited to differences in the size of assets. Further, not all assets are equally valuable at any moment in time for various reasons, including but not limited to some assets being occluded behind other assets. For various reasons, a client may wish to prioritize assets.

In an example, a client's end device may have sufficient local resources to perform all asset prioritization itself, given a sufficiently detailed manifest describing the assets used in the scene. In many foreseeable situations, this may not be the case, for a variety of reasons (ex. available processor power, or the need to offload asset prioritization and preserve available battery life). Some aspects of the disclosure provide a way to prioritize assets for streaming on behalf of the client's end device. For example, the priority values of assets are assigned outside the client's end device, and are determined by one or more prioritization schemes.

In some examples, before the assets for a scene are streamed to the end device, an asset prioritizer is used to analyze the assets needed for the scene and assign priorities for each asset.

Figure 31:
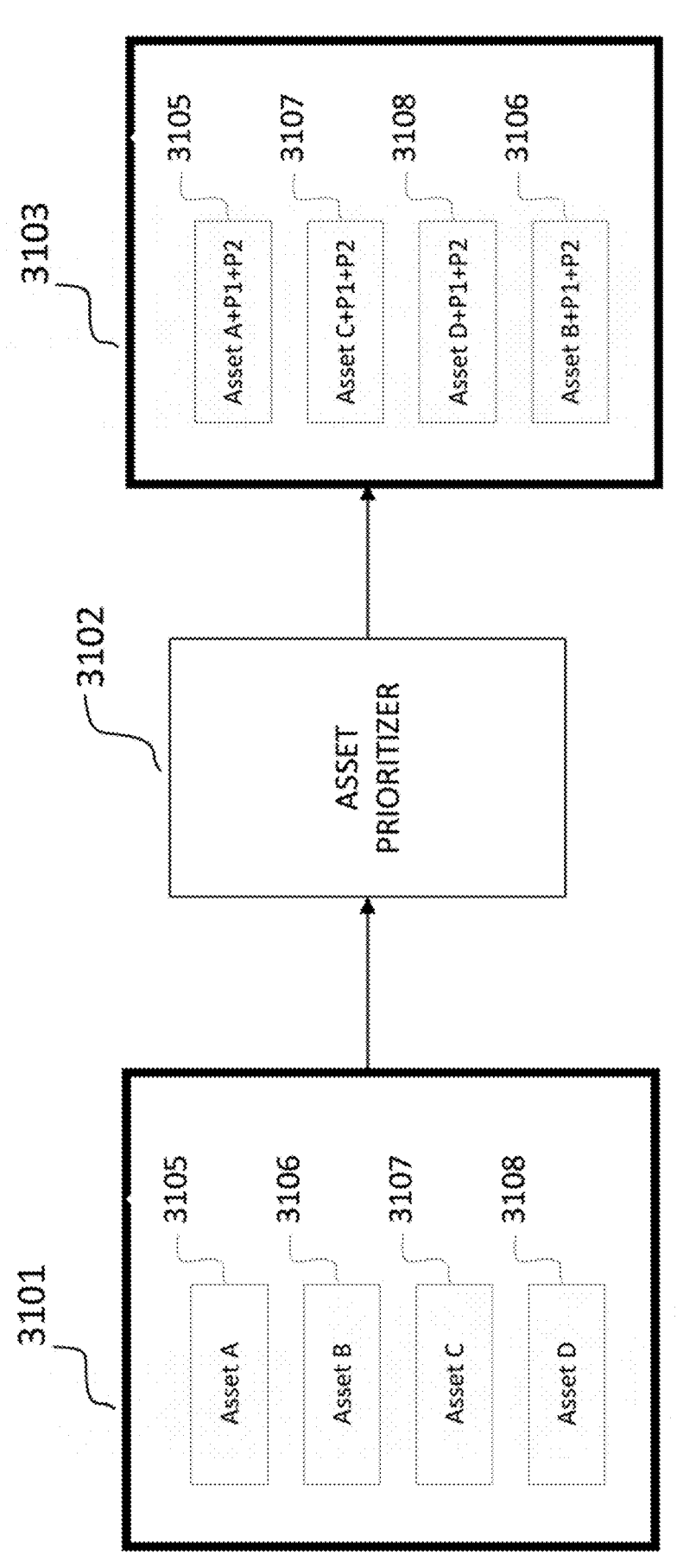
FIG. 31 shows a diagram for assigning priority values to assets in a scene in some examples.

FIG. 31 shows a diagram for assigning priority values to assets in a scene in some examples. In the FIG. 31 example, an asset prioritizer 3102 is used to assign one or more priority values to each asset in a scene. For example, a scene (such as the scene 2701 in FIG. 27) relies on asset A (as shown by 3105), asset B (as shown by 3106), asset C (as shown by 3107) and asset D (as shown by 3108). Initially, the four assets are in an asset order of asset A, asset B, asset C and asset D, as shown by 3101. The asset prioritizer 3102 assigns priority values to the assets according to multiple policies. The assets are reordered according to the assigned priority values. In FIG. 31, the assets A-D are reordered according to the assigned priority values in an order of asset A, asset C, asset D and asset B, as shown by 3103. It is also noted that each asset in 3103 now carries one or more the priority values assigned by the asset prioritizer 3102, such as two priority values shown by +P1+P2 for each asset. In an example, the asset prioritizer 3102 can assign a first set of priority values, such as P1 to each asset in the scene according to a first priority policy, and assign a second set of priority values, such as P2 to each asset in the scene according to a second priority policy. The assets can be reordered according to the first set of priority values or can be reordered according to the second set of priority values.

In some examples, after the assets are prioritized, the assets are requested and streamed in a priority order.

Figure 32:
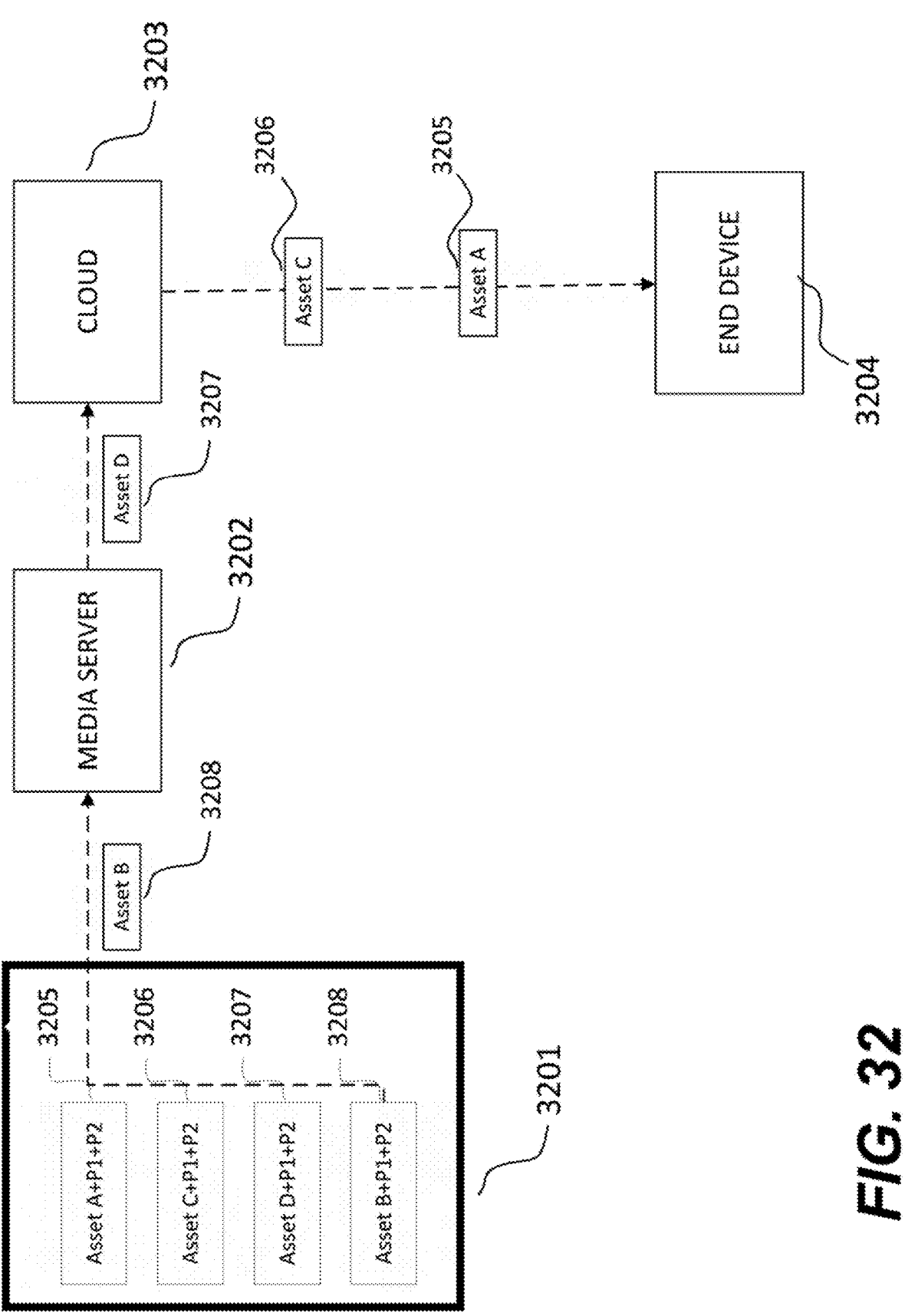
FIG. 32 shows a diagram of an example for streaming scene-based immersive media to an end device in some examples.

FIG. 32 shows a diagram of an example for streaming scene-based immersive media to an end device in some examples. In the FIG. 32 example, a scene of the scene-based immersive media includes four assets that are reordered according to priority values of the four assets, such as in an order of asset A, asset C, asset D and asset B from high to low as shown by 3201. The four assets are provided by a media server 3202 to an end device 3204 through a cloud 3203 in the order of the priority values. For example, the four assets are retrieved and sent to the end device 3204 by an order of asset A (shown by 3205), asset C (shown by 3206), asset D (shown by 3207) and asset B (shown by 3208).

According to an aspect of the disclosure, when an end device requests the assets of a scene in prioritization order, the end device may be able to begin rendering the scene more quickly.

It is noted that the asset prioritizer 3102 can use any ranking criteria that provides an improved use experience as a basis for assigning priority values to assets.

In some examples, the asset prioritizer 3102 may use more than one prioritization schemes, and assign more than one priority values to each asset, so that the media server 3202 can then use the most appropriate prioritization scheme for each end device 3204.

In an example, an end device 3204 is at the end of a relatively long and/or low bitrate network path from the media server 3202, the end device 3204 may benefit from a prioritization scheme that ranks assets from smallest file size to largest file size, so that the end device can begin rendering more assets quickly, without waiting for larger assets to arrive. In another example, the end device 3204 is at the end of a shorter and faster network path from the media server 3202, the asset prioritizer 3102 might assign a separate priority to each asset based on whether the asset is blocked from the camera view by another asset. This priority policy might be as simple as "visible assets first, non-visible assets after all visible assets", so that the media server 3202 can provide a series of assets in an order that allows the end device to show the end user all of the visible assets more quickly.

In some examples, the media server 3202 may include the assigned priority values of assets in a description (e.g., MPD) transferred to the end device 3204. A client at the end device 3204 can use additional prioritization schemes not supported by the asset prioritizer 3102, while relying on assigned priority values in the description as tiebreakers, when two or more assets have the same client-assigned priority value (e.g., a prioritization scheme with a small number of distinct possible values, such as "visible"/"not visible").

Some aspects of the disclosure provide a method for dynamic adaptive streaming for light field based display based on assigned asset priority values. In some examples, the order of assets in asset streaming may be based on one of multiple assigned asset priority values, assigned using distinct asset prioritization schemes. In some examples, the same set of assets may be transferred to different clients in different orders, based on priority values assigned to each asset in the set using different asset prioritization schemes. In some examples, asset prioritizer-assigned priority values are transferred with the asset descriptions to the client, asset prioritizer-assigned priority values allow clients to use asset prioritization schemes that are not supported by the asset prioritizer, while relying on the asset prioritizer-assigned priority values to prioritize assets that have the same client-assigned asset priority values. In some examples, priority values can be adjusted by the asset prioritizer based on feedback from clients.

According to sixth aspects of the disclosure, assets in a scene based immersive media, such as scene based immersive media for light field based display (e.g., lightfield display, holographic display, etc.) can be prioritized based on a distance within field of view.

According to an aspects of the disclosure, not all assets in a stream are equally relevant at any moment in time, because some assets may be out of a field of view of a user (e.g., represented by a virtual figure or represented by a virtual camera) when the user enters a scene. In order to minimize the delay until assets that are most visible and noticeable to the end user are available to the end device, the assets that are visible within the field of view at a default entry location of a scene where the user enter the scene can be prioritized. In some examples, an asset in a scene can be prioritized according to whether the asset is within the field of view of the renderer's virtual camera, and the distance of the asset from the virtual camera position used to render the view presented to the user.

Figure 33:
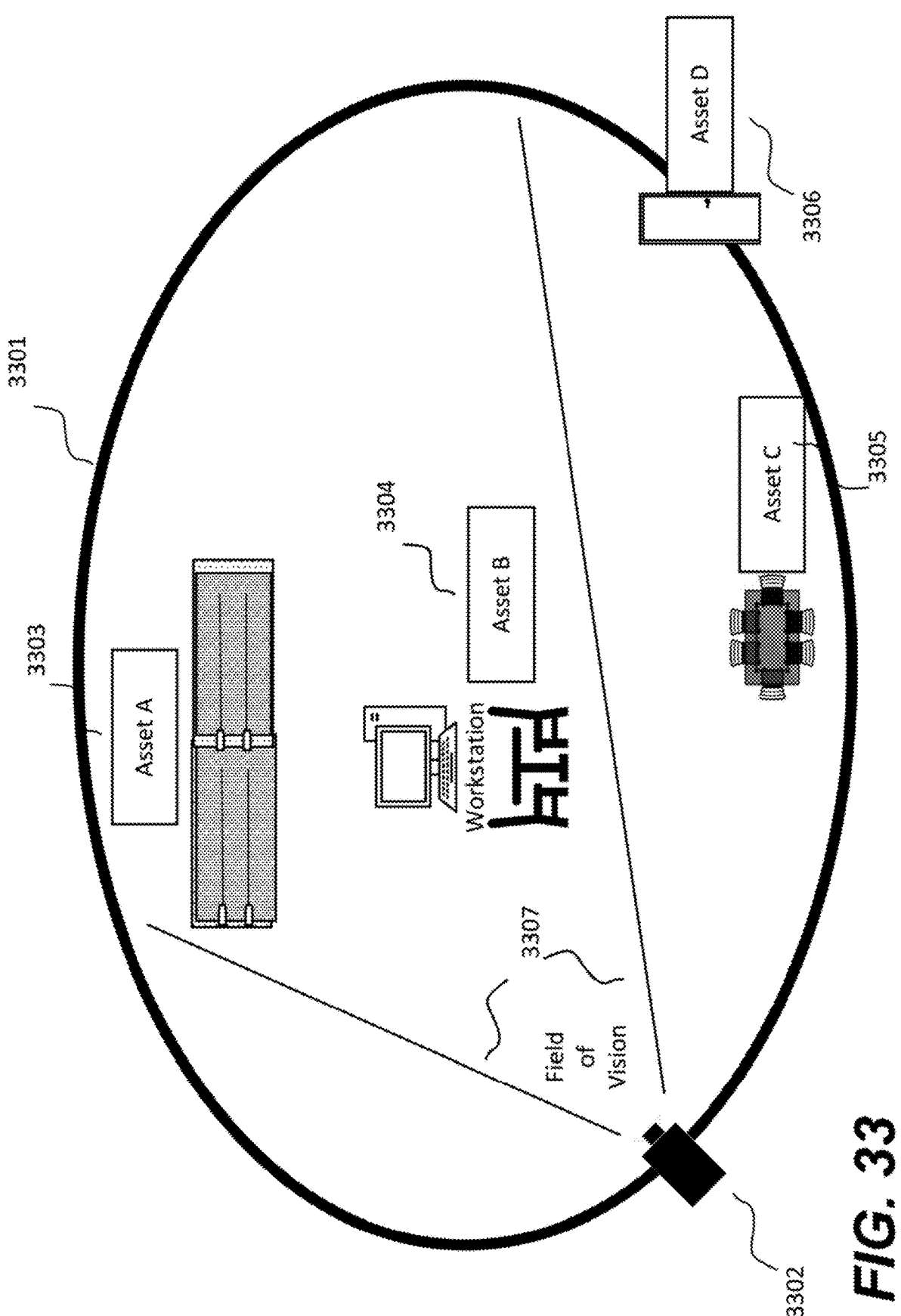
FIG. 33 shows a diagram of a scene in some examples.

FIG. 33 shows a diagram of a scene 3301 in some examples. The scene 3301 is similar to the scene 2701 in FIG. 27. A camera represents a virtual figure with a viewing position corresponding to an end user. The camera enters the scene 3301 at a default entry location 3302 (also referred to as initial location). The scene 3301 includes asset A, asset B, asset C and asset D. Asset A is a floor-to-ceiling set of bookcases as shown by 3303. Asset B is a computer desk as shown by 3304. Asset C is a conference table as shown by 3305. Asset D is a doorway to another scene, as shown by 3306.

When a virtual camera enters the scene 3301 at the default entry location 3302, some assets are immediately visible, but other assets may not be. The virtual camera's field of vision (also referred to as field of view) 3307 is limited and does not include the entire scene. In FIG. 33 example, asset A and asset B are visible from the virtual camera's initial location 3302 because they are within the field of vision 3307 from the virtual camera. It is noted that asset A is further than Asset B from the virtual camera's initial location 3302.

In FIG. 33, asset C and asset D are not visible from the virtual camera's initial location 3302, because they are outside the field of vision 3307 from the virtual camera.

In some examples, before the assets for a scene are streamed to the end device, an asset prioritizer is used to analyze the assets needed for the scene and assign priority values for each asset according to a field of view associated with the default entry location of the scene, and a distance of the asset to the default entry location of the scene.

Figure 34:
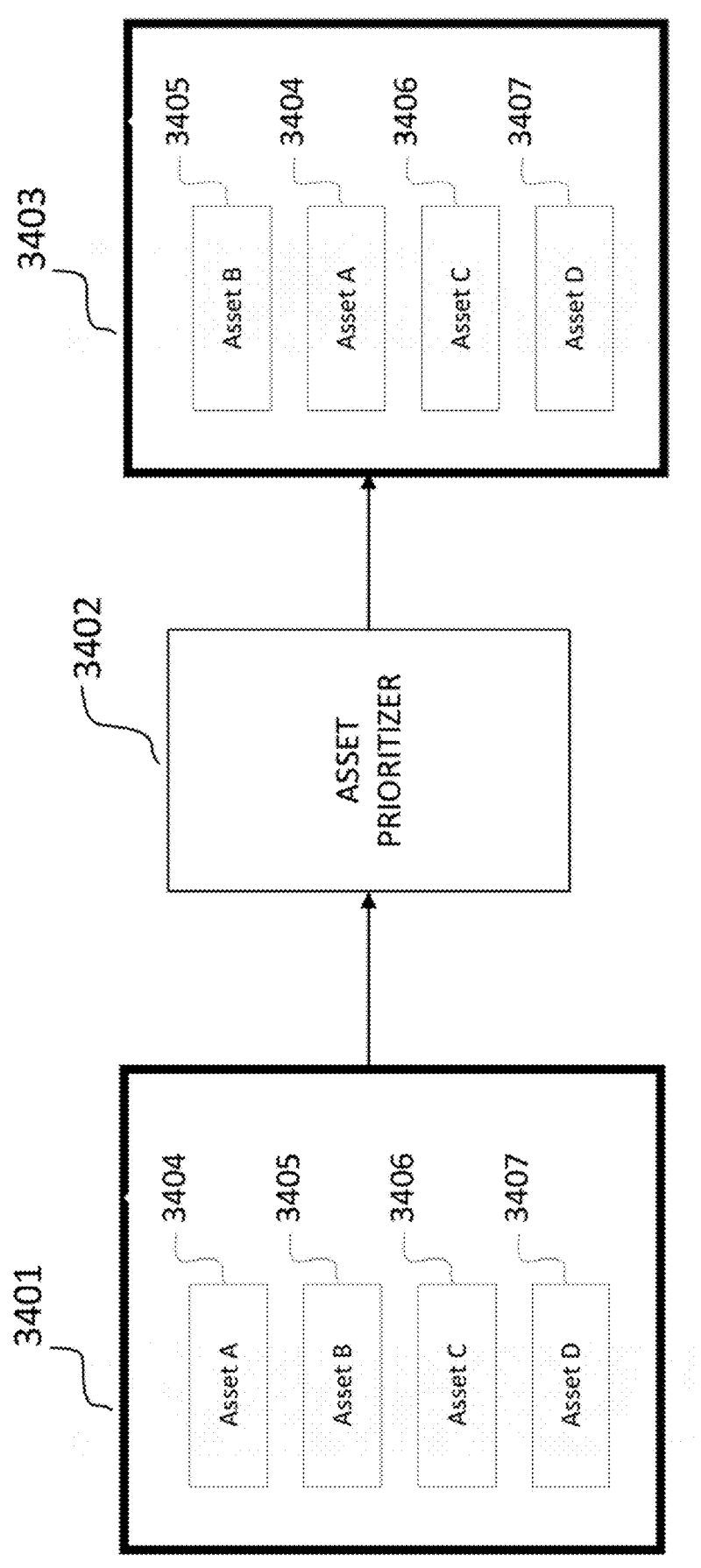
FIG. 34 shows a diagram for reordering assets in a scene in some examples.

FIG. 34 shows a diagram for reordering assets in a scene in some examples. In the FIG. 34 example, an asset prioritizer 3402 is used to assign a priority value to each asset in a scene. For example, a scene (such as the scene 3301 in FIG. 33) relies on asset A (as shown by 3404), asset B (as shown by 3405), asset C (as shown by 3406) and asset D (as shown by 3407). Initially, the four assets are in an asset order of asset A, asset B, asset C and asset D, as shown by 3401. The asset prioritizer 3402 analyzes the assets according to the field of view at a default entry location for entering the scene and a distance in the field of view from the default entry location. In some examples, a priority value of an asset may be determined based on whether the asset is visible within the camera field of view. In some examples, the priority value of an asset may be based on the relative distance of the asset from the camera. For example, assets A and B are withing the field of view and are visible from the default entry location and assets C and D are out side of the field of view and invisible from the default entry location. Further, asset B has a shorter distance to the default entry location than the asset A. The four assets can be reordered according to the priority values, such as in an order of asset B, asset A, asset C and asset D, as shown by 3403.

In an example, the reordered assets can be streamed by a media server to an end device.

Figure 35:
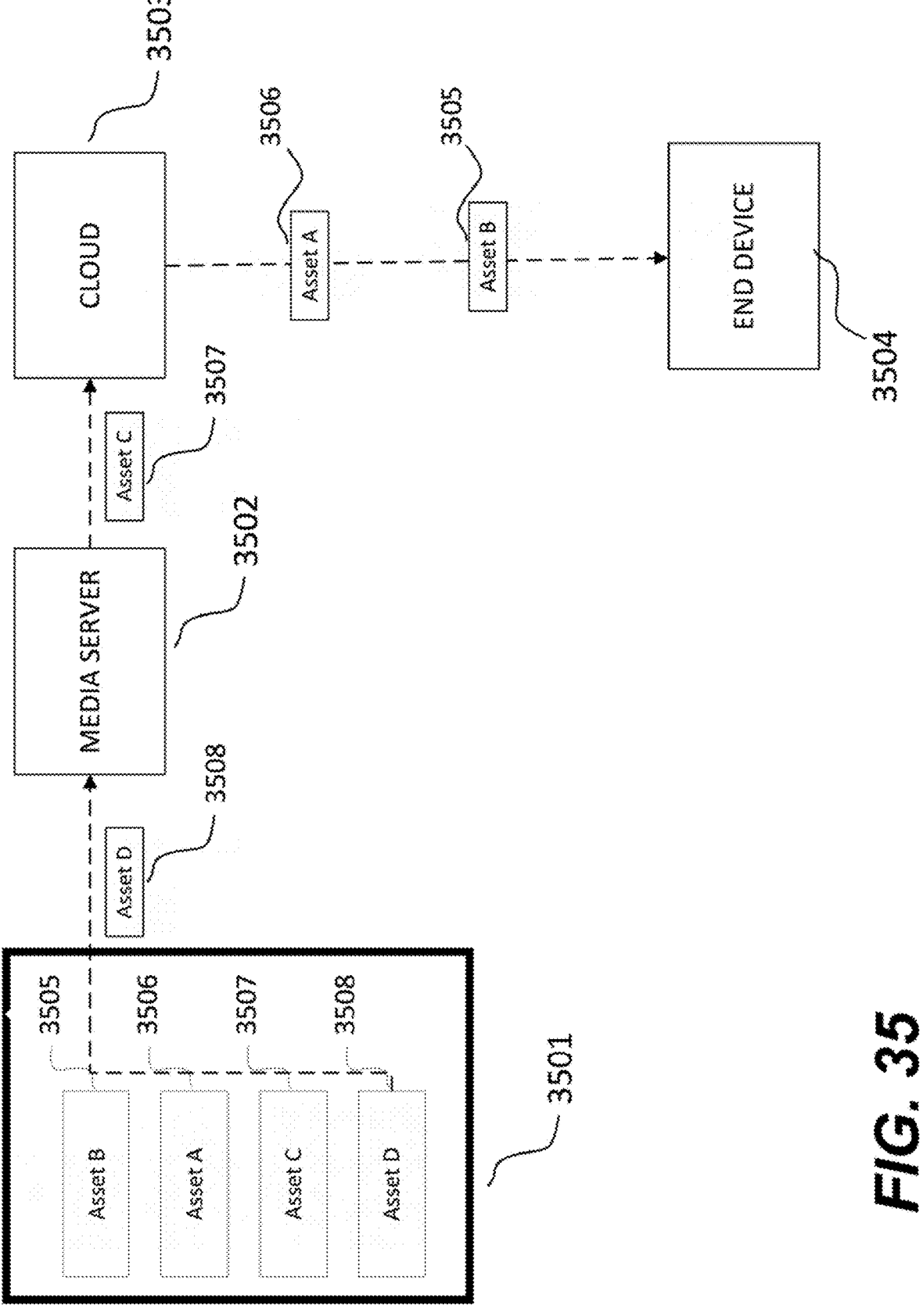
FIG. 35 shows a diagram of an example for streaming scene-based immersive media to an end device in some examples.

FIG. 35 shows a diagram of an example for streaming scene-based immersive media to an end device in some examples. In the FIG. 35 example, a scene of the scene-based immersive media includes four assets that are reordered according to priority values of the four assets, such as in an order of asset B, asset A, asset C and asset D from high to low as shown by 3501. The four assets are provided by a media server 3502 to an end device 3504 through a cloud 3503 in the order of the priority values. For example, the four assets are retrieved and sent to the end device 3504 by an order of asset B (shown by 3505), asset A (shown by 3506), asset C (shown by 3507) and asset D (shown by 3508).

Comparing a first streaming order in FIG. 24 and a second streaming order in FIG. 35, the visible assets are streamed first, and thus the end device 3504 can render visible assets of the scene quicker than the end device 2404.

In some examples, the asset prioritizer 3402 can assign priority values for assets based on the field of vision of the virtual camera and the distance from the virtual camera, so that the assets closest to the user, within the field of vision, are rendered first.

In some examples, assets outside the field of view (also referred to as field of vision) may not be scheduled for transmission to the end device 3504 until all assets within the field of vision have been scheduled for transmission. There may be a delay before assets outside the field of vision are scheduled for transmission. In an extreme case, if a user looks quickly into a scene and backs out of the scene to enter another scene, the assets that have not been scheduled for transmission might not be scheduled, until the departed user re-enters the scene.

Figure 36:
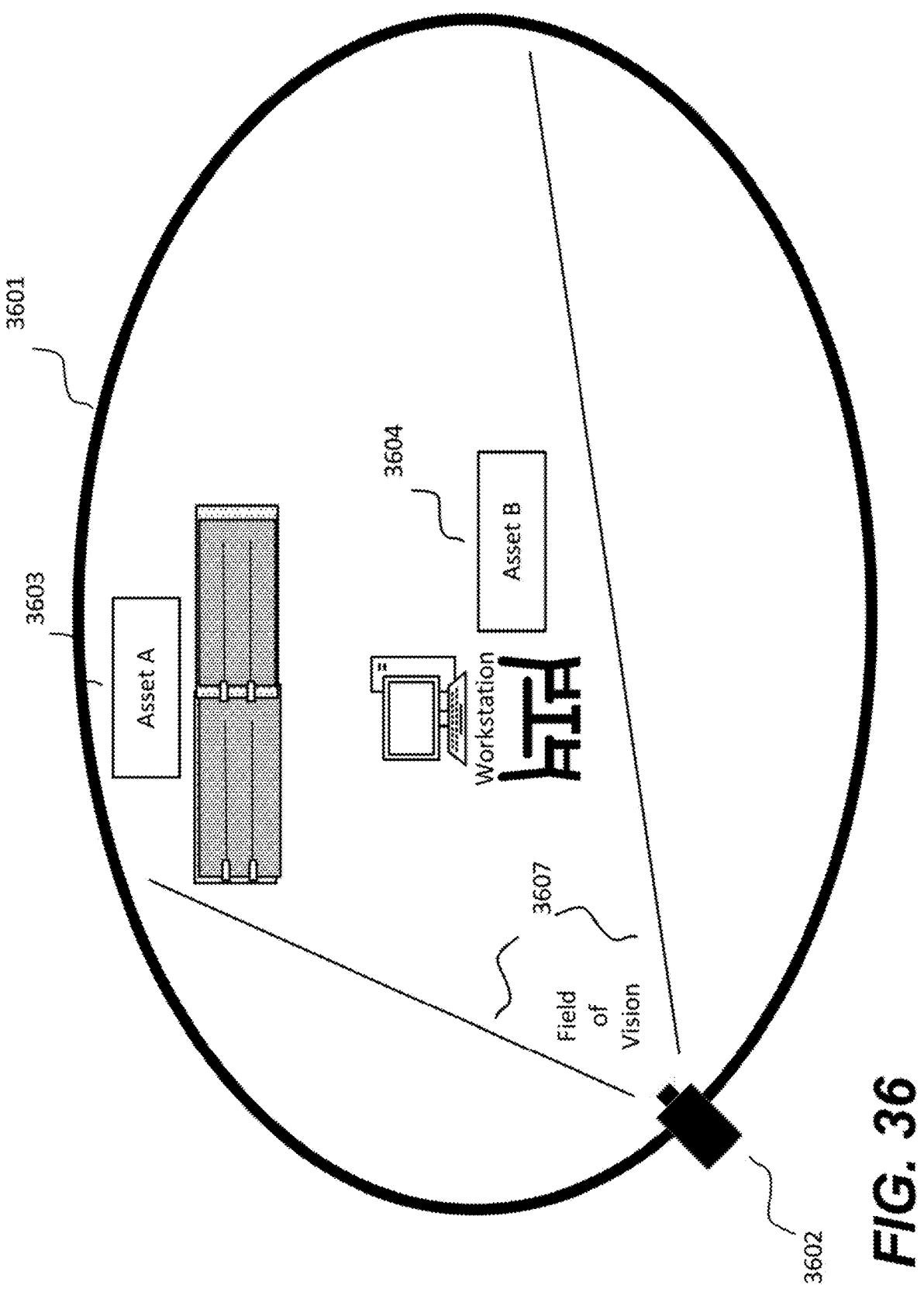
FIG. 36 shows a diagram of a displayed scene in some examples.

FIG. 36 shows a diagram of a displayed scene 3601 in some examples. The displayed scene 3601 corresponding to the scene 3301. In the displayed scene 3601, the bookcase 3603 and workstation 3604 have been retrieved and rendered, since they are the assets in the scene 3601 that are visible to the camera from the default entry location.

Some aspects of the disclosure provide a method for dynamic adaptive streaming for light field based display according to assigned asset priority values determined by whether an asset is within a field of view (also referred to as field of vision) of a camera (e.g., virtual camera corresponding to a user or player for an immersive media experience). In some examples, the assigned asset priority value of an asset is determined by a distance of an asset from a location of the camera. The assets can be transmitted in an order determined based on the asset priority values. In some examples, an asset priority value of an asset is lowered when the asset is outside the camera's field of view. In some examples, an asset priority value of an asset is lowered when the asset is farther away from the camera than another asset within the field of view. In some examples, priority values are adjusted based on feedback from one or more client devices.

According to seventh aspects of the disclosure, assets in a scene based immersive media, such as scene based immersive media for light field based display (e.g., lightfield display, holographic display, etc.) can be prioritized based on asset complexity.

According to an aspect of the disclosure, not all assets in a scene are equally complex, and do not require the same amount of computation from a computing resource (e.g., graphics processing unit (GPU)) in order to render the asset for display on an end device of an end user. In order to minimize the delay until the scene can be presented to the end user, the assets that make up the scene can be prioritized for streaming, based on the relative complexity of each asset present in the scene description in some examples.

Figure 37:
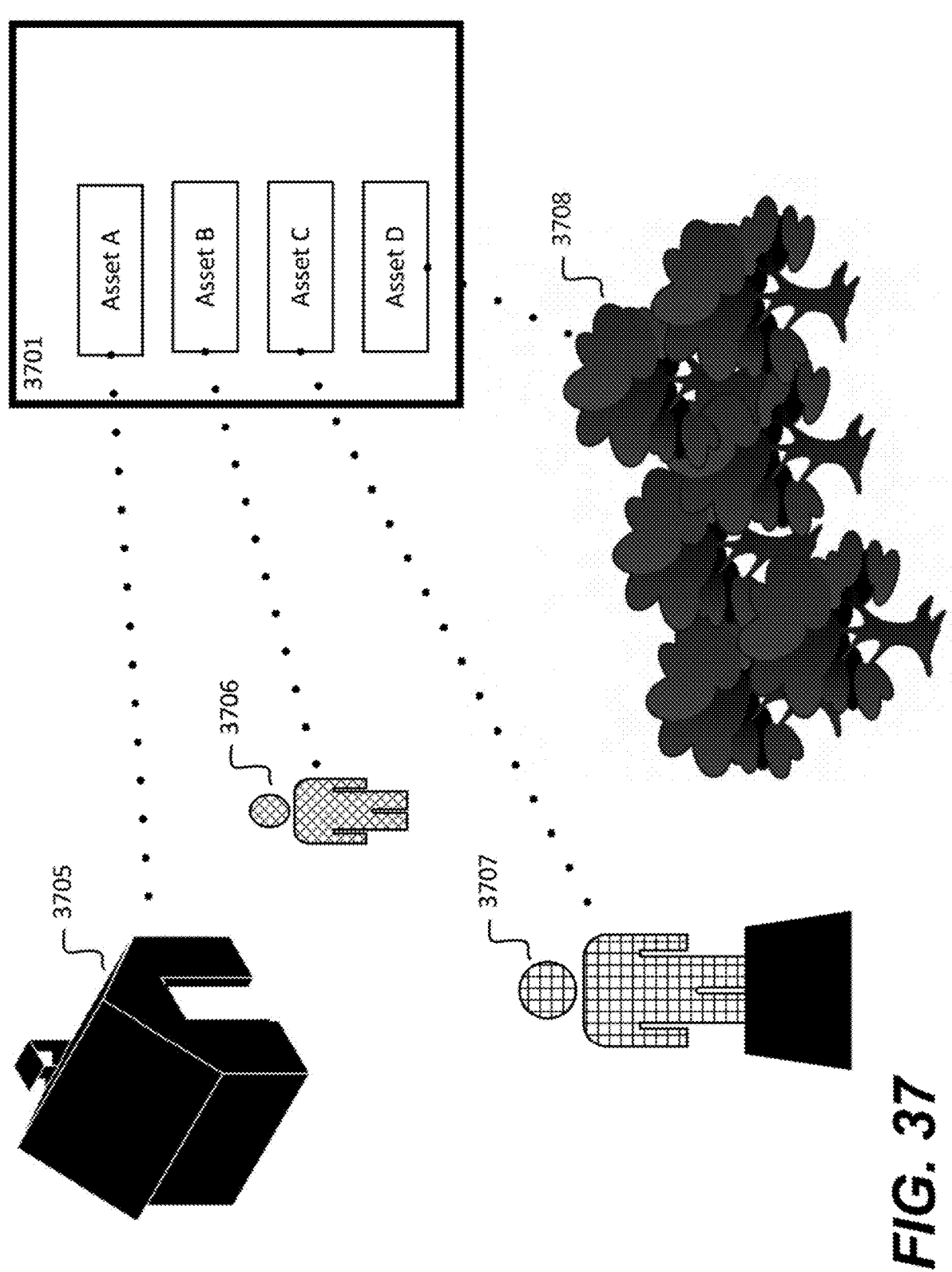
FIG. 37 shows a diagram for a scene 3701 in a scene based immersive media in an example.

FIG. 37 shows a diagram for a scene 3701 in a scene based immersive media in an example. The scene 3701 includes four assets: asset A, asset B, asset C and asset D. In FIG. 37, asset A is a modern house with a smooth exterior as shown by 3705, asset B is a realistic person as shown by 3706, asset C is a stylized human statue as shown by 3707, and asset D is a highly detailed tree line as shown by 3708.

In an example, when an end device requests the assets for the scene 3701, for example, the media server 2402 can provide the assets to the end device in an arbitrary order, such as in an order of asset A, asset B, asset C and asset D. The order in which assets become available to the end device may not provide an acceptable user experience.

It is noted that the assets in the scene 3701 are not of equal complexity, the assets do not all place the same computational load on a GPU in the end device. In the present disclosure, the number of polygons that make up an asset is used as a proxy representing computational load of the asset on a GPU. It is noted that other characteristics of an asset, such as surface properties, and the like can place a computational load on the GPU.

In some examples, the number of polygons that make up an asset is used to measure the complexity of the asset. In the assets of the scene 3701, asset A is a modern house with a smooth exterior and has a lowest number of polygons, asset C is a stylized human statue and has a second lowest number of polygons, asset B is a realistic person and has a second highest number of polygons, and asset D is a highly detailed tree line and has a highest number of polygons. Based on the number of polygons, the assets in the scene 3701 can be ranked from lowest complexity to the highest complexity in an order of asset A, asset C, asset B and asset D.

In some examples, before the assets for a scene are streamed to an end device, an asset prioritizer is used to analyze the assets needed for the scene and assign a priority value for each asset based on the relative complexity of the asset.

Figure 38:
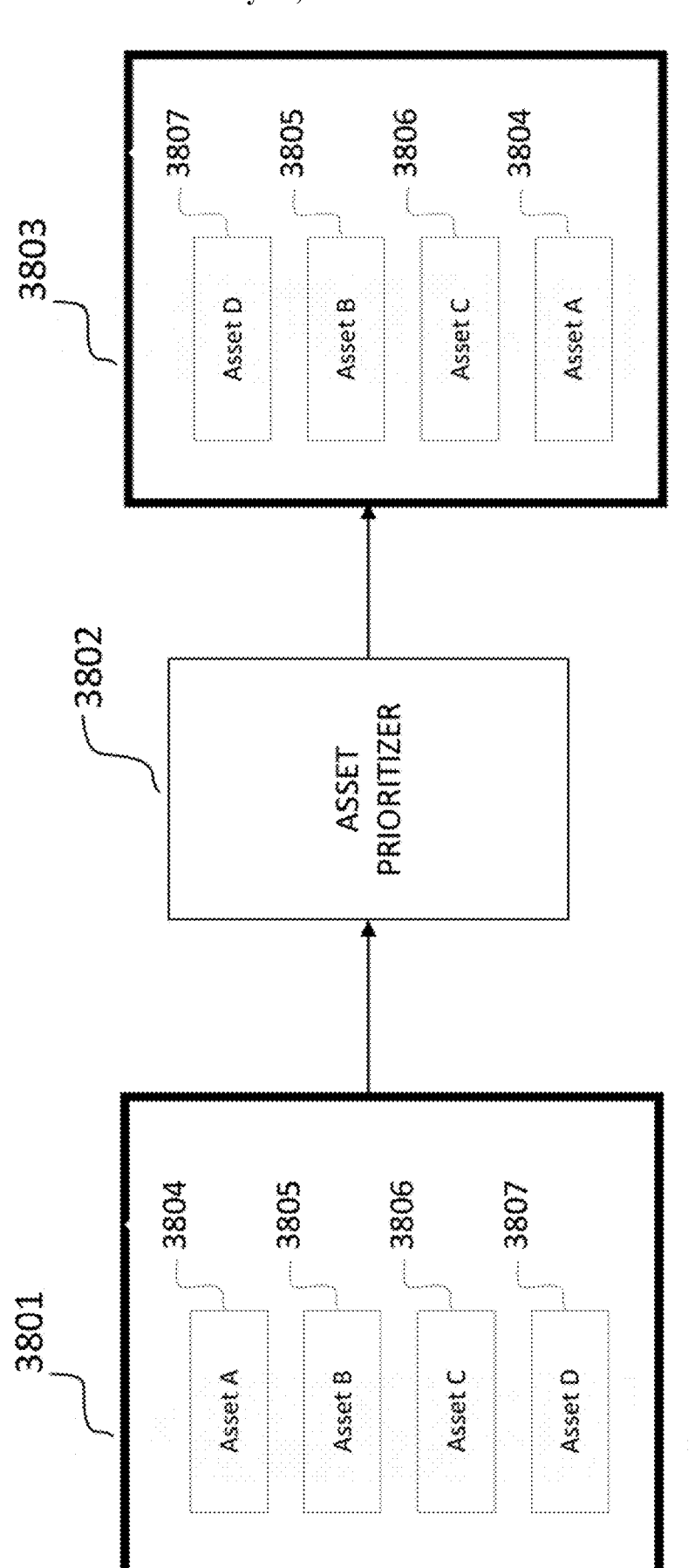
FIG. 38 shows a diagram for prioritizing assets in a scene in some examples.

FIG. 38 shows a diagram for prioritizing assets in a scene in some examples. In the FIG. 38 example, an asset prioritizer 3802 is used to assign a priority value to each asset in a scene based on relative complexity of the asset. For example, a scene (such as the scene 3701 in FIG. 37) relies on asset A (as shown by 3804), asset B (as shown by 3805), asset C (as shown by 3806) and asset D (as shown by 3807). Initially, the four assets are in an asset order of asset A, asset B, asset C and asset D, as shown by 3801. The asset prioritizer 3802 prioritizes (e.g., reorders) the assets according to the relative complexity of the assets, such as based on the number of polygons in each asset. For example, asset D has the highest number of polygons, and is assigned with a highest priority value (e.g., 4); asset B has the second highest number of polygons, and is assigned with a second highest priority value (e.g., 3); asset C has the second lowest number of polygons, and is assigned with a second lowest priority value (e.g., 2); and asset A has the lowest number of polygons, and is assigned with a lowest priority value (e.g., 1). The four assets can be reordered according to the priority values, such as in an order of asset D, asset B, asset C and asset A, as shown by 3803.

It is noted that while the number of polygons in an asset is used to evaluate complexity of the asset and determine priority value for the asset in the above example, other attributes of the asset that can affect the computation load on a GPU within an end device can be used to evaluate complexity and determine priority value.

In an example, the reordered assets can be streamed by a media server to an end device.

Figure 39:
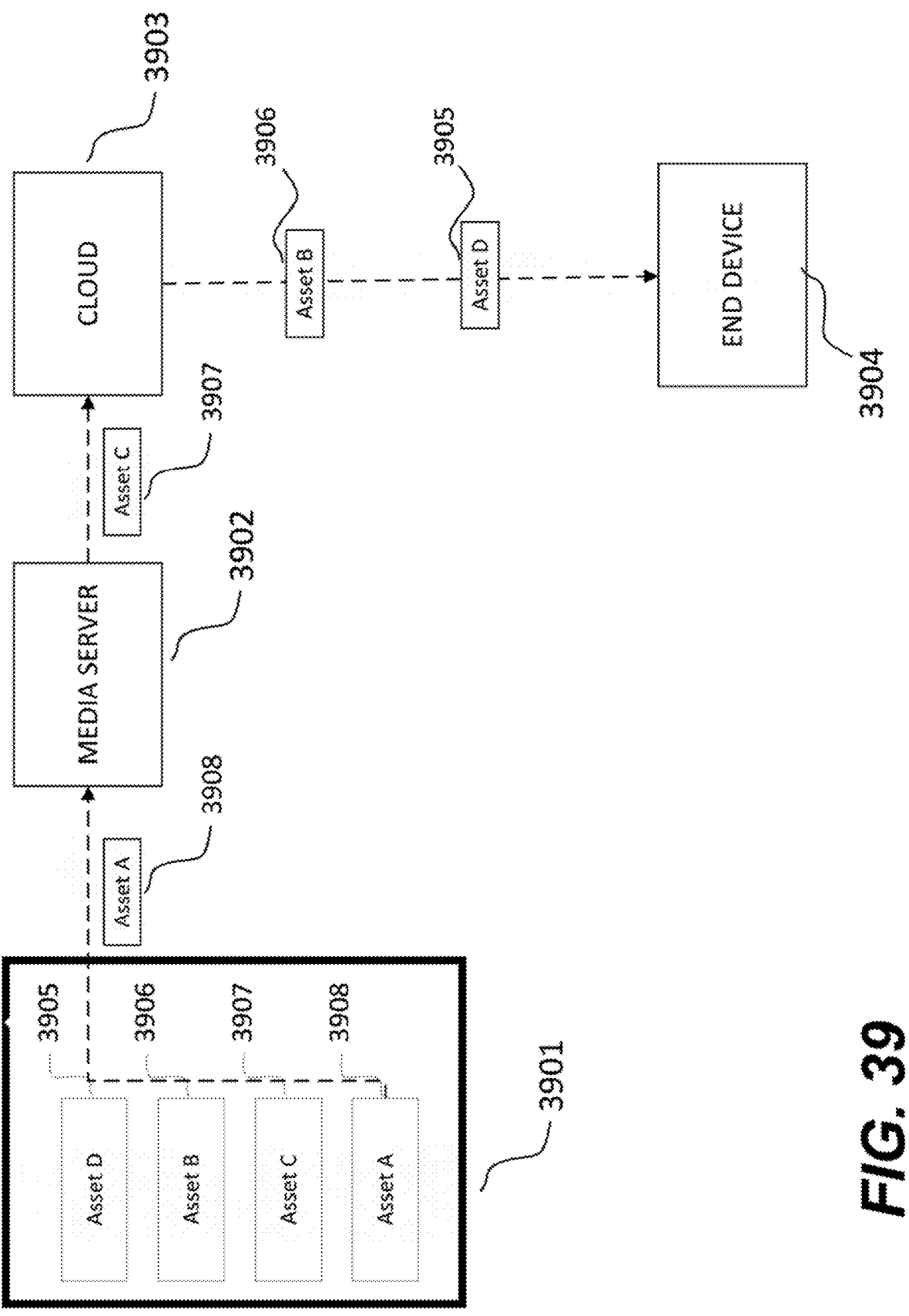
FIG. 39 shows a diagram of an example for streaming scene-based immersive media to an end device in some examples.

FIG. 39 shows a diagram of an example for streaming scene-based immersive media to an end device in some examples. In the FIG. 39 example, a scene of the scene-based immersive media includes four assets that are reordered according to priority values of the four assets, such as in an order of asset D, asset B, asset C and asset A from high to low as shown by 3901. The four assets are provided by a media server 3902 to an end device 3904 through a cloud 3903 in the order of the priority values. For example, the four assets are retrieved and sent to the end device 3904 by an order of asset D (shown by 3905), asset B (shown by 3906), asset C (shown by 3907) and asset A (shown by 3908).

Comparing a first streaming order in FIG. 24 and a second streaming order in FIG. 39, the end device 3904 can render the scene quicker than the end device 2404 since the time required to render the most complex asset acts as a minimum elapsed time for the entire scene to be rendered by the end device. In some examples, GPUs in the end device can be configured to be multithreaded, so that the GPUs can render less complex assets in parallel with the most complex assets, and the less complex assets can be available when the most complex assets have been rendered.

Some aspects of the disclosure provide a method for dynamic adaptive streaming for light field based display based on assigned asset priority values determined by the expected computational load on GPUs. In some examples, the order of assets for streaming may be based on the asset priority values. In some examples, the asset priority values are increased when an asset has a higher computed complexity than other assets. In some examples, priority values are adjusted based on feedback from client devices. For example, the feedback can indicate GPU configuration at the client device, or indicate a different attribute for complexity evaluation.

According to eighth aspects of the disclosure, assets in a scene based immersive media, such as scene based immersive media for light field based display (e.g., lightfield display, holographic display, etc.) can be prioritized based on multiple metadata attributes.

According to an aspect of the disclosure, each asset in a scene may have a variety of metadata attributes that would each allow a renderer to prioritize the order in which assets are retrieved, in order to render the scene in a way that provides an experience for a user that is better than simply retrieving assets in the order they appear in a scene manifest.

According to another aspect of the disclosure, priority values based on a single metadata attribute may not reflect the best strategy for prioritization. In some examples, a set of priority values that reflects multiple metadata attributes may provide a better user experience than another set of priority values based on a single metadata attribute.

According to another aspect of the disclosure, priority values based on a single set of priority preferences may not reflect the best strategy for prioritization, because end devices may vary significantly in many ways—the path characteristics between the end device and the cloud, and the GPU computational capability of the end device, just to name two ways. In order to provide a better user experience, techniques to prioritize assets for streaming, based on two or more asset metadata attributes can be used.

Using scene 3701 in FIG. 37 as an example, each of the four assets may have multiple metadata attributes.

Figure 40:
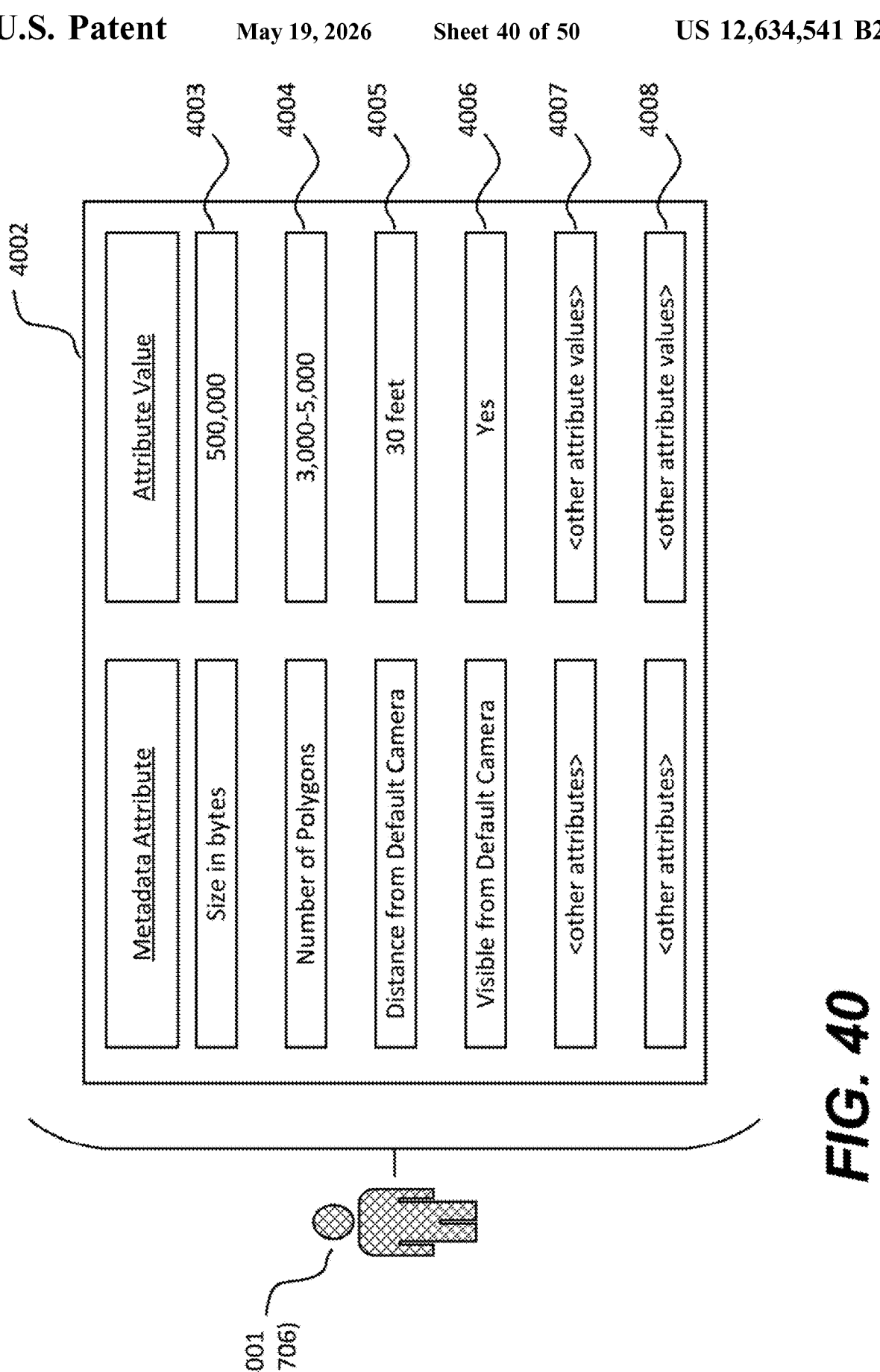
FIG. 40 shows a diagram illustrating metadata attributes of an asset in an example.

FIG. 40 shows a diagram illustrating metadata attributes of an asset 4001 in an example. The asset 4001 can correspond to asset B 3706 in the scene 3701, which is a realistic person. The asset 4001 includes various metadata attributes 4002, such as size in bytes as shown by 4003, the number of polygons as shown by 4004, a distance from default camera as shown by 4005, visibility from default camera (also referred to as virtual camera at default entry location) as shown by 4006, and other metadata attributes as shown by 4007 and 4008.

It is noted that the metadata attributes 4002 are for illustration, in some examples, other suitable metadata attributes may be present, and some metadata attributes enumerated in FIG. 40 may be absent in some examples.

In an example, when an end device requests the assets for the scene 3701, for example, the media server 2402 can provide the assets to the end device in an arbitrary order, such as in an order of asset A, asset B, asset C and asset D. The order in which assets become available to the end device may not provide an acceptable user experience.

The assets in the scene 3701 are not of equal size, complexity, and immediate value to the end user. Each of these metadata attributes can be used separately as the basis of prioritization, but each of these metadata attributes can also be used in combination with other metadata attributes to determine relative asset priorities. For example, the assets can be prioritized according to a policy including a plurality of metadata attributes, such as a first metadata attribute of visibility from default camera shown by 4006, a second metadata attribute of number of polygons expressed as a range of numbers shown by 4004, and a third metadata attribute of distance from default camera expressed as a number of feet shown by 4005. In an example, among the assets of the scene, first assets that are visible from default camera are assigned the highest priority (e.g., 4 in an example), and the rest of the assets are further processed according to the second metadata attribute and the third metadata attribute. For example, among the rest of the assets, second assets with the number of polygons larger than a polygon threshold are assigned with the second highest priority (e.g., 3 in an example), and the remaining of the assets are further processed according the third metadata attribute. For example, among the remaining of the assets, third assets whose distance to the default camera is shorter than a distance threshold are assigned the third highest priority (e.g., 2 in an example).

In some examples, before the assets for a scene are streamed to the end device, an asset prioritizer is used to analyze the assets needed for the scene and assign priorities for each asset, according to the prioritization scheme in use, such as the policy including the plurality of metadata attributes. For example, the asset prioritizer 3802 can be used to apply the prioritization using a policy with a combination of a plurality of metadata attributes. After the assets are prioritized, the assets are streamed in the priority order, such as shown in FIG. 39.

The use of the prioritization based on the multiple metadata attributes allows the assets to be transmitted to the end device in a manner that is suitable for the end device to improve user experience. For example, the end device can request assets that are immediately visible to the user (e.g., according to the first metadata attribute), then to request assets that are most computationally demanding to render (e.g., according to the second metadata attribute), and then to request assets that are closest to the user in the rendered scene (e.g., according to the third metadata attribute).

According to an aspect of the disclosure, not all end devices have the same capabilities, and not all end devices have the same path characteristics such as available bandwidth between the end device and the cloud, the best user experience for different users may result from the use of different prioritization schemes. In some examples, the end device can provide priority preference information to the asset prioritizer to assign priority values accordingly.

Figure 41:
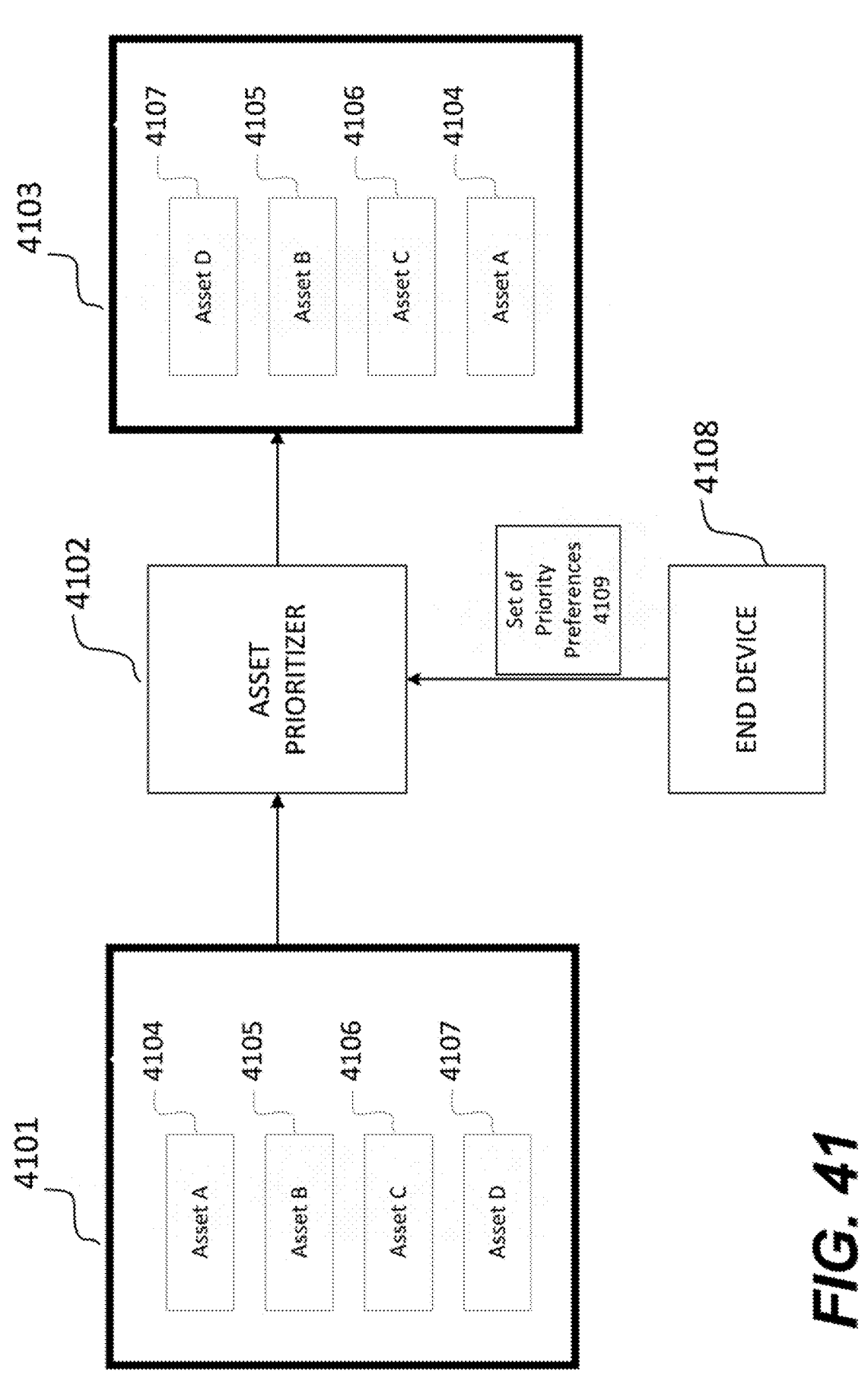
FIG. 41 shows a diagram for prioritizing assets in a scene in some examples.

FIG. 41 shows a diagram for prioritizing assets in a scene in some examples. In the FIG. 41 example, an end device 4108 can provide a set of priority preferences 4109 to an asset prioritizer 4102. For example, the set of priority preferences 4109 includes multiple metadata attributes. Then, the asset prioritizer 4102 can assign a priority value to each asset in a scene based on the set of priority preferences. Thus, the assigned priority values of the assets in the scene are optimized for the end device 4108.

In some examples, the end device 4108 may adjust the set of priority preferences dynamically, based on measurements that are made by the end device. For example, when the end device 4018 has a relatively low available bandwidth to the cloud, the end device may prioritize assets based on asset size measured in bytes (e.g., 4003 in FIG. 40), because the transfer time for the largest assets will act as a lower bound on how quickly a scene can be rendered. When the same end device 4108 detects that the path from the cloud to the end device 4108 has abundant bandwidth, the end device 4108 may provide a different set of priority preferences to the asset prioritizer 4102.

In some examples, related metadata attributes may be considered as a composite attribute, and the end device may include composite attributes in its set of priority preferences.

For example, if available metadata attributes for each asset include the number of polygons and some measure of the level of surface detail, these attributes might be considered together as a measure of computational complexity, and the end device may include that measure in its set of priority preferences.

Some aspects of the disclosure provide a method for dynamic adaptive streaming for light field based display according to assigned asset priority values. The asset priority values can be assigned based on two or more metadata attributes for each asset to be streamed. In some examples, asset priority values of assets in a scene are determined based on a set of priority preferences. In some examples, the order of assets for streaming is based on the asset priority values. In some examples, the set of priority preferences vary between end devices. In some examples, the set of priority preferences are provided by the end device. In some examples, the set of priority preferences are updated by the end device. In some examples, the set of priority preferences include one or more composite attributes. In some examples, the set of priority preferences provided by the end device include one or more composite attributes.

Figure 42:
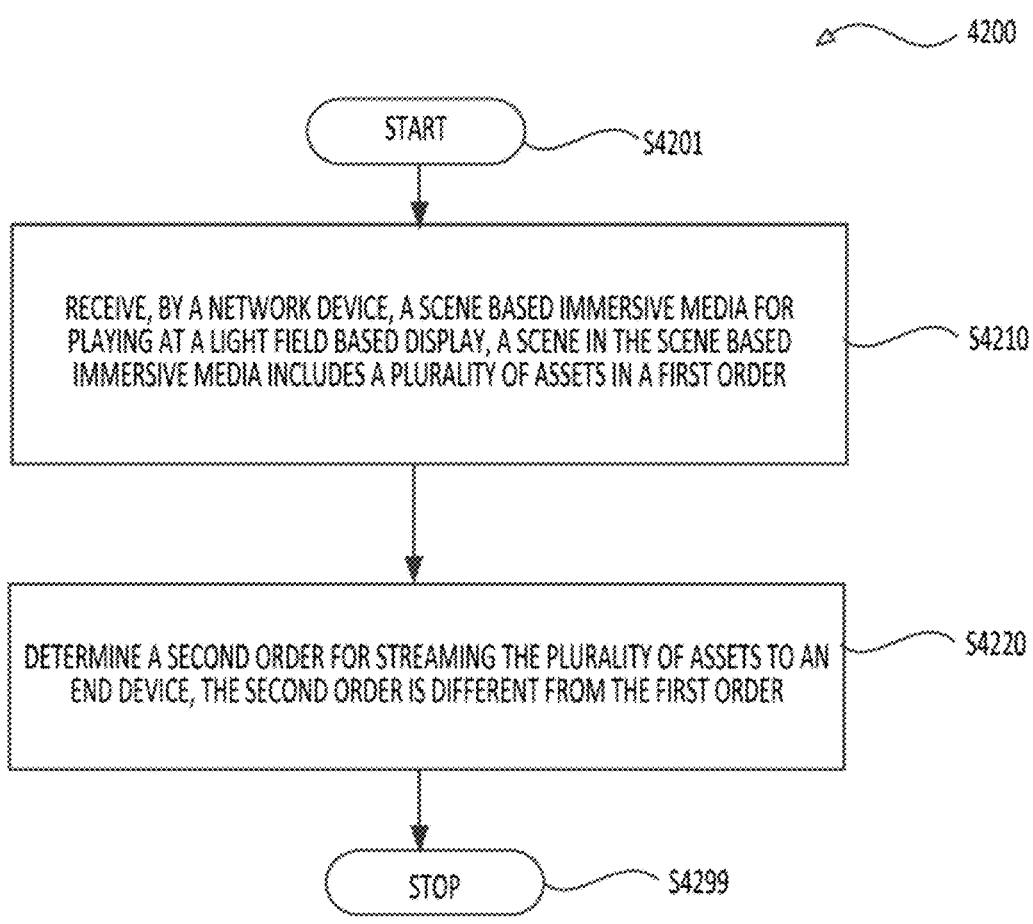
FIG. 42 shows a flow chart outlining a process according to an embodiment of the disclosure.

FIG. 42 shows a flow chart outlining a process 4200 according to an embodiment of the disclosure. The process 4200 can be executed in a network, such as by a server device in the network. In some embodiments, the process 4200 is implemented in software instructions, thus when processing circuitry executes the software instructions, the processing circuitry performs the process 4200. For example, the smart client is implemented in software instructions, and the software instructions can be executed to perform a smart client process that includes the process 4200. The process starts at S4201, and proceeds to S4210.

At S4210, a server device receives a scene based immersive media for playing at a light field based display. A scene in the scene based immersive media includes a plurality of assets in a first order.

At S4220, the server device determines a second order for streaming the plurality of assets to an end device. The second order is different from the first order.

In some examples, the server device assigns priority values respectively to the plurality of assets in the scene according to one or more attributes of the plurality of assets, and determines the second order for streaming the plurality of assets according to the priority values.

In some examples, the server device includes the priority values to the plurality of assets in a description for the plurality of assets, and provides the description to the end device. The end device requests the plurality of assets according to the priority values in the description.

According to some aspects of the disclosure, the server device assigns a priority value to an asset in the scene according to a size of the asset. In an example, the server device assigns a first priority value to a first asset and a second priority value to a second asset in response to the first asset having a smaller size than the second asset in bytes, the first priority value being higher than the second priority value.

According to some aspects of the disclosure, the server device assigns a priority value to an asset in the scene according to a visibility of the asset associated with a default entry location of the scene. In some examples, the server device assigns a first priority value to first assets that are visible from the default entry location of the scene, and a second priority value to second assets that are invisible from the default entry location, the first priority value is higher than the second priority value. In an example, the server device assigns the second priority value to an asset in response to the asset being blocked by another asset in the scene. In another example, the server device assigns the second priority value to an asset in response to the asset being outside a field of view associated with the default entry location of the scene. In another example, the server device assigns the second priority value to an asset in response to the asset being occluded by a shadow of another asset in the scene due to a light source in the scene.

According to some aspects of the disclosure, the server device assigns a first priority value to a first asset and a second priority value to a second asset in response to the first asset and the second asset being within a field of view associated with the default entry location of the scene, the first asset is closer to the default entry location of the scene than the second asset, and the first priority value is larger than the second priority value.

In some examples, the server device assigns a first set of priority values to the plurality of assets based on a first attribute of the plurality of assets, the first set of priority values is used for ordering the plurality of assets in a first prioritization scheme. Further, the sever device assigns a second set of priority values to the plurality of assets based on a second attribute of the plurality of assets, the second set of priority values is used for ordering the plurality of assets in a second prioritization scheme. The server device selects a prioritization scheme for the end device from the first prioritization scheme and the second prioritization scheme according to information of the end device, and orders the plurality of assets for streaming according to the selected prioritization scheme.

In some examples, the server device includes the priority values assigned to the plurality of assets in a description for the plurality of assets. The priority values are used for ordering the plurality of assets in a first prioritization scheme. The server device provides the description for the plurality of assets to the end device. In an example, the end device apples a second prioritization scheme on a requesting order of the plurality of assets, and uses the first prioritization scheme as a tiebreaker in response to a tie by the second prioritization scheme.

In some examples, the server device assigns a first priority value to a first asset and a second priority value to a second asset in response to the first asset having a higher complexity of computation than the second asset. The first priority value is higher than the second priority value. In an example, the higher complexity of computation is determined based on at least one of a number of polygons in the first asset, and a surface property of the first asset.

In some examples, the one or more attributes are metadata attributes associated with each asset, and can include at least one of size in bytes, number of polygons, distance from default camera, and visibility from default camera.

In some examples, the server device receives a set of priority preferences of the end device, the set of priority preferences comprising a first set of attributes and determines the second order according to the first set of attributes. In an example, the server device receives an update of priority preferences of the end device, the update of priority preferences indicates a second set of attributes that is different from the first set of attributes. The server device can determine an updated second order according to the second set of attributes.

In some examples, the server device receives a feedback signal from the end device, and adjusts the priority values and the second order according to the feedback signal.

Then, the process 4200 proceeds to S4299 and terminates.

The process 4200 can be suitably adapted to various scenarios and steps in the process 4200 can be adjusted accordingly. One or more of the steps in the process 4200 can be adapted, omitted, repeated, and/or combined. Any suitable order can be used to implement the process 4200. Additional step(s) can be added.

Figure 43:
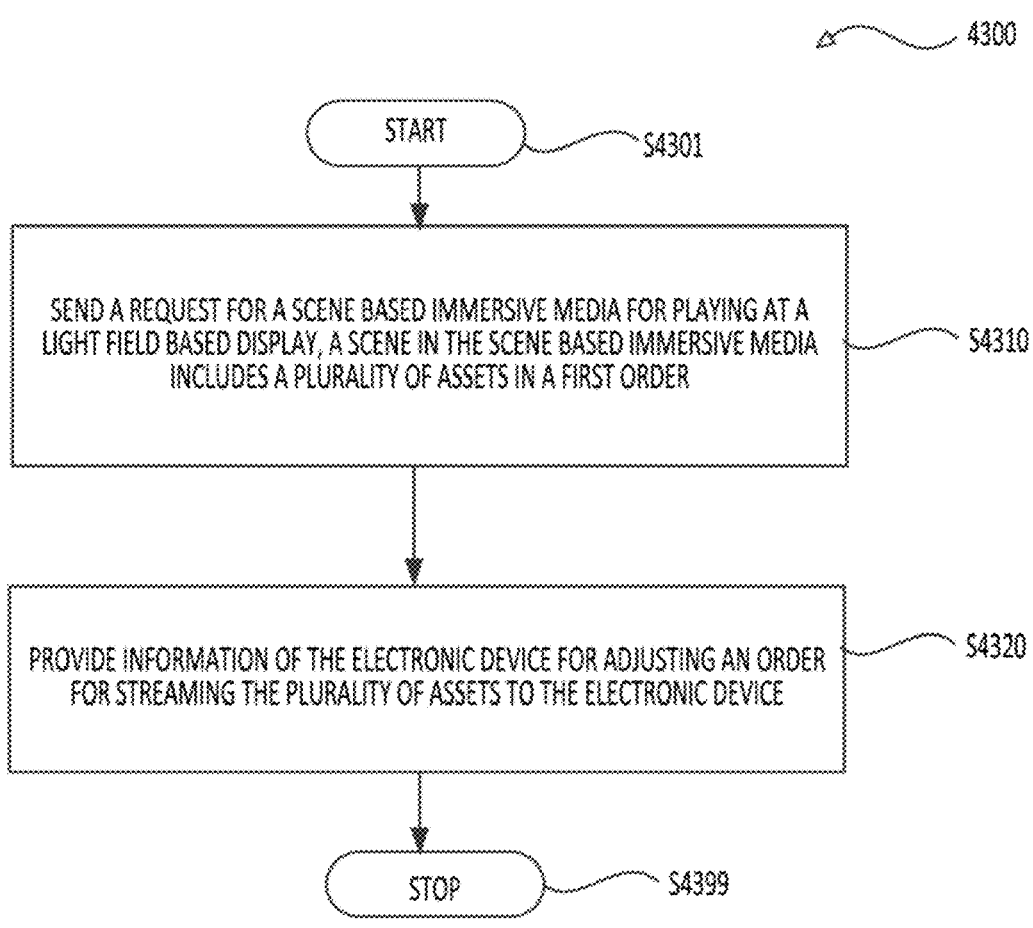
FIG. 43 shows a flow chart outlining a process according to an embodiment of the disclosure.

FIG. 43 shows a flow chart outlining a process 4300 according to an embodiment of the disclosure. The process 4300 can be executed by an electronic device, such as an end device (also referred to as client device). In some embodiments, the process 4300 is implemented in software instructions, thus when processing circuitry executes the software instructions, the processing circuitry performs the process 4300. For example, the process 4300 is implemented as software instructions, the processing circuitry can execute the software instructions to perform the smart controller process. The process starts at S4301, and proceeds to S4310.

At S4310, a request for a scene based immersive media for playing at a light field based display is sent by the electronic device and to a network. A scene in the scene based immersive media includes a plurality of assets in a first order;

At S4320, information of the electronic device is provided for adjusting an order for streaming the plurality of assets to the electronic device. The order is then determined according to the information of the electronic device.

In some examples, the electronic device receives a description of a plurality of assets in a scene of the scene based immersive media for playing at a light field based display. The description includes priority values for the plurality of assets. The electronic device requests one or more assets in the plurality of assets according to the priority values.

In some examples, the priority values are associated with a first prioritization scheme. The electronic device determines, according to a second prioritization scheme that is different from the first prioritization scheme, that a first asset and a second asset have a same priority. Then, the electronic device prioritizes one of the first asset and the second asset over the other one according to the first prioritization scheme.

In some examples, the electronic device provides a set of priority preferences to the network. Further, in an example, the electronic device detects an operation environment change, such as a network status change, and provides an update to the set of priority preferences in response to the operation environment change.

In some examples, the electronic device detects an operation environment change, such as a network status change. Then, the electronic device provides a feedback signal indicative of the operation environment change to the network.

Then, the process 4300 proceeds to S4399 and terminates.

The process 4300 can be suitably adapted to various scenarios and steps in the process 4300 can be adjusted accordingly. One or more of the steps in the process 4300 can be adapted, omitted, repeated, and/or combined. Any suitable order can be used to implement the process 4300. Additional step(s) can be added.

According to nineth aspects of the disclosure, a scene analyzer can be used for prioritization of asset rendering based on asset visibility in a scene default viewport.

According to an aspect of disclosure, a client device that supports scene-based media may be equipped with a renderer and/or game engine that supports the concept of a default camera and viewport into the scene. The default camera provides attributes of a camera that the renderer can use to create an internal image of the scene. Such an internal image is hence defined by camera attributes such as: horizontal and vertical resolutions, x and y dimensions, and depth of field, among many other possible attributes. The viewport is defined by the internal image itself and the virtual location of the camera in the scene. The virtual location of the camera into the scene provides the content creator or the user the ability to specify exactly what portion of the scene is rendered into the internal image. Hence, objects that are not directly visible in the default camera's viewport, e.g., objects that are behind the default camera or are located outside of the viewport into the scene may not prioritized for rendering by the renderer, i.e., if the user will not be able to see them anyway. Nevertheless, some objects may be located sufficiently close to the default camera's viewport that it is likely that shadows cast from their presence and or proximity to the viewport may actually be present within the viewport. For example, if a point light source that is not visible in the viewport is positioned behind other objects that are also not visible in the scene, then the light that is reflected into the viewport of the scene may be impacted shadows created by the non-visible objects because their presence blocks the ability of the light to travel into the viewport of the scene. Hence it may be important for the renderer to render such objects that impact the ability of light to travel into the portion of the scene that is captured by the viewport.

Some aspects of the disclosure provide the techniques for a scene analyzer to facilitate a separate decision making process that orders individual assets within a scene for transformation from a format A to a format B either by or on behalf of a client. The scene analyzer can compute and store priority values into metadata in the scene, the priority values are for individual assets within the scene can be determined based on a number of different factors including whether the asset is in the area of the scene captured by the default camera viewport. The computed priority values can then be stored directly into the metadata describing the scene so that subsequent processes either in the network or in the client device are signaled as to the potential importance of transforming one asset prior to another asset, i.e., as indicated by the priority values stored into the scene metadata by the scene analyzer. In some examples, such a scene analyzer can utilize metadata describing features of the camera that is anticipated to be used to create a viewport into the scene, i.e., to compute whether a particular asset is within or outside of the viewport of the camera into the scene. The scene analyzer can compute the area of the viewport based on attributes of the camera, e.g., the width and length of the viewport, the depth of field for objects in focus in the camera, and the like. In some examples, first assets that are not in the camera viewport for the scene may be prioritized by the scene analyzer for transformation to take place after second assets that are within the default camera viewport are transformed. Such a prioritization can be signaled and stored into the scene metadata by the scene analyzer. Storage of such metadata into the scene may benefit subsequent processes within the distribution network, i.e., the same computation to determine which assets to transform before other assets need not be performed if a prioritization has been computed and stored into the metadata of the scene by the scene analyzer. The process of the scene analyzer can be performed either a priori to the media being streamed by the client, or as a particular step performed by the client device itself in some examples.

Figure 44:
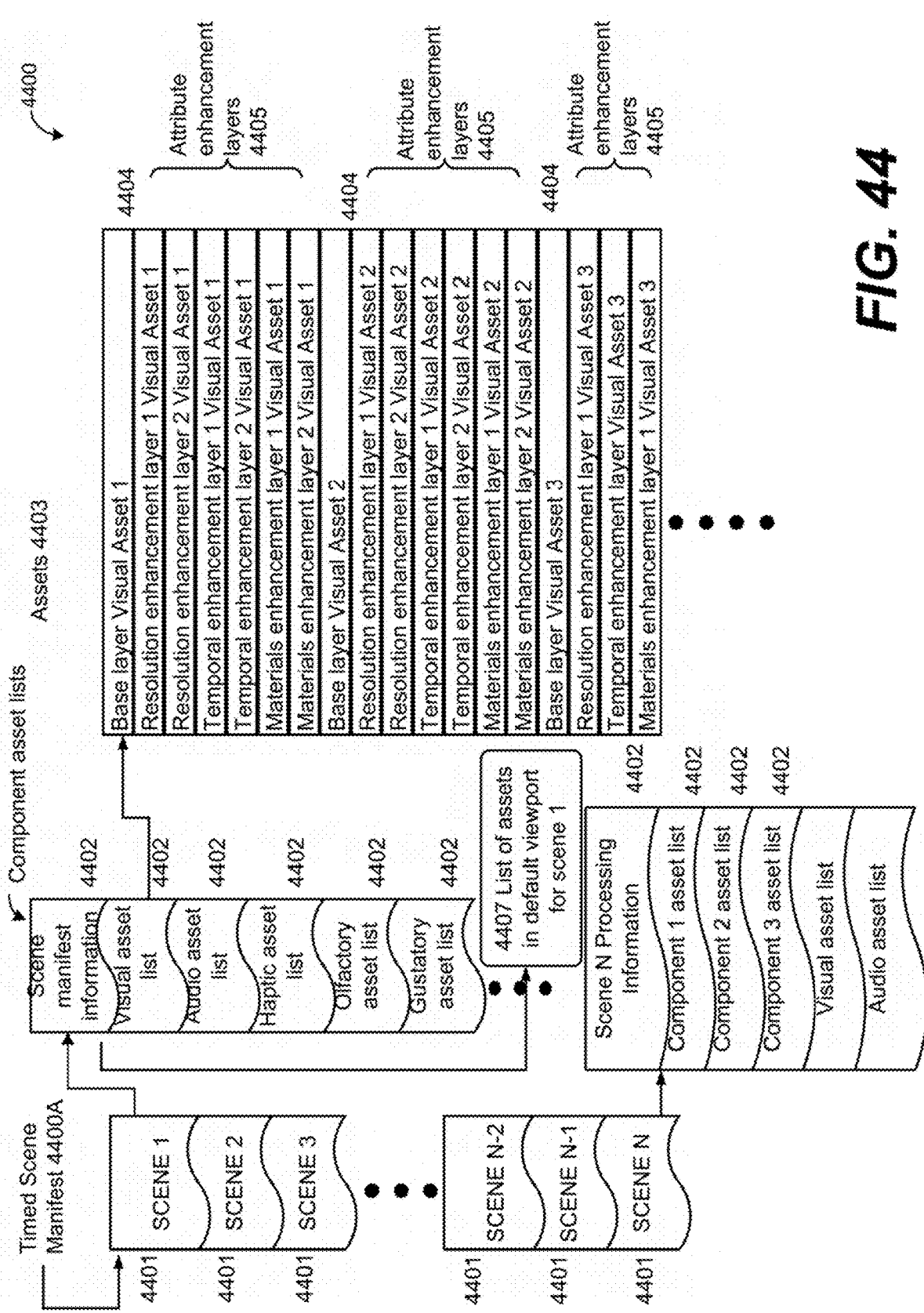
FIG. 44 shows a diagram of a timed media representation with signaling of assets in default camera viewpoint in some examples.

FIG. 44 shows a diagram of a timed media representation 4400 with signaling of assets in default camera viewpoint in some examples. The timed media representation 4400 includes a timed scene manifest 4400A that includes information of a list of scenes 4401. Information of a scene 4401 refers to a list of components 4402 that separately describe processing information and types of media assets in the scenes 4401. The components 4402 refer to assets 4403 that further refer to base layers 4404 and attribute enhancement layers 4405. A list of assets 4407 that are located within the default camera viewport for the scene is provided for each scene 4401.

Figure 45:
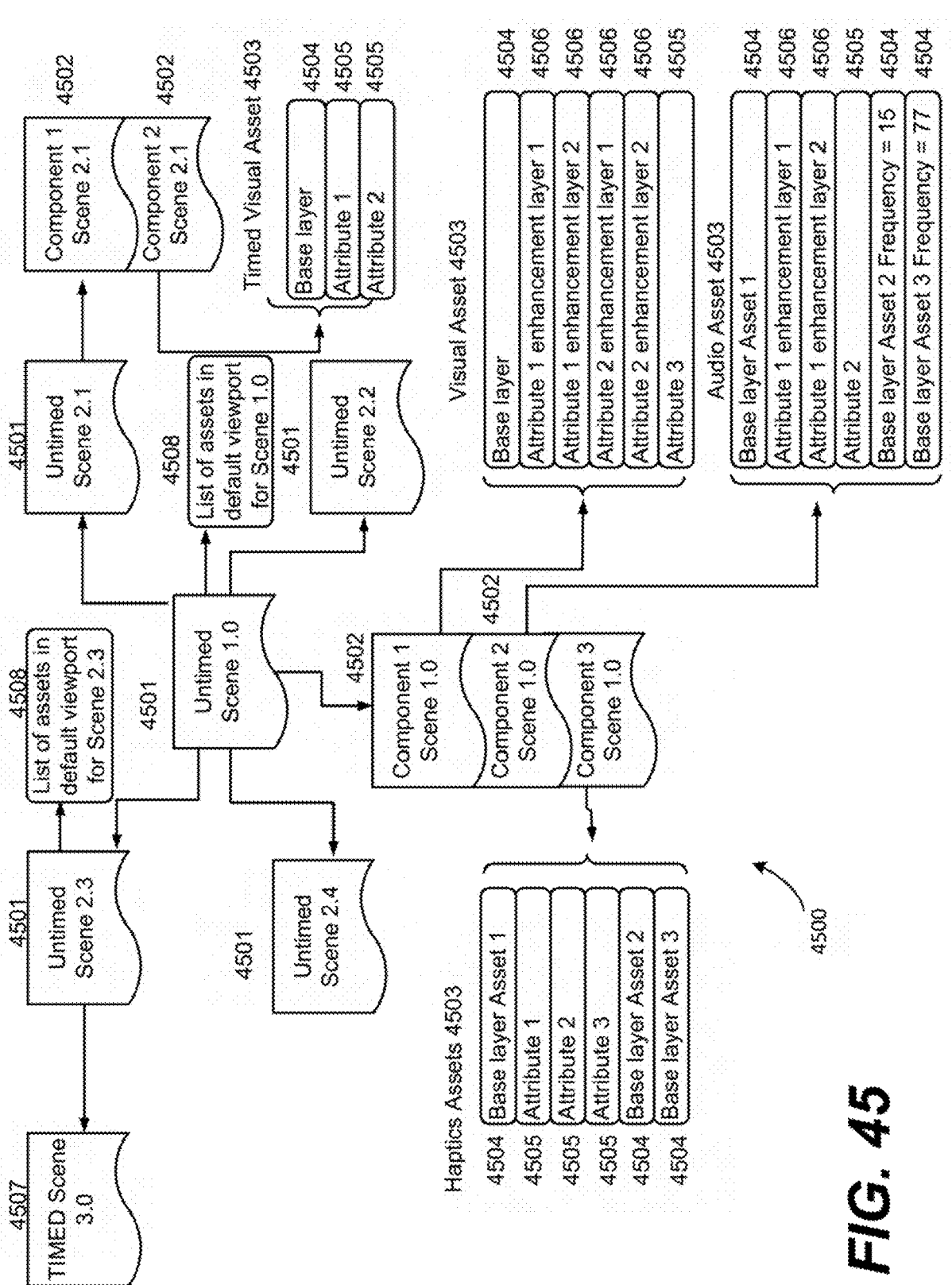
FIG. 45 shows a diagram of an untimed media representation with signaling of assets in default viewport in some examples.

FIG. 45 shows a diagram of an untimed media representation 4500 with signaling of assets in default viewport in some examples. An untimed scene manifest (not depicted) references a Scene 1.0 for which there is no other scene that can branch to Scene 1.0. Information of scenes 4501 is not associated with a start and end duration according to a clock. Information of a scene 4501 refers to a list of components 4502 that separately describe processing information and types of media assets in the scene. The components 4502 refer to assets 4503 that further refer to base layers 4504 and attribute enhancement layers 4505 and 4506. Furthermore, information of scene 4501 can refer to other scenes information 4501 that are for untimed media. Information of scene 4501 can also refer to scene information 4507 that is for a timed media scene. Lists 4508 identify assets whose geometry is located within the viewport of the default camera for the scene.

Referring back to FIG. 9, in some examples, the media analyzer 911 in FIG. 9 includes a scene analyzer that can perform analysis on assets of a scene. In an example, the scene analyzer can determine which assets in the assets of the scene are in a default viewport. For example, the ingest media can be updated to store information regarding which assets are located within the default viewport for the camera into the scene.

Referring back to FIG. 14, in some examples, the media analyzer 1410 in FIG. 14 includes a scene analyzer that can perform analysis on assets of a scene. In an example, the scene analyzer can examine client adapted media 1409 to determine which assets are located in the viewport of the default camera for the scene (also referred to as default viewport for entry into the scene), for potential prioritization for rendering by the game engine 1405 and/or for reconstruction processing via MPEG smart client 1401. In such an embodiment, the media analyzer can store a list of assets for each scene that are in the viewport for the default camera into each respective scene in the client adapted media 1409.

Figure 46:
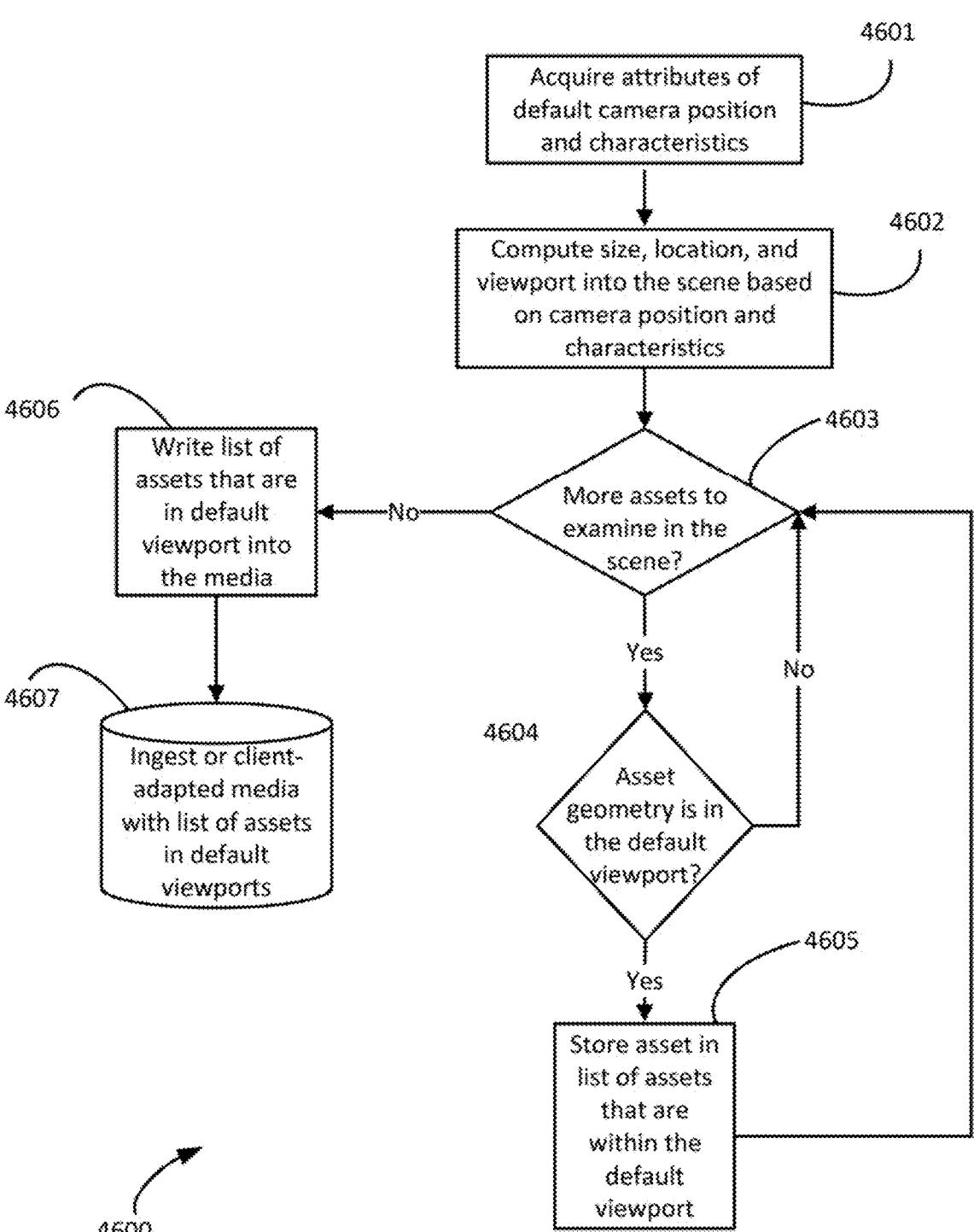
FIG. 46 shows a process flow for a scene analyzer to analyze assets in a scene according to a default viewport.

FIG. 46 shows a process flow 4600 for a scene analyzer to analyze assets in a scene according to a default viewport. The process begins at step 4601 in which the scene analyzer acquires the attributes of default camera position and characteristics (e.g., from the scene or from an external source not shown) that describe the default viewport (the initial view into the scene when scene is rendered for the first time) based upon the attributes of the camera that is used to define the viewport. Such camera attributes include the type of camera that is used to create the viewport, along with the dimensions length, width, and depth of the area in the scene that is captured by the viewport. In step 4602, the scene analyzer can compute the actual default viewport based on the attributes acquired in the step 4601. Next, in step 4603, the scene analyzer determines if there are more assets to be examined within the list of assets for the particular scene. When there are no more assets to examine, then process proceeds to step 4606. In step 4606, the scene analyzer writes the list (into the metadata for the scene) of assets whose geometry is in (wholly or partially) within the default viewport for the scene. The analyzed media is depicted as 4607. When there are more assets to process at step 4603, then the process continues to step 4604. In step 4604, the scene analyzer analyzes the geometry of a next asset in the scene, and the next asset becomes the current asset. The geometry and location of the current asset within the scene is compared to the area of the default viewport computed at step 4602. In step 4604, the scene analyzer studies the geometry of the asset and its location in the scene to determine if any portion of the asset geometry falls into the area of the default viewport. If any portion of the asset geometry falls into the default viewport then the process continues to step 4605. In step 4605, the scene analyzer stores the asset identifier into a list of assets located within the default viewport. Following the step 4605, process returns to step 4603 where the list of assets for the scene is examined to determine if there are more assets to process.

Some aspects of the disclosure provide a method for asset prioritization. The method can compute a location and a size of a viewport created by a camera used to view a scene, and compare a geometry of each asset of the scene with the viewport to determine whether a portion of the asset's geometry intersects with the viewport (e.g., the location and the size of the viewport created by the camera). The method identifies an asset whose geometry partially or wholly intersects with the viewport created by the camera, and stores the identity of the asset into a list of similar assets whose geometry intersects with the area of the viewport created by the camera. Then, the method includes sequencing and prioritizing rendering of the assets for the scene in a scene-based media presentation based on the list of the similar assets whose geometry intersects with the area of the viewport created by the camera.

Figure 47:
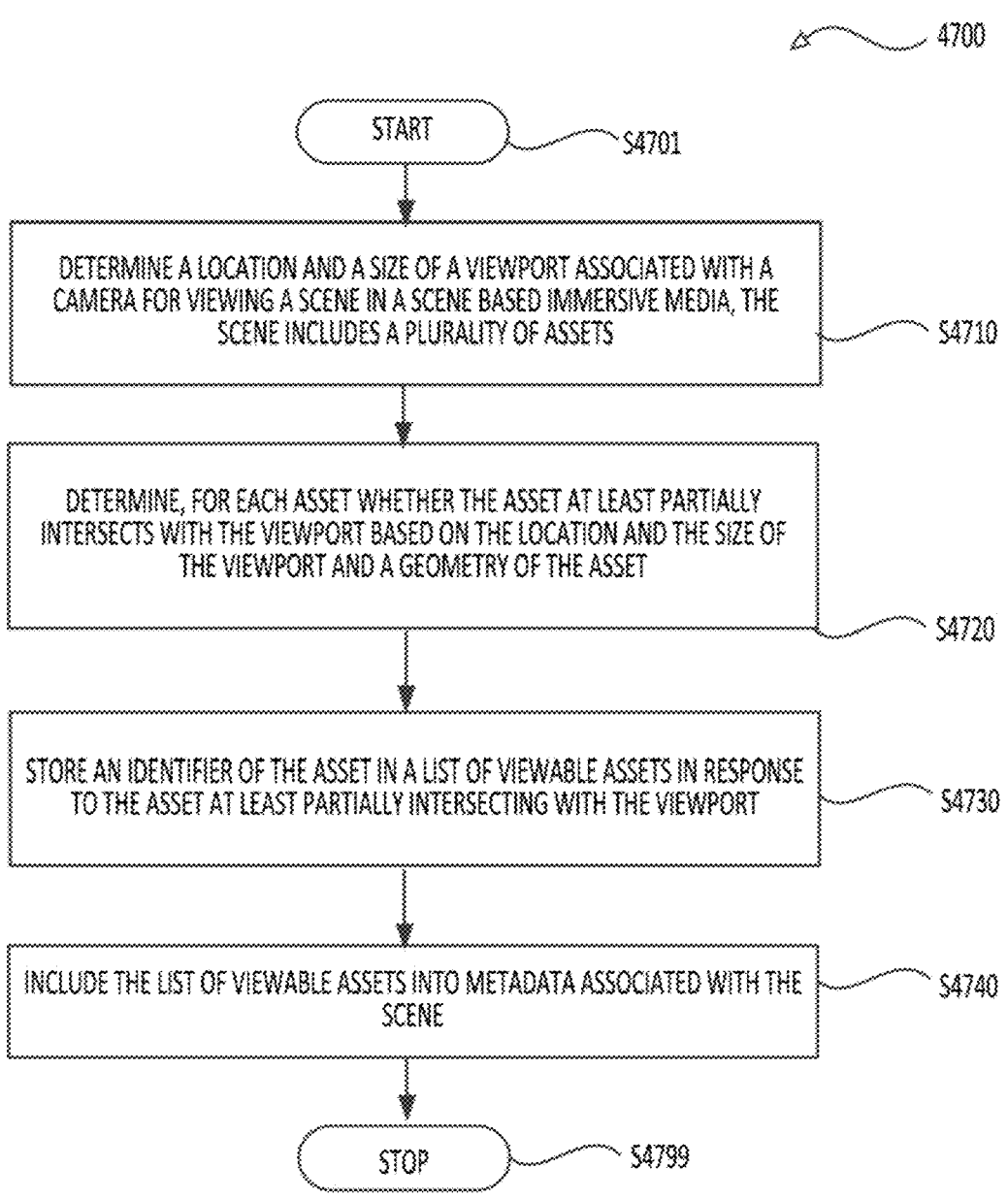
FIG. 47 shows a flow chart outlining a process according to an embodiment of the disclosure.

FIG. 47 shows a flow chart outlining a process 4700 according to an embodiment of the disclosure. The process 4700 can be executed in a network, such as by a server device in the network. In some embodiments, the process 4700 is implemented in software instructions, thus when processing circuitry executes the software instructions, the processing circuitry performs the process 4700. The process starts at S4701, and proceeds to S4710.

At S4710, attributes of a viewport, such as a location and a size of a viewport associated with a camera for viewing a scene in a scene based immersive media are determined. The scene includes a plurality of assets.

At S4720, for each asset, whether the asset at least partially intersects with the viewport is determined based on the location and the size of the viewport and a geometry of the asset.

At S4730, an identifier of the asset is stored in a list of viewable assets in response to the asset at least partially intersecting with the viewport.

At S4740, the list of viewable assets is included into metadata associated with the scene.

In some examples, the location and the size of the viewport are determined according to a camera location and characteristics of the camera for viewing the scene.

In some examples, an order for transforming at least a first asset and a second asset from a first format to a second format is determined according to the list of viewable assets. In an example, the list of viewable assets is transformed from the first format to the second format before transforming another asset of the scene that is not in the list of viewable assets.

In some examples, an order for streaming at least a first asset and a second asset to an end device is determined according to the list of viewable assets. In an example, the list of viewable assets is streamed before streaming another asset of the scene that is not in the list of viewable assets.

Then, the process 4700 proceeds to S4799 and terminates.

The process 4700 can be suitably adapted to various scenarios and steps in the process 4700 can be adjusted accordingly. One or more of the steps in the process 4700 can be adapted, omitted, repeated, and/or combined. Any suitable order can be used to implement the process 4700. Additional step(s) can be added.

According to tenth aspects of the disclosure, techniques for prioritization of media adaptation by attached client types can be used.

According to an aspect of the disclosure, one of the problems that impact the efficiency of a media distribution network for heterogeneous clients is to determine which media to prioritize for transformation assuming that there are a large number of clients (e.g., client devices, end devices) attached to the network, for which the media needs to be transformed.

It is assumed without loss of generality that a transformation process may also be referred to as an "adaptation" process, as both names can be used in the industry. A network that then performs media adaptation on behalf of its attached clients will benefit from information that guides the prioritization of such adaptation by information about the current client types attached to the network.

Some aspects of the disclosure provide techniques of a media adaptation or media transformation process that can be performed to maximize the number of clients that may benefit from the adaptation (or transformation) process performed by the network. The disclosed subject matter addresses the need for a network that performs some or all of media adaptation on behalf of one or more clients and client types, to prioritize the adaptation process based on the number and types of clients currently attached to the network.

Figure 48:
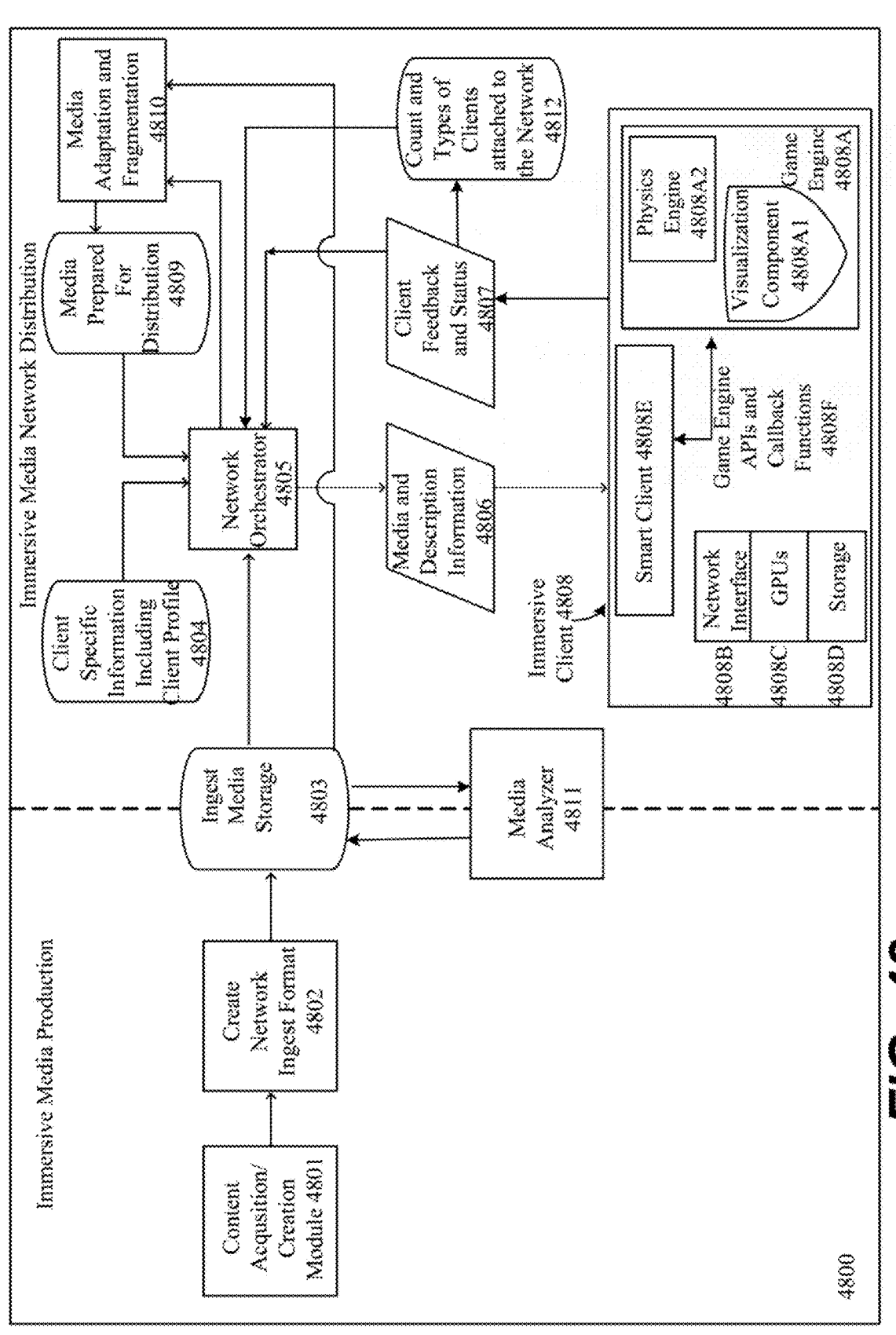
FIG. 48 shows a diagram of an immersive media distribution module in some examples.

FIG. 48 shows a diagram of an immersive media distribution module 4800 in some examples. The immersive media distribution module 4800 is similar to the immersive media distribution module 900 in FIG. 9, but with the addition of a client tracking process shown by 4812 to illustrate immersive media network distribution with client tracking process. The immersive distribution module 4800 is capable of serving legacy and heterogenous immersive media-capable displays as previously depicted in FIG. 8. Content is either created or acquired in as shown by 4801, which is further embodied in FIG. 5 and FIG. 6 for natural and CGI content respectively. Content of 4801 is then converted into an ingest format using the create network ingest format process shown by 4802. Process shown by 4802 is likewise further embodied in FIG. 5 and FIG. 6 for natural and CGI content respectively. The ingest media is optionally annotated with IMS metadata or analyzed to determine complexity attributes by scene analyzer in the media analyzer 4811. The ingest media format is transmitted to the network and stored on storage device 4803. In some examples, the storage device may reside in the immersive media content producer's network, and accessed remotely by the immersive media network distribution process (not numbered) as depicted by the dashed line that bisects 4803. Client and application specific information is, in some examples, available on a remote storage device 4804, which may, in some examples, exist remotely in an alternate "cloud" network.

As depicted in FIG. 48, a network orchestrator shown by 4805 serves as the primary source and sink of information to execute the major tasks of the distribution network. In this particular embodiment, the network orchestrator 4805 may be implemented in a unified format with other components of the network. Nevertheless the tasks depicted by the network orchestrator 4805 in FIG. 48 form some elements of the disclosed subject matter. The network orchestrator 4805 may further employ a bi-directional message protocol with the client to facilitate all processing and distribution of the media in accordance with the characteristics of the client. Furthermore, the bi-directional protocol may be implemented across different delivery channels, i.e., a control plane channel and a data plane channel.

In some examples, the network orchestrator 4805 receives information about the features and attributes of one or more client devices 4808 via channel 4807, and furthermore collects requirements regarding the application currently running on 4808. This information may be obtained from device 4804, or in an alternate embodiment, may be obtained by directly querying the client device 4808. In the case of a direct query to client device 4808, in an example, a bi-directional protocol (not shown in FIG. 48) is assumed to be present and operational so that the client device may communicate directly to the network orchestrator 4805.

In some examples, the channel 4807 may also update client tracking process 4812 so that a record of the current numbers and types of client devices 4808 is maintained by the network. The network orchestrator 4805 may compute one or more priorities for scheduling media adaptation and fragmentation process 4810 based on the information stored in client tracking process 4812.

The network orchestrator 4805 also initiates and communicates with media adaptation and fragmentation process 4810 which is described in FIG. 10. As ingest media is adapted and fragmented by process 4810, the media is, in some examples, transferred to an intermedia storage device depicted as the media prepared for distribution storage device 4809. As the distribution media is prepared and stored in device 4809, the network orchestrator 4805 ensures that client device 4808, via its network interface 4808B, either receives the distribution media and corresponding descriptive information 4806 either through a "push" request, or the client device 4808 itself may initiate a "pull" request of the media 4806 from storage device 4809. The network orchestrator 4805 may employ a bi-directional message interface (not shown in FIG. 48) to perform the "push" request or to initiate a "pull" request by the client device 4808. The client 4808 may, in some examples, employ GPUs (or CPUs not shown) 4808C. The distribution format of the media is stored in client device 4808's storage device or storage cache 4808D. Finally, the client device 4808 visually presents the media via its visualization component 4808A.

Throughout the process of streaming the immersive media to the client device 4808, the network orchestrator 4805 can monitor the status of the client's progress via client progress and status feedback channel 4807. The monitoring of status may be performed by means of a bi-directional communication message interface (not shown in FIG. 48).

Figure 49:
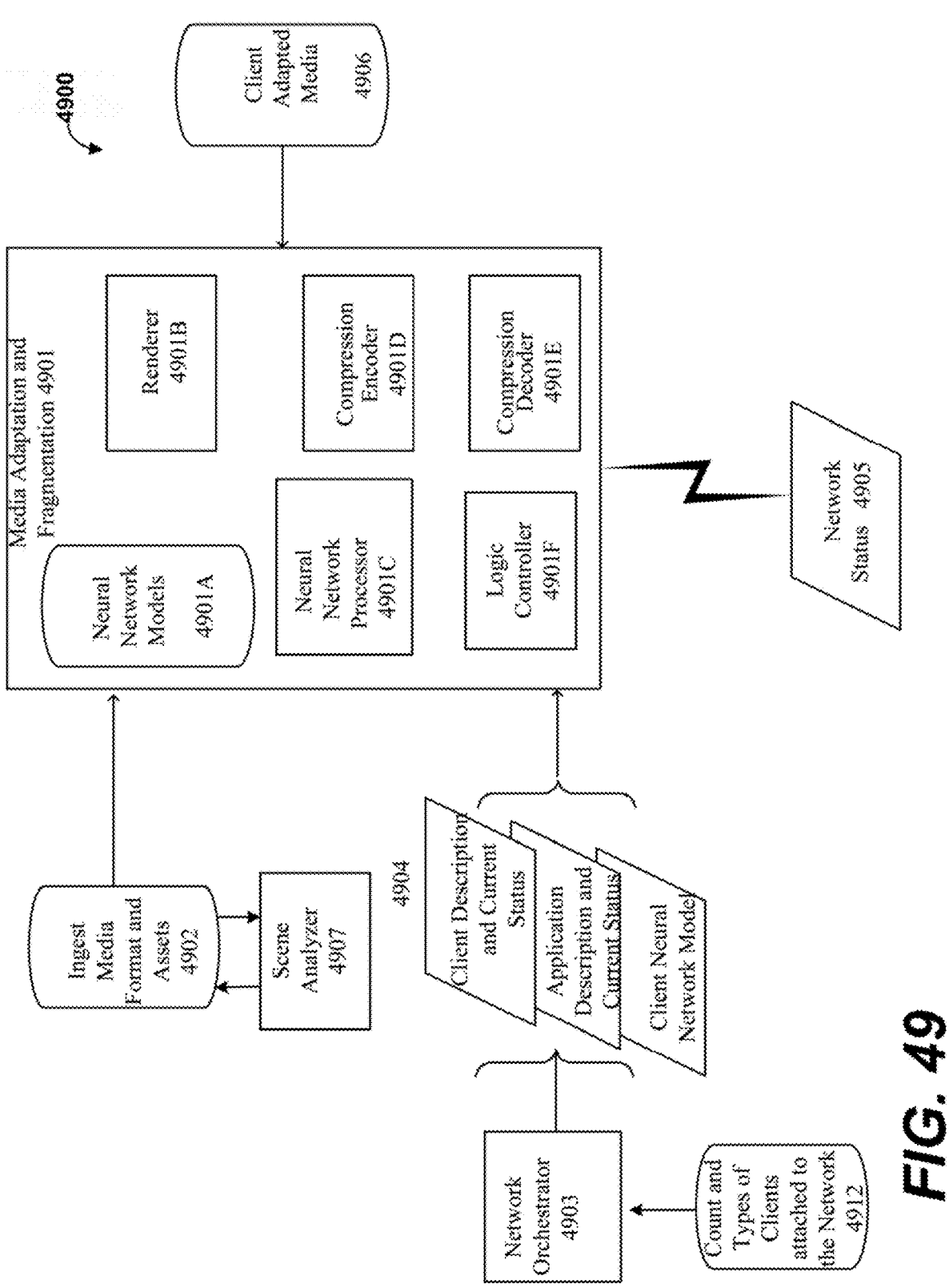
FIG. 49 shows a diagram of a media adaptation process in some examples.

FIG. 49 shows a diagram of a media adaptation process 4900 in some examples. The media adaptation process can adapt the ingested source media to match the requirements of one or more client devices, such as the client device 908 (depicted in FIG. 9). The media adaptation process 4901 can be performed by multiple components that facilitate the adaptation of the ingest media into an appropriate distribution format for the client device.

In some examples, a network orchestrator 4903 initiates the adaptation process 4901. A database 4912 may, in some examples, assist the network orchestrator 4903 to prioritize adaption process 4901 by providing information relevant to the types and numbers of client devices (e.g., immersive client devices 4808) attached to the network.

In FIG. 49, the adaptation process 4901 receives input network status 4905 to track the current traffic load on the network; the client device information including attributes and features description, application features and description as well as application current status, and a client neural network model (if available) to aid in mapping the geometry of the client's frustum to the interpolation capabilities of the ingest immersive media. Such client device information may be obtained by means of a bi-directional message interface (not shown in FIG. 49). The adaptation process 4901 ensures that the adapted output, as it is created, is stored into a client-adapted media storage device 4906. In some examples, a scene analyzer 4907 may be executed prior to or as part of the network automated process for the distribution of the media.

In some examples, the adaptation Process 4901 is controlled by logic controller 4901F. The adaptation process 4901 also employs a renderer 4901B or a neural network processor 4901C to adapt the specific ingest source media to a format that is suitable for the client device. The neural network processor 4901C uses neural network models in 4901A. Examples of such a neural network processor 4901C include the Deepview neural network model generator as described in MPI and MSI. If the media is in a 2D format, but the client requires a 3D format, then the neural network processor 4901C can invoke a process to use highly correlated images from a 2D video signal to derive a volumetric representation of the scene depicted in the video. An example of a suitable renderer 4901B could be a modified version of the OTOY Octane renderer (not shown) which would be modified to interact directly with the adaptation process 4901. The adaptation process 4901 may optionally employ media compressors 4901D and media decompressors 4901E depending on the need for these tools with respect to the format of the ingest media and the format required by client device.

Some aspects of the disclosure provide a method that includes guiding a prioritization process for adapting media to the media requirements of client devices in a network. The method includes collecting profile information of the client devices attached to the network. The media requirements of the client devices include attributes, such as one or more of a format and a bitrate of the media in an example. The profile information of the client devices includes the types and numbers of the client devices attached to the network in some examples.

Figure 50:
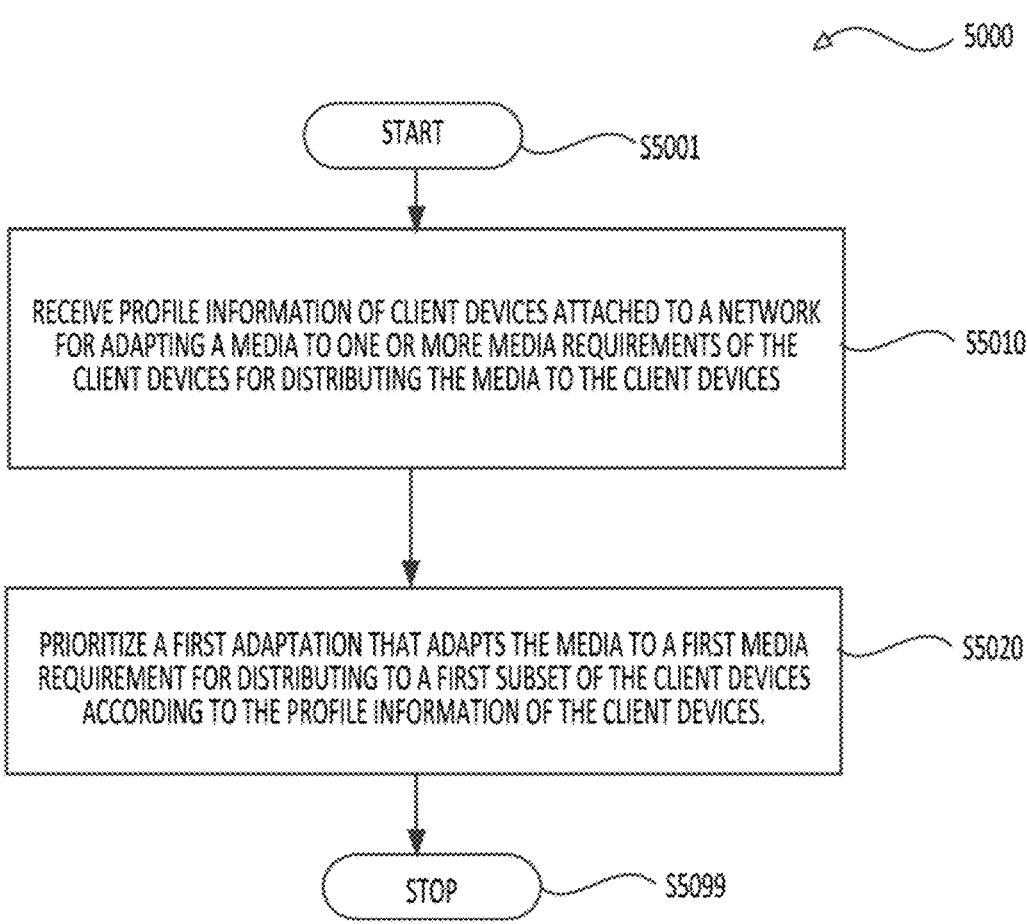
FIG. 50 shows a flow chart outlining a process 5000 according to an embodiment of the disclosure.

FIG. 50 shows a flow chart outlining a process 5000 according to an embodiment of the disclosure. The process 5000 can be executed in a network, such as by a server device in the network. In some embodiments, the process 5000 is implemented in software instructions, thus when processing circuitry executes the software instructions, the processing circuitry performs the process 5000. The process starts at S5001, and proceeds to S5010.

At S5010, profile information of client devices attached to a network is received. The profile information can be used to guide an adaptation of a media to one or more media requirements of the client devices for distributing the media to the client devices.

At S5020, a first adaptation that adapts the media to a first media requirement for distributing to a first subset of the client devices is prioritized according to the profile information of the client devices.

In some examples, a media requirement in the one or more media requirement includes at least one of a format requirement and a bitrate requirement of the media.

In some examples, the profile information of the client devices includes types of the client devices, and numbers of the client devices of each type.

In an example, a first adaptation that adapts the media to a first media requirement for distributing to a first subset of the client devices is prioritized over a second adaption that adapts the media to a second media requirement for distributing to a second subset of client devices in response to a first number of client devices in the first subset being larger than a second number of client devices in the second subset.

Then, the process 5000 proceeds to S5099 and terminates.

The process 5000 can be suitably adapted to various scenarios and steps in the process 5000 can be adjusted accordingly. One or more of the steps in the process 5000 can be adapted, omitted, repeated, and/or combined. Any suitable order can be used to implement the process 5000. Additional step(s) can be added.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of immersive media processing, comprising:
   receiving, by a network device, a scene based immersive media for display by a light field based display, the scene based immersive media comprising a plurality of immersive media scenes;
   assigning priority values and complexity values respectively to the plurality of immersive media scenes based on one or more attributes of the plurality of immersive media scenes such that the plurality of immersive media scenes is ordered in a first order based on the priority values and the complexity values;
   transmitting the plurality of immersive media scenes in the first order to an end device;
   determining a second order for streaming the plurality of immersive media scenes to the end device by adjusting the first order of the plurality of immersive media scenes according to updated priority values and updated complexity values that are obtained by updating the priority values and the complexity values respectively based on a feedback signal received from the end device, the second order being different from the first order; and
   transmitting the plurality of immersive media scenes to the end device in the second order.

2. The method of claim 1, wherein the assigning the priority values further comprises:
   assigning the priority values to the plurality of immersive media scenes based on a viewing position of the scene based immersive media of a user that is indicated by the feedback signal.

3. The method of claim 1, wherein the determining the second order further comprises:
   selecting, by a priority-aware network device, from a subset of un-transmitted scenes in the plurality of immersive media scenes, a highest priority scene with a highest priority value; and
   transmitting the highest priority scene to the end device.

4. The method of claim 1, wherein the assigning the priority values further comprises:
   determining a priority value to a scene based on a likelihood of a need to render the scene.

5. The method of claim 1, further comprising:
   determining that an available network bandwidth is limited;
   selecting, from a subset of un-transmitted scenes in the plurality of immersive media scenes, a highest priority scene with a highest priority value; and
   transmitting the highest priority scene when the available network bandwidth is limited.

6. The method of claim 1, further comprising:
   determining that an available network bandwidth is limited; and
   identifying a subset of the plurality of immersive media scenes are unlikely to be needed for rendering next based on the priority values,
   wherein the subset of the plurality of immersive media scenes is not streamed when the available network bandwidth is limited.

7. The method of claim 1, wherein the assigning the priority values further comprises:
   assigning, a first priority value to a first scene based on a second priority value of a second scene according to a relationship between the first scene and the second scene.

8. The method of claim 1, further comprising:
   receiving, the feedback signal from the end device; and
   adjusting at least a priority value of a scene in the plurality of immersive media scenes based on the feedback signal.

9. The method of claim 8, further comprising:
   assigning, a highest priority to a first scene when the feedback signal indicates a current scene is a second scene that is in connection with the first scene.

10. The method of claim 8, wherein the feedback signal indicates a priority adjustment that is determined by the end device.

11. A method of immersive media processing, comprising:
   receiving, by an end device, a media presentation description (MPD) for a scene based immersive media for display by a light field based display, the scene based immersive media comprising a plurality of immersive media scenes, and the MPD being indicative of streaming the plurality of immersive media scenes to the end device in a first order that is determined according to priority values and complexity values of the plurality of immersive media scenes;
   sending, by the end device, a feedback signal to a server, updated priority values and updated complexity values of the plurality of immersive media scenes that are determined by updating the priority values and the complexity values respectively based on the feedback signal;
   receiving, by the end device, the plurality of immersive media scenes in a second order that is determined according to the updated priority values and the updated complexity values, the second order being determined by adjusting the first order of the plurality of immersive media scenes; and
   outputting for display the plurality of immersive media scenes of immersive media by the end device based on the second order, the second order being different from the first order.

12. The method of claim 11, wherein the feedback signal indicates a next scene to render.

13. The method of claim 11, wherein the feedback signal indicates an adjustment of a priority value of at least one scene of the plurality of immersive media scenes.

14. The method of claim 11, wherein the feedback signal indicates a viewing position of a user of a current scene.

15. A method of immersive media processing, comprising:

receiving, by a network device, a scene based immersive media for display by a light field based display, a scene in the scene based immersive media comprising a plurality of assets in a first order that is determined according to priority values and complexity values of the plurality of assets;

transmitting the plurality of assets to an end device based on the first order;

assigning updated priority values and updated complexity values respectively to the plurality of assets in the scene, the updated priority values and the updated complexity values being determined by updating the priority values and the complexity values respectively based on one or more attributes of the plurality of assets and a feedback signal of the end device;

determining a second order for streaming the plurality of assets to the end device according to the updated priority values and the updated complexity values, the second order being different from the first order and being determined by adjusting the first order of the plurality of assets; and transmitting the plurality of assets to the end device based on the second order.

16. The method of claim 15, comprising:

determining the second order for streaming the plurality of assets according to a viewing position of the scene based immersive media of a user.

17. The method of claim 16, comprising:

assigning a priority value to an asset in the scene according to a size of the asset.

18. The method of claim 16, comprising:

assigning a priority value to an asset in the scene according to a visibility of the asset associated with a default entry location of the scene.

19. The method of claim 16, comprising:

assigning a first set of priority values to the plurality of assets based on a first attribute of the plurality of assets, the first set of priority values being used for ordering the plurality of assets in a first prioritization scheme;

assigning a second set of priority values to the plurality of assets based on a second attribute of the plurality of assets, the second set of priority values being used for ordering the plurality of assets in a second prioritization scheme;

selecting, a prioritization scheme for the end device from the first prioritization scheme and the second prioritization scheme according to information of the end device; and ordering the plurality of assets for streaming according to the selected prioritization scheme.

20. The method of claim 16, comprising:

assigning a first priority value to a first asset and a second priority value to a second asset when the first asset has a higher complexity of computation than the second asset, the first priority value being higher than the second priority value.

* * * * *